United States Patent
Reyes et al.

(10) Patent No.: US 8,142,745 B2
(45) Date of Patent: Mar. 27, 2012

(54) SEPARATION OF CARBON DIOXIDE FROM NITROGEN UTILIZING ZEOLITIC IMIDAZOLATE FRAMEWORK MATERIALS

(75) Inventors: Sebastian C. Reyes, Branchburg, NJ (US); Jose G. Santiesteban, legal representative, Hellertown, PA (US); Zheng Ni, Clinton, NJ (US); Charanjit S. Paur, South Bound Brook, NJ (US); Pavel Kortunov, Flemington, NJ (US); John Zengel, Clinton, NJ (US); Harry W. Deckman, Clinton, NJ (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 12/321,751

(22) Filed: Jan. 23, 2009

(65) Prior Publication Data

US 2009/0214407 A1    Aug. 27, 2009

Related U.S. Application Data

(60) Provisional application No. 61/066,551, filed on Feb. 21, 2008.

(51) Int. Cl.
*B01D 53/047* (2006.01)
*B01D 53/04* (2006.01)
*B01D 53/053* (2006.01)
*B01J 8/02* (2006.01)
*C01B 33/20* (2006.01)
*C01B 31/20* (2006.01)
*C01B 21/04* (2006.01)
*C01B 39/02* (2006.01)
*C01B 39/04* (2006.01)

(52) U.S. Cl. ............. 423/213.2; 423/220; 423/230; 423/235; 423/236; 423/239.1; 423/239.2; 423/700; 423/701; 423/702; 423/704; 423/705; 423/706

(58) Field of Classification Search ............... 423/213.2, 423/220, 230, 235, 236, 239.1, 239.2, 700, 423/701, 702, 704, 705, 706
See application file for complete search history.

(56) References Cited

U.S. PATENT DOCUMENTS 3,885,927 A    5/1975 Sherman et al.
(Continued)

FOREIGN PATENT DOCUMENTS
DE         2926524        6/1979
(Continued)

OTHER PUBLICATIONS

Watson, J.T.R., "Mean velocity, free path and size of molecules 2.2.4." National Physical Laboratory (2010). Visited Jun. 22, 2011 at http://www.kayelaby.npl.co.uk/general_physics/2_2/2_2_4.html.*

(Continued)

*Primary Examiner* — Stuart Hendrickson
*Assistant Examiner* — Daniel Berns

(57) ABSTRACT

The present invention relates to the selective separation of carbon dioxide ("$CO_2$") from nitrogen ("$N_2$") in streams containing both carbon dioxide and nitrogen utilizing a zeolitic imidazolate framework ("ZIF") material. Preferably, the stream to be separated is fed to the present process in a substantially gaseous phase. In preferred embodiments, the current invention is utilized in a process to separate carbon dioxide from combustion gas (e.g., flue gas) streams preferably for sequestration of at least a portion of the carbon dioxide produced in combustion processes.

22 Claims, 29 Drawing Sheets

ZIF-7 Isotherms for $CO_2$ AND $N_2$ @ 301 K

U.S. PATENT DOCUMENTS

| | | | |
|---|---|---|---|
| 4,775,396 A | 10/1988 | Rastelli et al. | |
| 4,857,078 A | 8/1989 | Watler | |
| 4,869,883 A | 9/1989 | Thorogood et al. | |
| 5,171,333 A | 12/1992 | Maurer | |
| 5,642,630 A | 7/1997 | Abdelmalek et al. | |
| 5,726,118 A * | 3/1998 | Ivey et al. | 502/417 |
| 5,753,011 A | 5/1998 | Sircar et al. | |
| 6,011,192 A | 1/2000 | Baker et al. | |
| 6,531,569 B1 | 3/2003 | Tachiki et al. | |
| 6,617,467 B1 | 9/2003 | Muller et al. | |
| 6,624,318 B1 | 9/2003 | Muller et al. | |
| 6,893,564 B2 | 5/2005 | Mueller et al. | |
| 6,929,679 B2 | 8/2005 | Muller et al. | |
| 6,930,193 B2 | 8/2005 | Yaghi et al. | |
| 7,056,482 B2 * | 6/2006 | Hakka et al. | 423/230 |
| 7,078,235 B2 * | 7/2006 | Spencer et al. | 436/32 |
| 7,196,210 B2 | 3/2007 | Yaghi et al. | |
| 7,202,385 B2 | 4/2007 | Mueller et al. | |
| 2002/0104435 A1 | 8/2002 | Baker et al. | |
| 2003/0004364 A1 | 1/2003 | Yaghi et al. | |
| 2003/0078311 A1 | 4/2003 | Muller et al. | |
| 2003/0148165 A1 | 8/2003 | Muller et al. | |
| 2003/0222023 A1 | 12/2003 | Mueller et al. | |
| 2004/0225134 A1 | 11/2004 | Yaghi et al. | |
| 2004/0249189 A1 | 12/2004 | Mueller et al. | |
| 2004/0265670 A1 | 12/2004 | Muller et al. | |
| 2005/0004404 A1 | 1/2005 | Muller et al. | |
| 2005/0124819 A1 | 6/2005 | Yaghi et al. | |
| 2005/0154222 A1 | 7/2005 | Muller et al. | |
| 2005/0192175 A1 | 9/2005 | Yaghi et al. | |
| 2006/0079725 A1 | 4/2006 | Li et al. | |
| 2006/0135824 A1 | 6/2006 | Mueller et al. | |
| 2006/0154807 A1 | 7/2006 | Yaghi et al. | |
| 2006/0185388 A1 | 8/2006 | Muller et al. | |
| 2006/0252641 A1 | 11/2006 | Yaghi et al. | |
| 2007/0068389 A1 | 3/2007 | Yaghi | |
| 2007/0202038 A1 | 8/2007 | Yaghi et al. | |
| 2008/0184883 A1 | 8/2008 | Zhou et al. | |

FOREIGN PATENT DOCUMENTS

| | | |
|---|---|---|
| DE | 2926524 A1 * | 2/1980 |
| EP | 0 700 708 A1 | 3/1996 |
| EP | 1 148 025 A1 | 10/2001 |
| EP | 0 790 263 B1 | 2/2002 |
| EP | 1 674 555 A1 | 12/2005 |
| EP | 1 383 775 B1 | 8/2006 |
| WO | WO 02/088148 A1 | 11/2002 |
| WO | WO 03/035717 A1 | 5/2003 |
| WO | WO 03/064030 A1 | 8/2003 |
| WO | WO 03/101975 A1 | 12/2003 |
| WO | WO 03/102000 A1 | 12/2003 |
| WO | WO 2004/037895 A1 | 5/2004 |
| WO | WO2004/101575 A2 | 11/2004 |
| WO | WO 2005/003069 A2 | 1/2005 |
| WO | WO 2005/003622 A1 | 1/2005 |
| WO | WO 2005/068474 A1 | 7/2005 |
| WO | WO 2006/028479 A1 | 3/2006 |
| WO | WO 2006/047423 A2 | 5/2006 |
| WO | WO 2006/050898 A1 | 5/2006 |
| WO | WO 2006/089908 A1 | 8/2006 |
| WO | WO 2006/110740 A2 | 10/2006 |
| WO | WO 2007/038508 A2 | 4/2007 |
| WO | WO 2007/101241 A2 | 9/2007 |

OTHER PUBLICATIONS

Hideki Hayashi, Adrien P. Cote, Hiroyasu Furukawa, Michael O'Keeffe, Omar M. Yaghi, "Zeolite A imidazolate frameworks,"Nature Materials, vol. 6, Jul. 2007, pp. 501-506.

Rahul Banerjee, Anh Phan, Bo Wang, Carolyn Knobler, Hiroyasu Furukawa, Michael O'Keefe, Omar M. Yaghi, "High-Throughput Synthesis of Zeolitic Imidazolate Frameworks and Application of CO2 Capture," Science, vol. 319, Feb. 15, 2008, pp. 939-943.

Kyo Sung Park et al.; "Exceptional Chemical and thermal stability of zeolitic imidazolate frameworks," PNAS, Jul. 5, 2006, vol. 103, No. 27, pp. 10186-10191.

Yun-Qi Tian et al.; "The Silica-Like Extended Polymorphism of Cobalt (II) Imidazolate Three-Dimensional Frameworks: X-ray Single Crystal Structures and Magnetic Properties," Chem. Eur. J. 2003, 9, pp. 5673-5685.

Yun-Qi Tian et al.; "[Co$_5$(im)$_{10}$ • 2MB]∞: A Metal-Organic Open-Framework with Zeolite-Like Topology," Angew. Chem. Int. Ed. 2002, 41, No. 8, pp. 1384-1386.

Xiao-Chun Huang et al., "Ligand-Directed Strategy for Zeolite-Type Metal-Organic Frameworks: Zinc(II) Imidazolates with Unusual Zeolitic Topologies," Angew. Chem. Int. Ed. 2006, 45, pp. 1557-1559.

Ziaochun Huang et al.; "[Zn(bim)$_x$] • (H$_2$O)$_{1.67}$: A metal-organic open-framework with sodalite topology"; Chinese Science Bulletin, vol. 48, No. 15, Aug. 2003, pp. 1531-1534.

Yun-Qi Tian et al.; "Design and Generation of Extended Zeolitic Metal-Organic Frameworks (ZMOFs): Syntheis and Crystal Structures of Zinc(ii) Imidazolate Polymers with Zeolitic Topologies"; Chem. Eur. J., 2007, 13, pp. 4146-4154.

Yun-Qi Tian et al.; "[Co$^{II}$Cu$^I_2$(Im)$_4$]∞: A Layered Bimetallic Imidazolate Polymer, the First Hydridized Cobalt (ii) Imidazolate,"Z. Anorg. Allg. Chem., 2004, 630, pp. 1371-1373.

Yun-Qi Tian et al., "Determination of the Solvothermal Synthesis Mechanism of Metal Imidazolates by X-ray Single-Crystal Studies of a Photoluminescent Cadmium(II) Imidazolate and Its Imtermediate Involving Piperazine," Eur. J. Inorg. Chem., 2004, pp. 1039-1044.

Zhong-Lin Lu et al.; "Synthesis and crystal structure of an imidazolate-bridged dicopper tris(2-aminoethyl)amine complex"; Transition Met. Chem., 22, 1997, pp. 549-552.

Yun-Qi Tian et al.; "Two Polymorphs of Cobalt(II) Imidazolate Polymers Synthesized Solvothermally by Using One Organic Template N,N-Dimethylacetamide"; Inorg. Chem. 2004, 43, pp. 4631-4635.

Xiao-Chun Huang, Jie-Peng Zhang, Xiao-Ming Chen; "One-Dimensional Supramolecular Isomerism of Copper(I) and Silver(I) Imidazolates Based on theLigand Orientations," Crystal Growth & Design, 2006, vol. 6, No. 5, pp. 1194-1198.

Yunling Liu, Victor CH. Kra Vtsov, Randy Larsen, Mohamed Eddaoudi; "Molecular building blocks approach to the assembly of zeolite-like metal-organic frameworks (ZMOFs) with extra-large cavities"; Chem. Commun., 2006, pp. 1488-1490.

Philip L. Llewellyn et al.; "How Hydration Drastically Improves Adsorption Selectivity for CO$_2$ over CH4 in the Flexible Chromium Terephthlate MIL-53"; Angew. Chem. Int. Ed., 2006, 45, pp. 7751-7754.

Atsushi Kondo et al.; "Novel Expansion/Shrinkage Modulation of 2D Layered MOF Triggered by Clathrate Formation with CO$_2$ Molecules"; Nano Letters, 2006, vol. 6, No. 11, pp. 2581-2584.

Katharine Sanderson, "Space Invaders," news feature in Nature, vol. 448, Aug. 16, 2007, pp. 746-748.

* cited by examiner

Thermogravimetric Analyses of ZIF-7

Powder X-ray Diffraction Pattern of ZIF-9

Thermogravimetric Analyses of ZIF-9

Powder X-ray Diffraction Pattern of ZIF-1

Thermogravimetric Analyses of ZIF-1

Powder X-ray Diffraction Pattern of ZIF-8

Scanning Electron Microscopy Image of ZIF-7

ZIF-7 Isotherms for CO$_2$ @ 301 K, @ 308 K and @ 323 K

Scanning Electron Microscopy Image of ZIF-1 (acetonitrile-exchanged)

Scanning Electron Microscopy Image of ZIF-1 (toluene-exchanged)

ZIF-1 (acetonitrile-exchanged) Isotherms for $CO_2$ and $N_2$ @ 301 K

Scanning Electron Microscopy Image of ZIF-11

Scanning Electron Microscopy Image of ZIF-8

SEPARATION OF CARBON DIOXIDE FROM NITROGEN UTILIZING ZEOLITIC IMIDAZOLATE FRAMEWORK MATERIALS

This application claims the benefit of U.S. Provisional Application No. 61/066,551 filed Feb. 21, 2008.

FIELD OF THE INVENTION

The present invention relates to the selective separation of carbon dioxide ("$CO_2$") from nitrogen ("$N_2$") in streams containing both carbon dioxide and nitrogen utilizing a zeolitic imidazolate framework ("ZIF") material. Preferably, the stream to be separated is fed to the present process in a substantially gaseous phase. In preferred embodiments, the current invention is utilized in a process to separate carbon dioxide from combustion gas (e.g., flue gas) streams preferably for sequestration of at least a portion of the carbon dioxide produced in combustion processes.

BACKGROUND OF THE INVENTION

Gas separation is an important process utilized in various industries, particularly in the production of fuels, chemicals, petrochemicals and specialty products. A gas separation can be accomplished by a variety of methods that, assisted by heat, solids, or other means, generally exploits the differences in physical and/or chemical properties of the components to be separated. For example, gas separation can be achieved by partial liquefaction or by utilizing a solid adsorbent material that preferentially retains or adsorbs a more readily adsorbed component relative to a less readily adsorbed component of the gas mixture, or by several other gas separation techniques known in the industry. One such commercially practiced gas separation process is pressure swing adsorption ("PSA"). PSA processes, when operated under certain conditions, allow a selective component or components in a gas mixture to be preferentially adsorbed within the pore structure of porous adsorbent materials relative to a second component or components in the gas mixture. The total amount adsorbed of each component in the material (i.e., the adsorption capacity) and the selectivity of the adsorption for a specific component over another component may often be improved by operating the process under specific pressure and temperature conditions since both pressure and temperature influence the adsorption loading of the components to a different extent. The efficiency of the PSA process may be further improved by the implementation of processing steps, such as the use of purge stream(s) that have optimally chosen composition, pressures and temperatures. However, relatively few adsorbent materials have separation selectivities, adsorption capacities and other beneficial properties (such as chemical and physical inertness and durability) so as to be able to function as commercially viable and cost-efficient adsorbents in a PSA process.

Some adsorbent materials are able to adsorb a greater amount of one component than another component under certain conditions. Certain components may not be selectively adsorbed or may not be adsorbed to an acceptable level that would lead to an economically viable process. However, if sizable differences in adsorption properties exist for selective components in an adsorbent material, PSA processes can be used to effectively separate certain component gases from a mixture. For example, if a gas mixture such as air is passed at some pressure and temperature through a vessel containing an adsorbent material that selectively adsorbs more oxygen than nitrogen, at least a portion of the oxygen contained in the feedstream will stay in the adsorbent and the gas coming out of the vessel will be enriched in nitrogen. When the bed reaches a selected fraction of its total capacity to adsorb oxygen, it can be regenerated by various pressure swing techniques, thereby releasing the adsorbed oxygen (and any other associated gas components), which can then be captured and isolated as a separate product stream. The adsorbent material which has now been "desorbed" of the oxygen can then be reused and the various steps of the PSA process cycle are repeated so as to allow a continuous operation.

However, finding suitable materials that specifically discriminate between difficult to separate gases in both an efficient and effective manner (that is, the materials that have both a high separation selectivity and a high adsorption capacity) are not easily found. Additionally, many adsorbent materials known in the art do not hold up well to the additional components in the streams or are unable to sustain the severe pressure and/or temperature conditions, including cyclic conditions, required by the processes. Therefore, commercially suitable, and more importantly, commercially valuable adsorbent materials are not very readily available. Researchers in the industry continually look for improved adsorbent materials, process configurations and operating conditions to make these separation processes economically viable.

An early teaching of a PSA process having a multi-bed system is found in U.S. Pat. No. 3,430,418 wherein a system having at least four beds is described. This '418 patent describes a cyclic PSA processing sequence that includes in each bed: (1) higher pressure adsorption with release of product effluent from the product end of the bed; (2) co-current depressurization to intermediate pressure with release of void space gas from the product end thereof; (3) countercurrent depressurization to a lower pressure; (4) purge; and (5) repressurization. The void space gas released during the co-current depressurization step is commonly employed for pressure equalization purposes and to provide purge gas to a bed at its lower desorption pressure. Another conventional PSA processes using three sorbent beds is disclosed in U.S. Pat. No. 3,738,087.

Another industrially important gas separation process is temperature swing adsorption ("TSA"). TSA processes, when operated under certain pressure and temperature conditions, allow some components to be selectively adsorbed over others within the pore structure of an adsorbent material. In this process, a stream containing components to be separated flows through an adsorbent material wherein one or more of the components are selectively adsorbed over another component or components. An effluent stream, reduced in concentration of the selectively adsorbed component(s) is obtained during this adsorption "stage" or "step" of the TSA process. In this process, after the adsorbent material has adsorbed a certain amount of the desired component(s), the temperature of the adsorbent is increased, and the selectively adsorbed component(s) is released, or desorbed from the adsorbent materials and can be collected separate from the effluent stream in this step of the overall TSA process cycle. By cyclically swinging the temperature of adsorbent beds, TSA processes can be used to separate components in a mixture when used with an adsorbent that selectively adsorbs one or more of the stream components in the feed mixture relative to one or more different stream components comprising the feed mixture.

PSA and TSA processes do not need to be mutually exclusive. A combined PSA/TSA process may be utilized, for example, by increasing the temperature of the adsorbent materials during the lower pressure purge step of a conventional PSA process to improve the desorption of the selectively adsorbed component(s) in the process. The bed temperature can then be reduced (or allowed to be reduced) during the adsorption portion of the PSA cycle to improve the adsorption characteristics and/or adsorption capacity of the material.

Besides using pressure and temperature to regenerate the adsorption bed, the adsorbent can be regenerated with a purge that is flowed through the adsorbent bed in a manner that displaces adsorbed molecules from the adsorbent. Processes that are conducted with this type of adsorbent regeneration technique are often called partial pressure purge displacement processes ("PPSA"). Processes such as PSA, TSA, purge displacement, and combination thereof are referred to as swing adsorption processes. These swing adsorption processes can be conducted with rapid cycles (i.e., cycles of short duration) in which case they are referred to as rapid cycle thermal swing adsorption (RCTSA), rapid cycle pressure swing adsorption (RCPSA), and rapid cycle partial pressure swing or displacement purge adsorption (RCPPSA) technologies.

Additionally, membrane separation processes can be used for the separation of gas components in a mixture. In a membrane separation process, one or more components of the mixed stream contact one side of a membrane material and a portion of the mixed stream permeates through the membrane and is retrieved from the other side of the membrane material as a "permeate" stream. In this process, the permeate stream has a higher concentration (in mole %, weight %, or volume % as defined by the process) of a select component than the mixed stream that initially contacts the membrane. A "retentate" stream is also obtained from the first side of the membrane which has a lower concentration (in mole %, weight %, or volume % as defined by the process) of a select component than the mixed stream that initially contacts the membrane. In this manner, a separation of components is made resulting in a higher value for the two separated streams (i.e., the retentate and the permeate streams) than the original mixed stream that is fed to the membrane separations process. The physical conditions on the permeate side of the membrane (for example pressure, temperature, and purge conditions) are chosen so that there is a gradient of chemical potential across the membrane that is favorable to drive the select component from the feed side to the permeate side of the membrane.

There is a need in the art for improved swing adsorption and membrane processes utilizing adsorbent materials for the selective separation of gaseous stream components. In particular, there is a need in the art for improved swing adsorption and membrane processes utilizing adsorbent materials for the selective separation and removal of carbon dioxide from nitrogen in streams containing both carbon dioxide and nitrogen.

United States Patent Publication No. US2007/0202038A1 discloses a family of materials which shall be referred to herein as zeolitic imidazolate frameworks (or "ZIF"s) materials. This publication describes in detail the synthesis and structural and pore volume characterization of various ZIF materials. It includes the low temperature physisorption characterization ($N_2$ and $H_2$ at 77K and Ar at 87K) of selected ZIF structures but it does not disclose adsorption properties of these materials at pressure and temperature conditions that would be relevant to separation processes of gases and hydrocarbons of interest in industrial applications.

SUMMARY OF THE INVENTION

The present invention is a separation process utilizing ZIF-containing materials to effectively separate carbon dioxide, $CO_2$, from nitrogen, $N_2$, in process feedstreams comprised of both components.

In accordance with one embodiment of the present invention there is provided a process for separating $CO_2$ from a process feedstream, comprising:
 a) contacting an adsorbent bed comprised of a zeolitic imidazolate framework material with a process feedstream comprising $CO_2$ and $N_2$ at a first pressure and first temperature;
 b) adsorbing at least a portion of the $CO_2$ in the adsorbent bed;
 c) producing a $CO_2$-lean product stream, wherein the $CO_2$-lean product stream has a lower concentration of $CO_2$ by vol % than the process feedstream; and
 d) producing a $CO_2$-rich product stream at a second pressure and second temperature, wherein the $CO_2$-rich product stream has a higher concentration of $CO_2$ by vol % than the process feedstream;
 wherein the zeolitic imidazolate framework material has a framework structure wherein each vertex of the framework structure is comprised of a single metal ion and each pair of connected adjacent vertices of the framework structure is linked by nitrogen atoms of an imidazolate anion or its derivative, and wherein the zeolitic imidazolate framework material has an adsorptive loading ratio for $CO_2$ over $N_2$ of at least 5.

In accordance with another embodiment of the present invention there is provided a process for separating $CO_2$ from a process feedstream, comprising:
 a) contacting a first side of a membrane comprised of a zeolitic imidazolate framework material with a process feedstream comprising $CO_2$ and $N_2$ at a first pressure and first temperature;
 b) retrieving a first permeate stream from a second side of the membrane at a second pressure and second temperature, wherein the first permeate stream consists of components that selectively permeate through the membrane and the first permeate stream has a higher concentration of $CO_2$ by vol % than the process feedstream; and
 c) retrieving a first retentate stream;
 wherein the zeolitic imidazolate framework material has a framework structure wherein each vertex of the framework structure is comprised of a single metal ion and each pair of connected adjacent vertices of the framework structure is linked by nitrogen atoms of an imidazolate anion or its derivative, and wherein the zeolitic imidazolate framework material has an adsorptive loading ratio for $CO_2$ over $N_2$ of at least 5.

In other preferred embodiments of the present invention, the process feedstream is comprised of a combustion gas, an FCC regenerator off-gas, or a synthetically produced gas.

In even more preferred embodiments of the present invention, the zeolitic imidazolate framework material is selected from ZIF-9, ZIF-1, ZIF-7, ZIF-11, and ZIF-8.

DETAILED DESCRIPTION OF THE INVENTION

Figure 1:
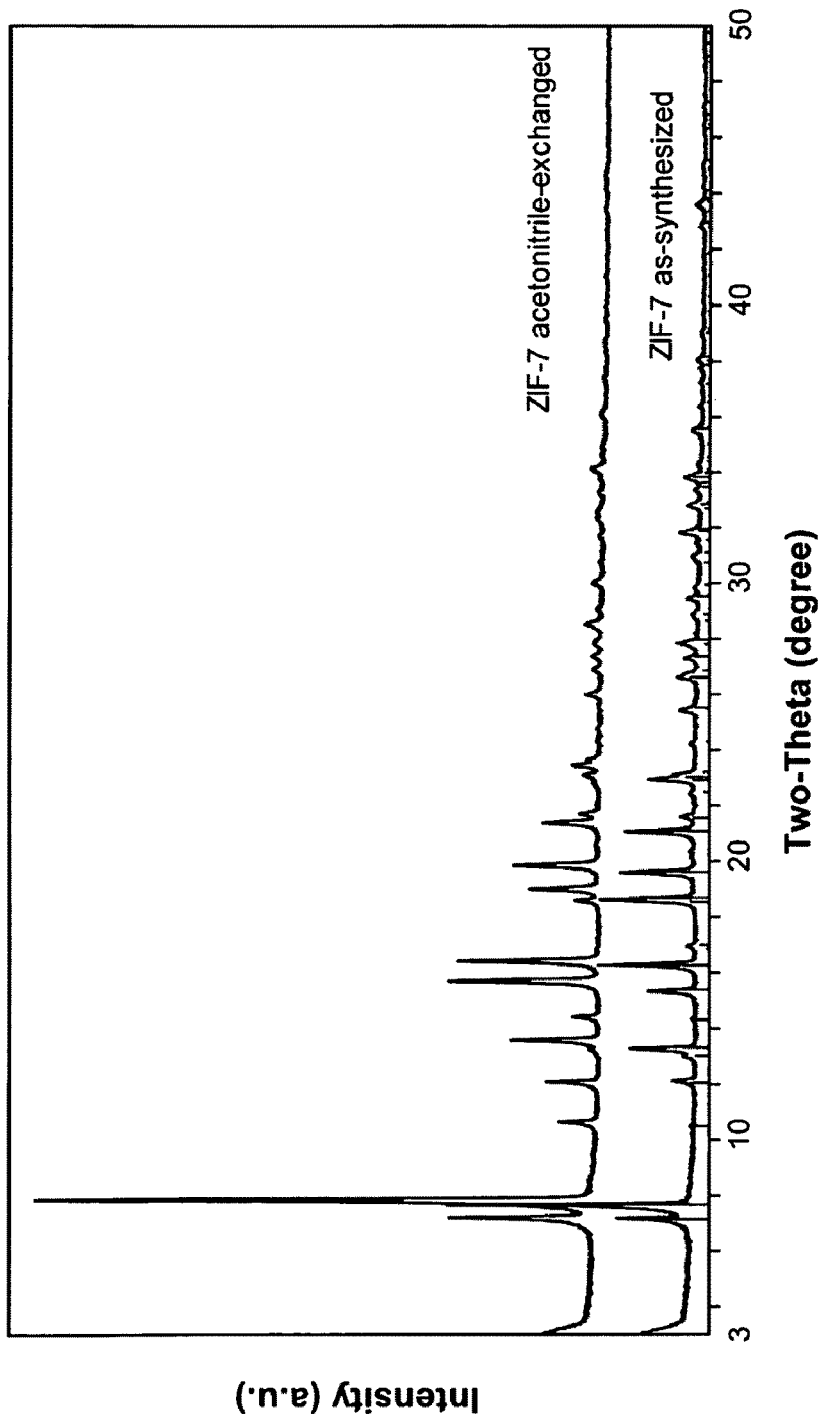
FIG. 1 is the experimental powder X-ray diffraction ("PXRD") patterns of the as-synthesized and acetonitrile-exchanged ZIF-7 samples of Example 1 herein. The calculated PXRD pattern (shown as the vertical stick patterns in the figure) for ZIF-7 based on the single crystal structure of ZIF-7 reported in the "Park Reference" as referenced herein is also shown in the figure.

The present invention is directed to processes for the separation of carbon dioxide ("$CO_2$") from nitrogen ("$N_2$") in streams containing both carbon dioxide and nitrogen utilizing adsorbents comprised of zeolitic imidazolate framework ("ZIF") materials. Preferably the zeolitic imidazolate frameworks are utilized in a swing adsorption process. The general term "swing adsorption process" as used herein shall be taken to include Pressure Swing Adsorption ("PSA") processes, Temperature Swing Adsorption ("TSA") processes, Pressure Purge Displacement Processes ("PPSA"), Rapid Cycle Pressure Swing Adsorption ("RCPSA") processes, Rapid Cycle Temperature Swing Adsorption ("RCTSA") processes, Rapid Cycle Pressure Purge Displacement Processes ("RCPPSA") as well as combinations of these swing adsorption processes. In a preferred embodiment, the stream to be separated is fed to the process in a substantially gaseous state.

In other preferred embodiments of the present invention, a zeolitic imidazolate framework ("ZIF") adsorbent material is incorporated into a membrane material for the selective separation of carbon dioxide ("$CO_2$") from nitrogen ("$N_2$") in streams containing both carbon dioxide and nitrogen. The ZIF materials will preferably be utilized in a matrixed membrane material to facilitate the separation of $CO_2$ from $N_2$. In a preferred embodiment, the feedstream to be separated will contact the membrane wherein the $CO_2$ and the $N_2$ in the feedstream will be substantially in a gaseous phase.

"Zeolitic imidazolate framework" (or "ZIF") materials are defined herein as crystalline microporous structures having framework topologies commonly found in zeolites and/or in other crystalline materials wherein each vertex of the framework structure is comprised of a single metal ion and each pair of connected adjacent vertices of the framework structure is linked by nitrogen atoms of an imidazolate anion or its derivative. The terms "micropore" or "microporous" as utilized herein are defined as a pore diameter or a material containing pore diameters of less than or equal to 2.0 nm (20 Å), respectively. Descriptions and the synthesis of some of the ZIF materials that can be utilized in the present invention are disclosed in United States Patent Publication No. US 2007/0202038A1 to Yaghi et al., which is hereby incorporated by reference.

The applicants of the present invention have discovered that ZIF materials can selectively separate $CO_2$ from $N_2$ in streams containing both of these components. Furthermore, this may be accomplished at conditions of pressure, temperature and compositions that are relevant to industrial processes. In order to separate two components from a mixture, the adsorption loading (e.g., in mmole/g) for the first component must be greater than the adsorption loading (e.g., in mmole/g) for the second component. Even though process schemes can be designed to operate at low ratios of adsorption loading (in mmole/g) for the first component vs. the adsorption loading (in mmole/g) for the second component, it is preferred that this "adsorptive loading ratio for $CO_2$ over $N_2$" for the ZIF material utilized be at least 5. Since the required equipment size, cost and operating expenses tend to be significantly lowered at higher adsorptive loading ratios, the separations processes become much more attractive utilizing materials and conditions that lead to higher adsorptive loading ratios. In more preferred embodiments of the present invention, the ZIF material utilized in the present invention has an adsorptive loading ratio for $CO_2$ over $N_2$ of at least about 10, even more preferably at least about 25, and most preferably, at least about 50.

The ratio described above is a property for a specific adsorbate-adsorbent pair, at given conditions of pressure and temperature. This ratio is referred to herein as the "adsorptive loading ratio" or more particularly as the "adsorptive loading ratio for $CO_2$ over $N_2$". This ratio is defined herein as a unitless quantity that is equal to the adsorption loading (in mmole/g) for the first component divided by the adsorption loading (in mmole/g) for the second component for a specific adsorbent material at a specific pressure and temperature. As used herein, the term "first component" is synonymous with the component carbon dioxide, $CO_2$, and the term "second component" is synonymous with the component nitrogen, $N_2$. As used herein, although it is preferred that the adsorption loading for each component on a particular ZIF material be measured under the operating component partial pressure and temperature conditions for the system, it is often more advantageous to measure the adsorption loading for a particular ZIF for each component material at more "standard" conditions of pressure and temperature. Therefore, for the purposes of this invention and the interpretation of the scope of the invention, the adsorptive loading ratio for two components (e.g., $CO_2$ and $N_2$) can be measured at either operating partial pressure for the specific components and operating temperature conditions for the feedstream contacting the ZIF-containing adsorbent, or at single component testing conditions chosen herein to be 301 K (28° C.) and 106.6 kPa (800 torr). Unless stated otherwise, these latter conditions were used in the testing of the samples in the examples herein, which can be readily duplicated in a laboratory test facility.

ZIF materials that exhibit significantly large adsorptive loading ratios may be used in the swing adsorption processes of the present invention to effectively and economically separate $CO_2$ from $N_2$ in streams containing both components. Each of these swing adsorption processes are comprised of a number of "steps" that include a variety of adsorption and desorption steps that in combination lead to a complete swing adsorption "cycle" that is periodically repeated. Since multiple adsorbent beds are typically used, their appropriate time synchronization leads to the continuous production of products. A complete swing adsorption cycle on a particular adsorbent bed, therefore, comprises all of the adsorption and desorption steps that are taken, beginning with the very first contacting of the feed gas mixture with the adsorbate-free or substantially adsorbate-free adsorbent and continuing through the last desorption stage that regenerates the adsorbent into its adsorbate-free or substantially adsorbate-free state and further including any additional repressurizing and/or purging steps that may occur thereafter to bring the "cycle" back to the first contacting of the feed gas mixture with the adsorbate-free or substantially adsorbate-free adsorbent which has begun the "cycle". At this point, the next swing adsorption "cycle" is started and the cycle is subsequently repeated.

Typically, there is at least one adsorption step wherein a process feedstream is contacted in a swing adsorption process with the adsorbent material. The equivalent terms "process feedstream" or "inlet stream" as used herein in swing adsorption embodiments of the present invention is the mixed component stream comprising at least two components to be separated which is contacted with the adsorbent material during the adsorption cycle. During this step of the process, the process feedstream contacts the adsorbent material under certain process temperature and pressure conditions and as the process feedstream flows through the adsorbent material at least a portion of the "first component" (or "strongly adsorbed component") of the process feedstream is preferentially adsorbed by the adsorbent material with respect to a "second component" (or "weakly adsorbed component"). During this step an "effluent stream" (or "$CO_2$-lean product stream" herein) is drawn from the swing adsorption process wherein the total number of moles of the first component into the swing adsorption process is higher than the total number of moles of the first component out of the swing adsorption process during this adsorption step. Although it is not necessary, it is preferred that the molar concentration of the first component in the inlet stream be greater than the molar concentration of the first component in the effluent stream.

The swing adsorption process is also comprised of at least one desorption step wherein at least a portion of the first component that has been preferentially adsorbed by the adsorbent material is recovered in what is termed herein as a "desorbed stream" (or "$CO_2$-rich product stream" herein). During this step, the process conditions in the swing adsorption process are changed to allow at least a portion of the first component to be desorbed from the adsorbent material and collected as a "desorbed stream". This desorption can be induced by a pressure swing, a temperature swing, the introduction of a partial pressure purge displacement stream, or a combination thereof. In a preferred embodiment, the molar concentration of the first component in the desorbed stream is greater than the molar concentration of the first component in the process feedstream. In another preferred embodiment, the molar concentration of the first component in the desorbed stream is greater than the molar concentration of the first component in the effluent stream.

Although at least these two steps (i.e., adsorption and desorption) are required in the swing adsorption processes of the current invention, additional steps may be utilized in the swing adsorption processes. These steps include, but are not limited to, concurrent purge steps, counter-current purge steps, and/or multiple partial pressurization or depressurization steps. These additional steps may be utilized to improve first and/or second component recovery, improve first or second component purity, and/or obtain multiple product streams in addition to the effluent stream and desorbed stream described above.

One embodiment of the swing adsorption process of the present invention utilizes a Pressure Swing Adsorption ("PSA") process wherein the adsorbent material is comprised of a ZIF material and the "first component" as described above is $CO_2$ and the "second component" as described above is $N_2$. In this PSA process, the partial pressure of the first component in the adsorption step is higher than the partial pressure of the first component in the desorption step which allows at least a portion of the adsorbed first component to be recovered in the desorption step and the adsorbent material to be regenerated by depletion of the adsorbed components for reuse in a subsequent adsorption step. This is accomplished in part by exposing the adsorbent material to lower partial pressure conditions in the desorption step than the partial pressure conditions in the adsorption step. This desorption can be further assisted by utilizing a purge gas to lower the partial pressure of the first component during the desorption step, a purge step, a partial pressurization step, or a partial depressurization step as described above.

Another type of swing adsorption process of the present invention is a Temperature Swing Adsorption ("TSA") process wherein the adsorbent material is comprised of a ZIF material and the "first component" as described above is $CO_2$ and the "second component" as described above is $N_2$. The TSA processes operate similar to the PSA processes above wherein the partial pressure of the first component in the adsorption step is higher than the partial pressure of the first component in the desorption step which allows at least a portion of the adsorbed first component to be recovered in the desorption step and the adsorbent material to be regenerated by depletion of the adsorbed components for reuse in a subsequent adsorption step. However, in the TSA processes, this is accomplished in part by exposing the adsorbent material to higher temperature conditions in the desorption step than the temperature conditions in the adsorption step. This desorption can be further assisted by utilizing a purge gas to lower the partial pressure of the first component and/or provide heating of the adsorbent material during the desorption step, a purge step, a partial pressurization step, or a partial depressurization step as described above.

It should also be noted that the steps of the PSA and TSA processes can be combined in a PSA/TSA process of the present invention. In these combined processes, both pressure and temperature changes or "swings" are made between the adsorption steps and desorption steps of the process, resulting in a desired separation of at least a portion of the first component from the second component of the mixed component process feedstream fed to the inlet of the PSA/TSA process.

In embodiments of the swing adsorption processes of the present invention, the ZIF materials may be incorporated into the adsorption swing process in many structural forms and/or in combination with additional components. The ZIF materials may be incorporated as crystallites of preferred size and shape of substantially uniform dimensions or with dimensions suitably distributed according to a preferred distribution. The crystallites may be used directly as produced in the synthesis steps or be more preferably formulated into larger aggregates or incorporated into a structured or matrix material to provide form, stability, and/or in combination with other complementary co-adsorbent materials that can fulfill a variety of other beneficial functions to the overall process. Non-limiting examples include incorporating the ZIF material with a binder material to form a matrix comprising a binder material selected from a crystalline polymer, a non-crystalline polymer, an epoxy, a thermoplastic, a clay, a silica-containing material, an alumina-containing material, and a titania-containing material. The binder material may also exhibit either a microporous or a mesoporous structure. Additionally, it may be advantageous to add suitably chosen additives into this binder material. These additives can be used to improve the adsorption/desorption and transport properties of the selected components within the ZIF materials. Non-limiting examples of these additional additives include zeolites and microporous crystalline materials such as pure silicates, silicoaluminophosphates ("SAPO"s), aluminophosphates ("AlPO"s). In a preferred embodiment, the additional additive is a zeolite. Other additives such as metals or other high heat adsorbing capacity and high heat conductivity materials may also be incorporated into the matrix to assist in the capture and transfer of at least a portion of the heat that is generated during the exothermic adsorption step(s) of the swing adsorption process, thereby shortening the duration of the cycling process, increasing throughput, and further improving the overall efficiency of the ZIF material for adsorbing the select component or components.

When the ZIF materials are incorporated with a binder, the adsorbent material can be formulated into optimal geometric shapes or be applied onto supporting substrates which further improve the durability of the adsorbent and the rate at which the selected adsorbing components are brought into contact with the adsorption sites of the ZIF material. Non-limiting examples include beads, extrudates, formed pellets, structured beds, monoliths and hollow fibers, as well as coatings applied to plates or monolithic structures fibers or hollow fibers. Depending upon the specific situation, inlet stream composition as well as product stream compositions, process conditions and equipment design for the process of the present invention, certain structures and/or matrix compositions can provide improved separation efficiencies and/or selectivities for the overall process.

Any of the steps described above (i.e., structuring, additives, co-adsorbents, etc) that allow a reduction in the duration of a complete swing adsorption cycle or simply "cycle" are of utmost practical importance since shorter cycle times result in higher throughputs. Whereas conventional swing adsorption processes typically operate at cycles with durations of the order of minutes, with the materials of the present invention and the abovementioned process modifications, it is possible to significantly reduce the duration of a complete cycle by more than 50%. These rapid cycle swing adsorption processes that are enabled by the materials and process conditions of the present invention are particularly advantageous from an economic standpoint. In preferred embodiments of the present invention, the ZIF material is utilized in a swing adsorption process wherein the cycle time is less than about 1 minute, and more preferably, the ZIF material is utilized in a swing adsorption process wherein the cycle time is less than about 30 seconds. In an even more preferred embodiment of the present invention, these short cycle times are incorporated into a rapid cycle pressure swing adsorption ("RCPSA") process embodiment of the present invention.

In another embodiment of the present invention, the ZIF material can be incorporated into a membrane process for the selective separation of carbon dioxide, $CO_2$, from nitrogen, $N_2$, in streams comprising a mixture of these components. In this embodiment, a ZIF material is incorporated within or coated onto an inorganic substrate or a polymer material and utilized in a membrane separation process, thereby producing a "ZIF-containing membrane". The ZIF material of the membrane, has a net permeation affinity for $CO_2$ over $N_2$. The permeation rate can be typically described in terms of two multiplicative factors, one related to the diffusion rate and another related to the adsorption loadings of the components of the mixture on the ZIF material. With respect to this latter factor, a ZIF material incorporated into the membrane which has a higher adsorptive loading ratio for $CO_2$ over $N_2$, improves the concentration gradient for $CO_2$ either at the membrane surface (if coated onto the membrane surface) and/or in the membrane (if incorporated into the membrane matrix). This improved concentration gradient enhances the selective permeation of $CO_2$ relative to $N_2$ through the membrane, resulting in an improved recovery of $CO_2$ in the membrane permeate stream.

In this embodiment of the present invention, a process feedstream comprising $CO_2$ and $N_2$ contacts a first side of a ZIF-containing membrane and at least a portion of the process feedstream permeates through the membrane and is retrieved from a second side of the membrane material as a permeate stream. The permeate stream is obtained from the second side of the membrane and the permeate stream thus obtained has a higher vol % of $CO_2$ than the process feedstream. The equivalent terms "process feedstream" or "inlet stream" as used herein in membrane process embodiments of the present invention is the mixed component stream comprising at least two components to be separated which is contacted with the first side of the ZIF-containing membrane. It should be noted that in some embodiments, a "sweep stream" may be utilized on the permeate side of the ZIF-containing membrane in the membrane separation process of the present invention. It should also be noted that the term "permeate stream" as used herein and its composition properties are measured based solely upon the composition of the stream that permeates through the ZIF-containing membrane. For purposes of this invention, if any additional stream, such as a sweep stream, is added on the permeate side of the membrane process, the composition of this sweep stream must be excluded from the compositional analysis of the permeate stream.

Continuing with the membrane separation process embodiments of the present invention, at least one retentate stream is also obtained from the first side of the membrane which has a lower vol % of $CO_2$ than the process feedstream that initially contacts the membrane. In this manner, a separation of components is made resulting in a higher value for the two separated streams (i.e., the retentate and the permeate streams) than the original mixed stream that is fed to the membrane separations process. In preferred embodiments, the ZIF material utilized in the membrane process of the present invention has an adsorptive loading ratio for $CO_2$ over $N_2$ of at least about 5, more preferably at least about 10, even more preferably at least about 25, and most preferably at least about 50.

The membranes utilized in embodiments of the present invention can be asymmetric and can be comprised of several layers of different materials. To improve the mass transfer characteristics of these asymmetric membrane structures one or more of these layers can be a porous material. A thin selective layer imparts most of the molecular selectivity in the asymmetric membrane structure and in a preferred embodiment this selective layer contains the ZIF material. On the feed side molecules are selectively adsorbed in the selective layer and on the permeate side the molecules are desorbed. The selective ZIF-containing layer can optionally include other materials. One of the materials that can be present in the ZIF-containing layer is a polymer. When the ZIF containing layer contains more than 10 vol % of another material the selective layer is called a mixed matrix. To mitigate the effect of any defects or pinholes in the selective layer, a reparation coating or reparation layer can be incorporated in the membrane structure.

The ZIF-containing membrane will typically be part of a membrane module that includes a pressure housing. Non-limiting examples of ZIF-containing membrane structures that can be incorporated into the membrane module are hollow-fiber membrane structures, flat sheet membrane structures, and monolithic membrane structures. The membrane module will typically contain seals to isolate the retentate and permeate zones of the module and to prevent flow bypass or cross-contamination of the retentate stream(s) to the permeate stream(s). The seals may also serve as a device for holding the membrane in place within the membrane module.

There are many applications in the industry which can benefit from a process that allows such efficient separation of $CO_2$ and $N_2$ in a gas phase stream. Very large amounts of $CO_2$ and $N_2$ are presently and continually emitted from the burning of fossil fuels to support the existing energy infrastructure. In fact, the $CO_2$ emitted by utility and industrial power systems accounts for a very large fraction of the global $CO_2$ emissions. $CO_2$ and $N_2$ are typically the majority components in these combustion gas (or flue gas) streams that are released to the environment at slightly above atmospheric pressure and the composition of the combustion gas produced can vary significantly with the carbonaceous source that is utilized by these fossil fuel burning technologies. For example, a typical combustion gas stream produced in a coal-fired power plant contains about 14 vol % $CO_2$, 5 vol % $O_2$ and 81 vol % $N_2$, with lesser amounts of contaminants that include SOx (<3000 ppm), NOx (<1000 ppm) and particulates (<10 $g/m^3$). Similarly, a combustion gas stream produced in a natural gas turbine process contains about 4 vol % $CO_2$, 15 vol % $O_2$ and 81 vol % $N_2$, with other trace amounts of contaminants such as SOx (<1 ppm), NOx (<500 ppm) and particulates (<0.01 $g/m^3$). Unless otherwise noted, all component concentrations expressed herein are on a water-free basis.

Although several industrial processes are available for the separation and capture of $CO_2$ from combustion gas streams (e.g., cryogenic distillation, as well as physical and chemical absorption), both the low $CO_2$ content (i.e., due to the excess $N_2$) and the low absolute pressure of the combustion gas streams severely limit their effectiveness and increase their cost. Thus, for example, the need to concentrate and compress the $CO_2$ to significant pressures and the very low temperatures that are required in cryogenic distillation (in the range of about −40° C. (233 K)) makes these cryogenic separation processes very costly. Similarly, the need to concentrate and compress the $CO_2$-containing streams to significant pressures makes the use of amine-based absorption technologies very costly for the recovery of $CO_2$ from combustion gas streams. As further described below, the use of porous solid adsorbents, such us the ZIFs materials of the present invention, can overcome some of the present difficulties by enabling the selective separation of $CO_2$ from combustion gas streams without the need to precondition these streams in a costly manner. The materials of the present invention exhibit unique adsorption properties for selectively adsorbing $CO_2$ from a combustion gas stream at relatively low pressures and moderate temperatures.

Figure 13:
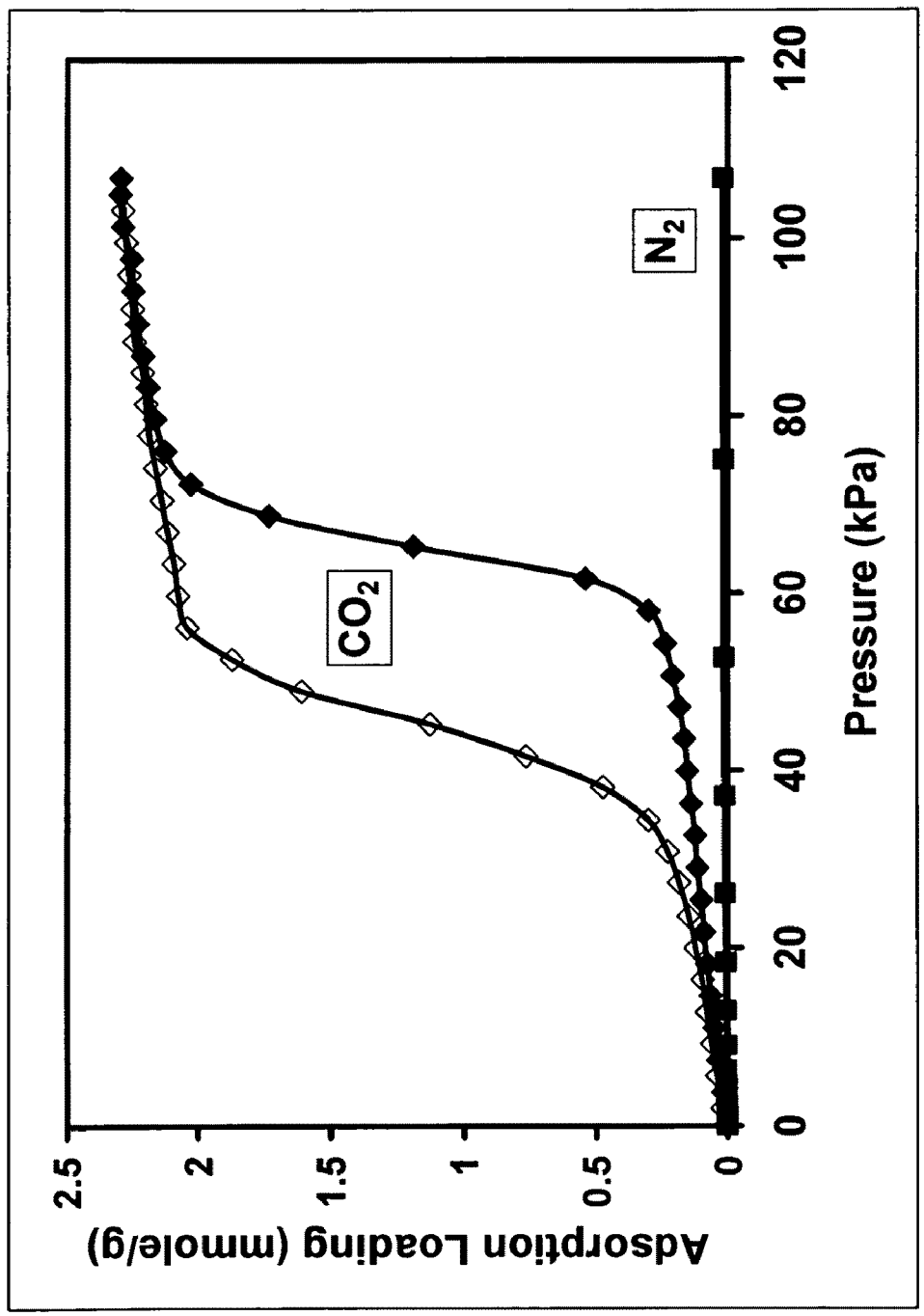
FIG. 13 shows the $CO_2$ adsorption isotherm and the $N_2$ adsorption isotherm at 301 K for a ZIF-7 sample of Example 6.
Figure 14:
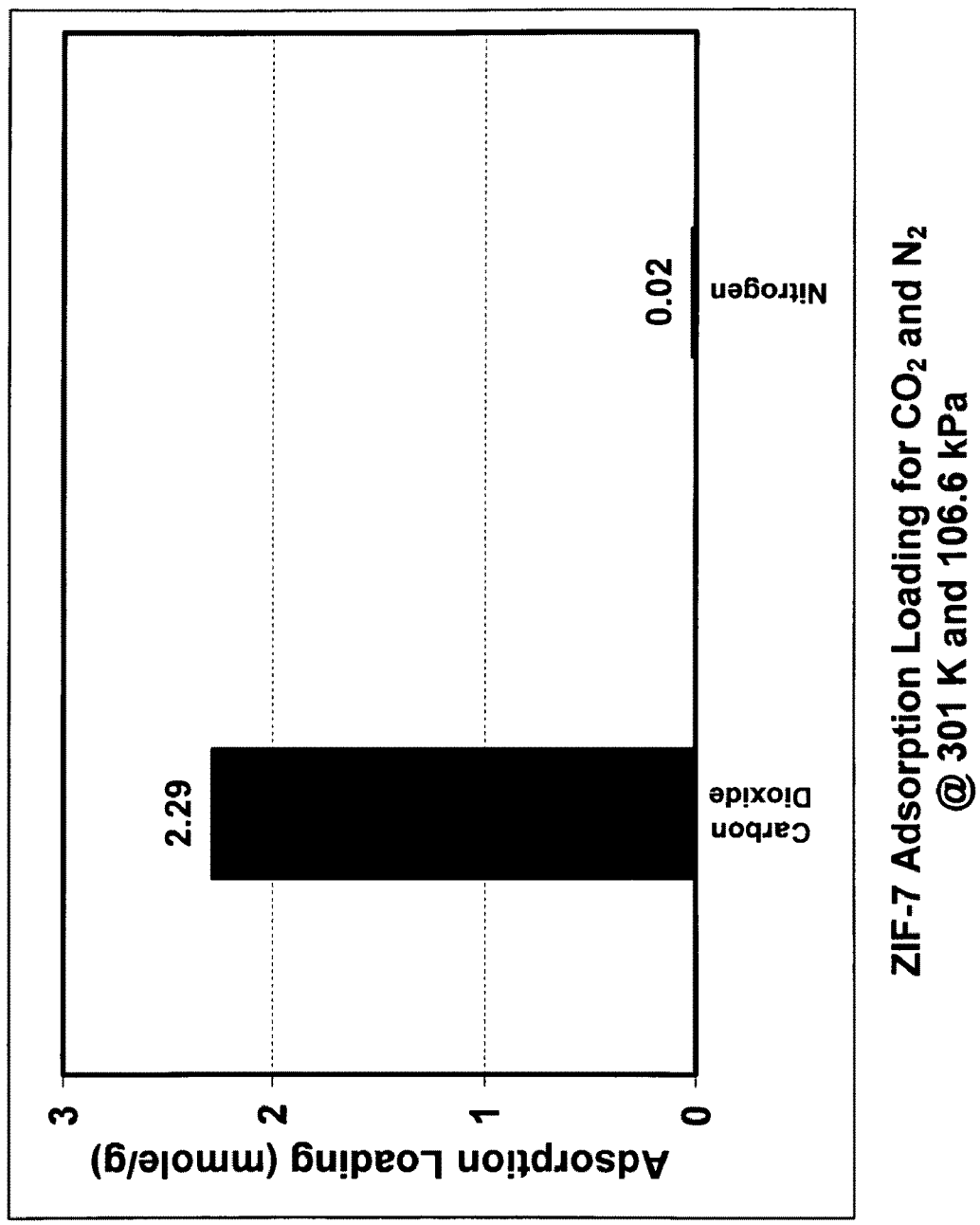
FIG. 14 is a bar graph comparing the adsorption loadings of a ZIF-7 sample of Example 5 for $CO_2$ and $N_2$ at 301 K and 106.6 kPa.

As an example, FIG. 13 shows the adsorption isotherms for ZIF-7 for carbon dioxide, $CO_2$, and for nitrogen, $N_2$. As can be seen in this figure, ZIF-7 (as well as ZIF-9 in FIG. 18) has a very large adsorptive loading ratio for $CO_2$ over $N_2$. The overall adsorption loading of these components at standard test conditions of 301 K and 106.6 kPa for ZIF-7 is shown in the bar graph of FIG. 14. As can be seen in FIG. 14, under these standard test conditions, ZIF-7 has an adsorption loading for $CO_2$ of about 2.29 mmole/g while the ZIF-7 has an adsorption loading for $N_2$ of only about 0.02 mmole/g. Therefore, the adsorptive loading ratio for $CO_2$ over $CH_4$ for ZIF-7 at these conditions is greater than about 100. Such high adsorptive loading ratios render these ZIF materials as very effective adsorbents materials in the processes of the present invention.

It is also noted that ZIF-7 (as well as ZIF-9) exhibits a unique isotherm shape not typically found in microporous crystalline materials such as zeolites. As described herein, this unique isotherm shape for $CO_2$ in ZIF-7 and ZIF-9 has important implications and distinctively enables embodiments of the present invention. FIG. 13 shows that the isotherm for $CO_2$ at 301 K displays a hysteretic behavior characterized by unique adsorption (solid diamonds) and desorption (open diamonds) branches. The transition from low to high loading in the adsorption branch at about 60 kPa signals a more favorable accommodation of the $CO_2$ within the ZIF-7 structure than in the Henry's law-like region below about 60 kPa. Similarly, the transition from high to low loading in the desorption branch at about 50 kPa signals the less favorable accommodation of the $CO_2$ within the ZIF-7 structure. This behavior is the result of unique energetic interactions between the adsorbed $CO_2$ and the ZIF-7 structure that, as described herein, advantageously enables embodiments of the pressure swing adsorption processes of the present invention. With this particular isotherm shape, it is possible to develop an effective pressure swing adsorption cycle that requires a narrow pressure swing that is only of the order of the pressure gap that exists between the rising adsorption branch and the decreasing desorption branch (i.e., a pressure swing of approximately 20 to 30 kPa in this example). It is also worth noticing that such a cycle would be associated with a fairly large "working capacity" (and thus aid the economics of the process), as seen from the large difference between the loadings at the low and high pressures at which the cycle would operate. The "working capacity" of an adsorbate material is defined herein as the difference between the adsorbate loading in the adsorption step and the adsorbate loading in the desorption step of the "strongly adsorbed component" (which herein is $CO_2$). Larger values of the working capacity are desirable. With more standard adsorbent materials that do not exhibit the type of hysteresis behavior shown in FIG. 13 (i.e., exhibit a more conventional gradual increase in loading with pressure at a constant temperature), the pressure swing has to be significantly broader to achieve an equivalent level of working capacity, with concomitant implications for a higher cost operation.

Figure 12:
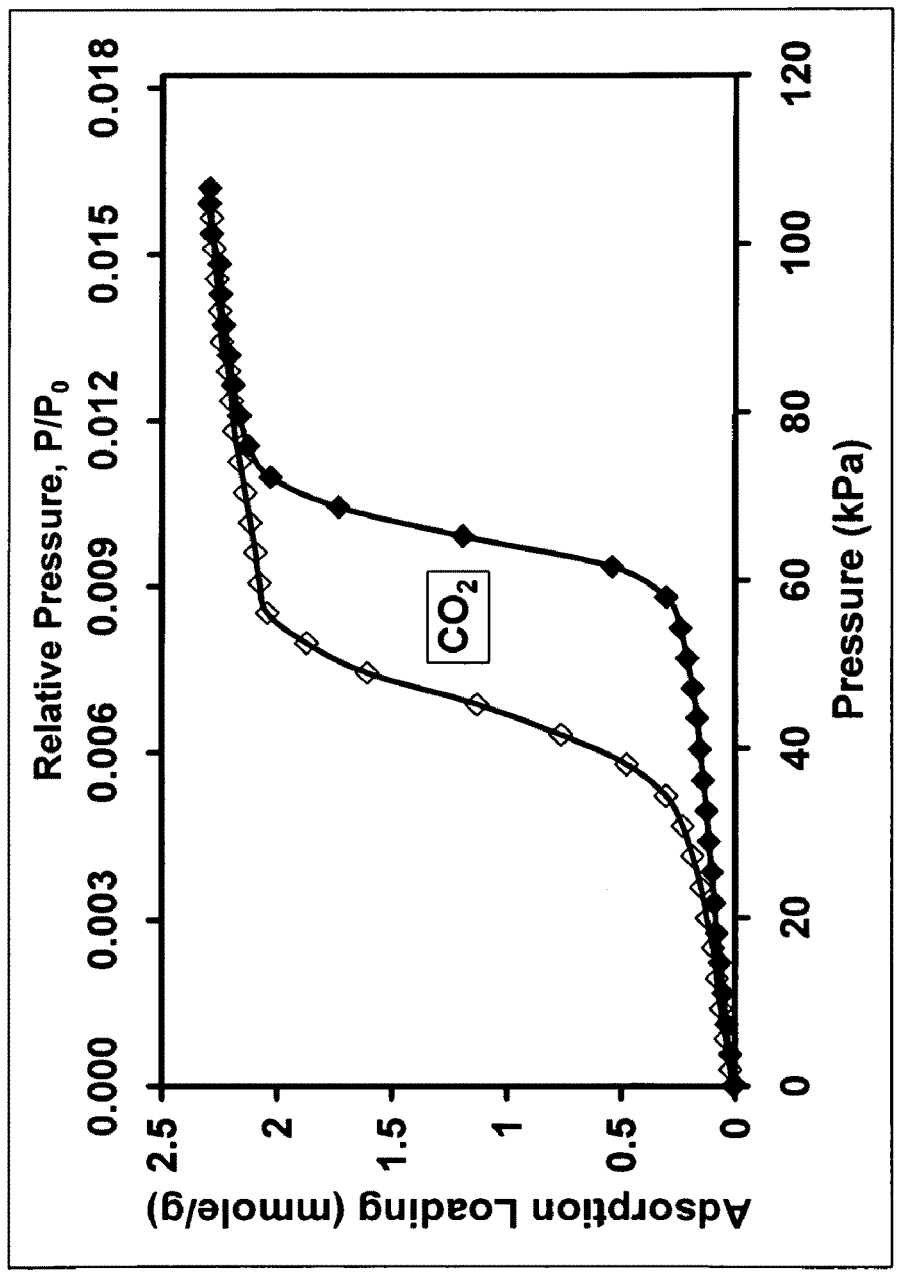
FIG. 12 shows the $CO_2$ adsorption isotherm at 301 K for a ZIF-7 sample of Example 6.

The adsorption isotherm features displayed in FIG. 13 for ZIF-7 have several other advantageous implications for the swing adsorption separation processes of the present invention, as well as for the capture of $CO_2$ present in a combustion gas stream. As also shown in FIG. 12, the absolute $CO_2$ partial pressure region at which the low to high adsorption loading transition takes place is fairly low. When such partial pressure (P) is expressed relative to the saturation pressure of $CO_2$ at the temperature of the test experiment ($P_0$), the transition takes place at a relative $P/P_0$ value of less than 0.01 at 301 K (see upper abscissa in FIG. 12), Such low values of $P/P_0$ make ZIF-7 very attractive for adsorbing $CO_2$ from streams that contain low levels of $CO_2$ that would be difficult to adsorb with more conventional materials that require a higher partial pressure to achieve an acceptable adsorption loading at the same temperature. Even more important from a $CO_2/N_2$ separations standpoint, it is noticed that at the same conditions of pressure and temperature than for $CO_2$, the weaker interactions of $N_2$ with the ZIF-7 structure do not cause the transition to a high loading state. FIG. 13 shows that when $N_2$ is contacted with the ZIF-7 material at pressures as high as 106.6 kPa and 301 K, the adsorption loading remains low, in a Henry's law kind of regime, ultimately giving rise to a high adsorptive loading ratio for $CO_2$ over $N_2$ at those conditions. While it is expected that higher $N_2$ partial pressures could eventually cause the transition to a higher loading state to take place in a material like ZIF-7 at the same temperature of 301 K, one of skill in the art of pressure swing adsorption processes knows that adsorption phenomena are temperature-activated and that the temperature can also be proportionally raised to prevent such transition to occur and thus prevent significant amounts of $N_2$ from loading into the adsorbent material, which is a key objective of the separation process where it is desired to maximize the enrichment of the adsorbent material with the preferred adsorbate component, $CO_2$. It should also be noted that similar characteristics are exhibited by the ZIF-9 material shown in Example 7.

From the previous discussion on the uniqueness of the isotherm shape, particularly the transition from low to high loading, it follows that in preferred embodiments of the present invention, the ZIF material is utilized in a swing adsorption process wherein the applied pressure swing is less than about 300 kPa. In preferred embodiments of the present invention, the ZIF material is utilized in a swing adsorption process wherein the applied pressure swing is less than about 200 kPa, and even more preferably, the ZIF material is utilized in a swing adsorption process wherein the applied pressure swing is less than about 100 kPa. In an even more preferred embodiment of the present invention, these narrow applied pressure swings are incorporated into a pressure swing adsorption ("PSA") process embodiment of the present invention. The term "applied pressure swing" as utilized herein is defined as the difference in the maximum and minimum $CO_2$ partial pressures that are experienced in the adsorbent bed during a swing adsorption cycle.

Figure 15:
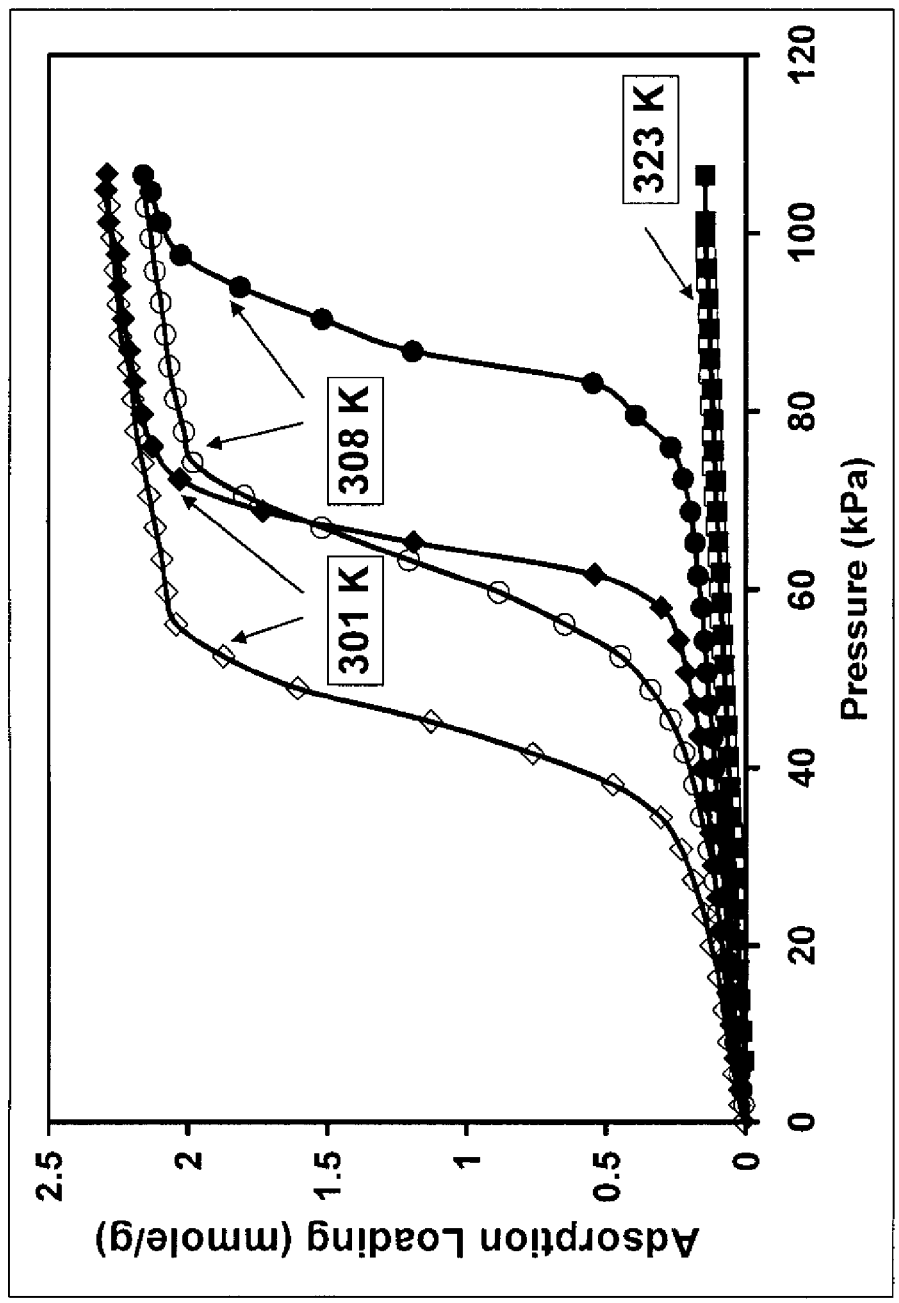
FIG. 15 shows the $CO_2$ adsorption isotherms at 301 K, 308 K, and 323 K for a ZIF-7 sample of Example 6.

The use of temperature to prevent the low to high loading transition in the isotherm is illustrated for $CO_2$ in FIG. 15. This figure contrasts the adsorption isotherms for $CO_2$ in ZIF-7 at three temperatures, namely 301 K, 308 K and 323 K. As the temperature is increased from 301 K to 308 K, both the adsorption and desorption branches remain but are displaced to higher $CO_2$ pressures. When the temperature is further increased to 323 K, the transition does not take place even at pressures of 106.6 kPa, thus confirming the temperature-activated nature of the adsorption process on solid adsorbents such as the ZIFs materials of the present invention. Just as the temperature can be increased to displace or prevent the low to high adsorption loading transition for an adsorbate in a given pressure range (as shown above), the temperature can be alternatively decreased to cause such a low to high adsorption loading transition to take place for an adsorbate in a given pressure range or to displace such transition from a higher pressure to a lower pressure. Such interplay of pressure and temperature can be used to design advantageous swing adsorption schemes of the present invention over a wide range of components pressures in the gaseous feedstreams.

In a particular embodiment of the present invention, the temperature of the process feedstream is reduced prior to contacting the ZIF-containing adsorbent material. This embodiment is particularly beneficial when it is desired to separate $CO_2$ from $CH_4$ in low pressure process feedstreams, especially when the temperatures of the process feedstream may be significant enough to appreciably shift the adsorption and desorption branches to higher $CO_2$ pressures than those experienced at lower temperatures. As can be seen from FIG. 13 herein, ZIF-7, for example, can achieve a significant separation of $CO_2$ from $N_2$ at near ambient temperatures of about 28° C. (301 K) under low $CO_2$ partial pressures conditions of less than about 80 kPa. However, as can be seen from FIG. 15, these adsorption/desorption branches shift to higher required $CO_2$ partial pressures at elevated temperatures. Conversely, by reducing the temperature of the process feedstream prior to contacting the ZIF-containing adsorbent material, significant separation of $CO_2$ from $N_2$ can be achieved at very low pressures due to the corresponding shift of the adsorption and adsorption branches to lower pressures.

Figure 17:
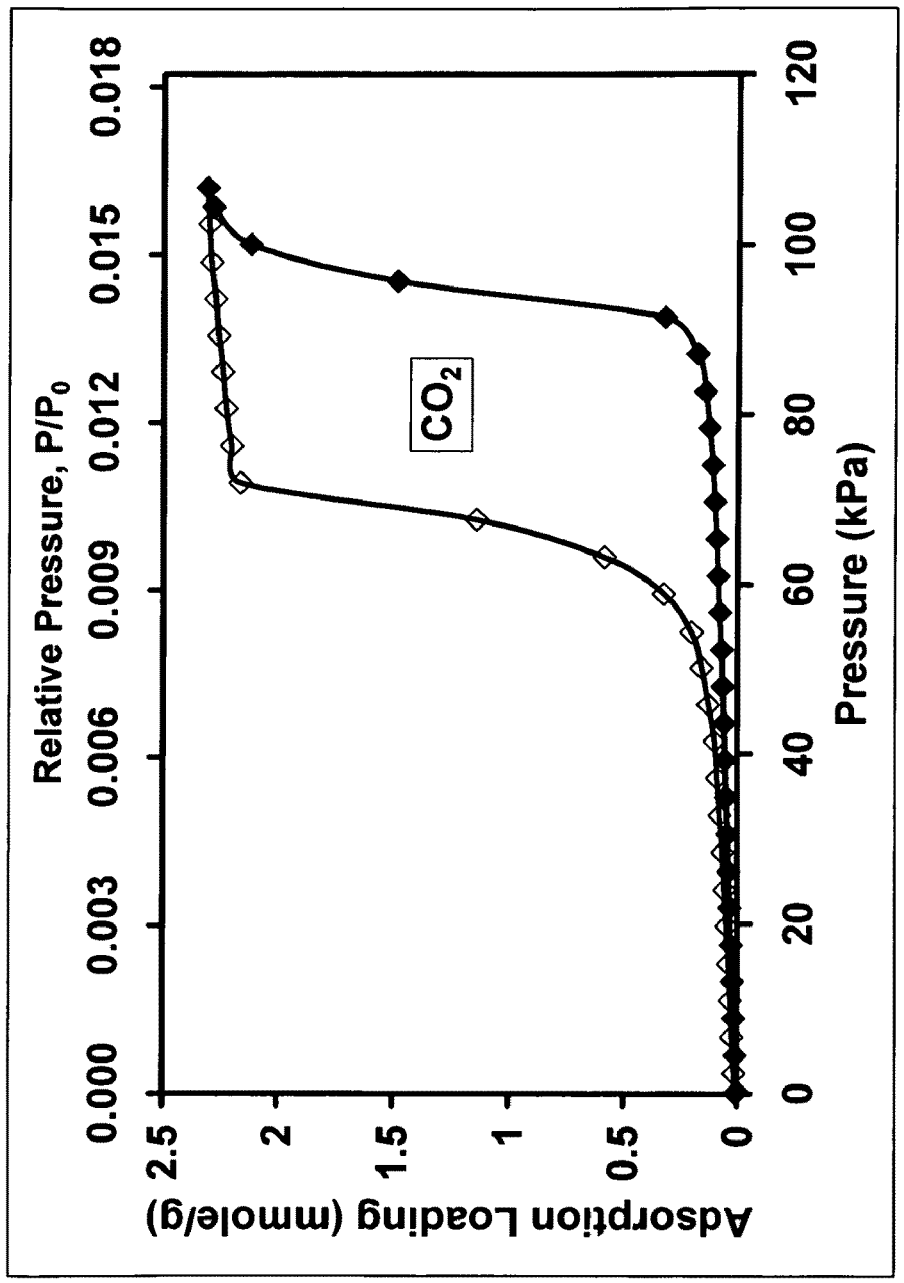
FIG. 17 shows the $CO_2$ adsorption isotherm at 301 K for a ZIF-9 sample of Example 7.
Figure 18:
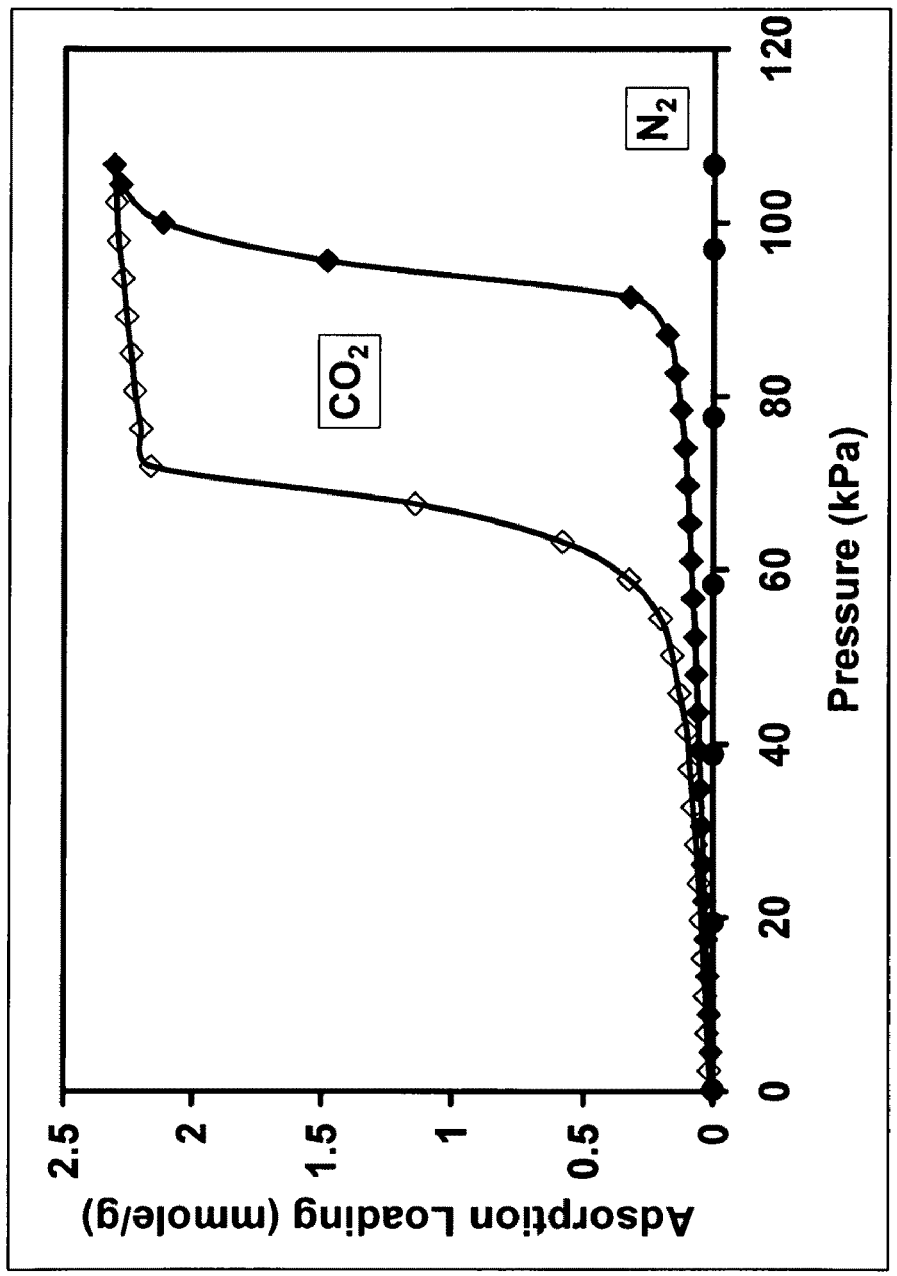
FIG. 18 shows the $CO_2$ adsorption isotherm and the $N_2$ adsorption isotherm at 301 K for a ZIF-9 sample of Example 7.
Figure 19:
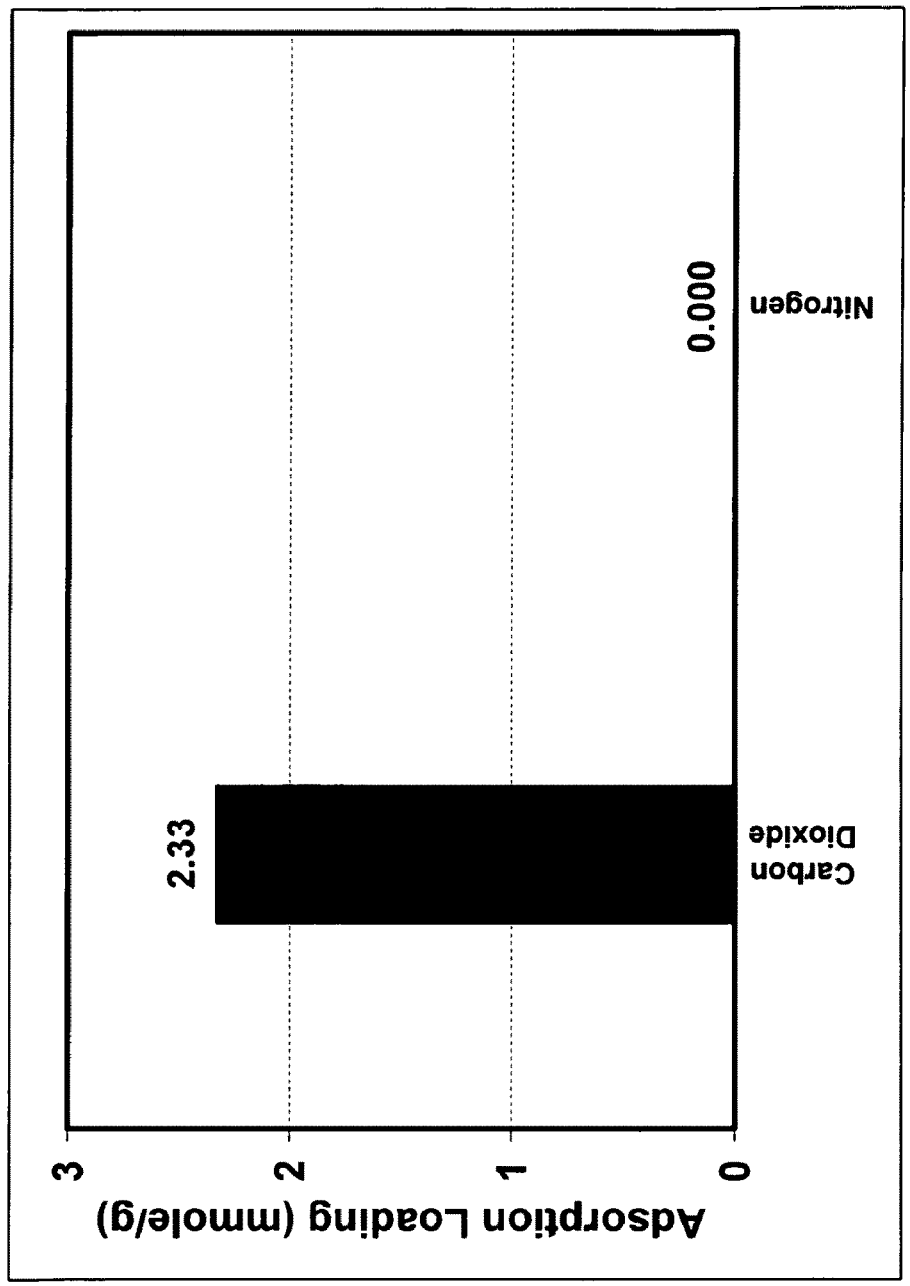
FIG. 19 is a bar graph comparing the adsorption loadings of a ZIF-9 sample of Example 7 for $CO_2$ and $N_2$ at 301 K and 106.6 kPa.

The characteristics, and pressure swing process implications, of the unique adsorption isotherms shown for ZIF-7 in FIGS. 12 and 13 are also applicable to other ZIF materials having different compositions of matter, which exhibit similar energetic interactions with components such as $CO_2$ and $N_2$. Thus, while ZIF-7 contains Zn as the single metal ion, ZIF-9 of Example 2, which contains Co as the single metal ion also exhibits the advantages described herein for ZIF-7 in pressure swing adsorption processes. As described in Examples 1 and 2, both ZIF-7 and ZIF-9 have the same crystal framework structure, SOD. FIGS. 17 and 18 show the corresponding adsorption characterization data for ZIF-9. FIGS. 17 and 18 show that the transition from low to high adsorption loading occurs at a slightly higher $CO_2$ pressure in ZIF-9 (i.e., about 90 kPa) than in ZIF-7 (i.e., about 60 kPa) at the same temperature of 301 K. This difference between ZIF-9 and ZIF-7 simply reflects some small differences in energetics between the corresponding adsorbate-adsorbent pairs but the overall adsorption characteristics are substantially the same. Interestingly, as shown in FIG. 19, the adsorptive loading ratio for ZIF-9 at 301 K and 106.6 kPa approaches infinity (=2.33/0.00), while the corresponding adsorptive loading ratio for ZIF-7 is equal to about 115 (=2.29/0.02) (see FIG. 14). Thus, these results further illustrate the advantages and breadth of applications of the ZIFs materials of the present invention for separating gaseous mixtures containing $CO_2$ and $N_2$ through swing adsorption processes.

A major need in the current industry is for effective gas phase processes for the separation of $CO_2$ from $N_2$ for the recovery of "greenhouse gases" such as $CO_2$ from combustion gas streams. Combustion gas streams include any reaction effluent stream produced by the combustion of fossil fuels for the production of heat and/or energy. Such combustion gas streams are typical in the industry and include industrial processes such as, but not limited to, coal or gas fired power plants, as well as coal or gas fired heating. Following extraction of the heat and/or energy from the combustion process, these combustion gases are often released to the atmosphere. Combustion gas stream compositions can vary significantly depending upon the composition of the fuel source, the combustion process utilized, as well as the process conditions utilized in the process. However, the major components of the combustion gas streams produced by conventional industrial processes (expressed on a water-free basis) will generally range from about 3 to about 25 vol % $CO_2$, from about 65 to about 85 vol % $N_2$, and from about 5 to about 20 vol % $O_2$. Even at these relatively small volume percentages of $CO_2$, the total amount of $CO_2$ emitted to the atmosphere by the combustion of fossil fuels represents about 60% of the global $CO_2$ emissions today ("Advanced Technologies for the Capture of Carbon Dioxide from Flue Gases", S. Chakravarti, A. Gupta, B. Hunek, First National Conference on Carbon Sequestration, Washington D.C., May 15-17, 2001). These combustion gas streams also normally contain varying amounts of $H_2O$ and additional trace contaminants such as, but not limited to, SOx, NOx, and particulates.

Although many of the contaminants in these combustion streams are present at very low quantities, some of them are regulated by emission standards. As a response to these regulatory requirements, there are numerous conventional processes for removing these trace contaminants to very low levels. Conversely, out of the combustion products that comprise a significant fraction of the combustion gas stream composition, the release of $H_2O$ and $N_2$ to the atmosphere is generally not regulated. On the other hand, since $CO_2$ has been identified as a major contributor to "greenhouse gas" emissions, there are increasingly more stringent limitations being implemented on the amount of $CO_2$ that can be generated and released by industrial and commercial combustion based processes. The need to minimize these $CO_2$ emissions to the atmosphere has become an issue of ever increasing importance due to the very large volumes of $CO_2$ that are generated by most conventional fossil fuel combustion processes.

Gas streams can be treated for the removal of $CO_2$ in certain conventional processes, such as amine-based treating technologies. Additionally, $CO_2$ can be sequestered in underground formations, but this usually requires the gas streams containing the $CO_2$ to be compressed to very high pressures of about 500 to about 3,500 psig (3,447 to 24,132 kPa) to be injected into high pressure underground formations. However, both of these processes for the separation and sequestration of the $CO_2$ have problems efficiently operating with the composition of most combustion gas streams. One of the main problems restricting commercially viable $CO_2$ separation and/or sequestration processes is the high nitrogen content present in most combustion gas streams.

Conventional $CO_2$ separation and sequestration processes are additionally hampered by the fact that in order to be economically effective, the $N_2$ must be separated from the $CO_2$ in the combustion gas stream which is produced at very high volumetric rates in these combustion gas streams. Not only are most conventional separation and/or sequestration processes extremely costly from an energy requirement, but many of these processes would require extremely large equipment and land or space requirements to achieve the desired capacity required for these separations. This fact makes the use of conventional processes for separating the $CO_2$ from $N_2$ or sequestering the combustion gas stream prior to significant removal of the $N_2$ content even more economically challenged when used in such "high square footage cost" applications such as use in treating or sequestering combustion gas streams associated with offshore oil and gas platforms. Therefore, there is a great need in the industry for new and improved processes that can efficiently separate $CO_2$ from the $N_2$ in commercial combustion gases as well as a need for these processes to have lower capital cost and square footage requirements than conventionally available processes.

In conventional $CO_2$ removal processes, such as amine treating, as well as in $CO_2$ sequestration processes, it is important to separate out at least a portion of the large quantity of $N_2$ from the $CO_2$ present in the combustion gas stream prior to amine treating or sequestration. If the $N_2$ is not removed prior to amine treating or sequestration, the equipment sizes and process energy required becomes orders of magnitudes larger in order to process the additional amount of $N_2$ which, since it is both an inert and a non-regulated emission, does not require subjection to amine treating or sequestration. Additionally, in some treating processes, such as extraction or reactive removal of $CO_2$, the large additional amount of $N_2$ in the combustion gas streams would significantly lower the $CO_2$ partial pressure, thereby hampering the effectiveness of these processes. Therefore, finding a commercially viable process solution requires a separation process wherein the $CO_2$ is selectively captured from combustion gas streams in order to produce a high concentration $CO_2$ product stream for subsequent sequestration, thereby effectively removing the undesirably large amount of nitrogen that is commonly present in the combustion gas streams.

Since most combustion processes are designed to extract the maximum heat and/or mechanical energy from the combustion gases, the final combustion products to be treated are usually at relatively low temperatures and pressures. The final working pressures of the majority of these combustion gas streams are in the range of about 0.1 to about 50 psig (0.7 to 345 kPa) since these products are typically released to the atmosphere or are or transferred to an enclosed low pressure flare gas or treatment system. Most typically, the majority of the large combustion gas producers release these combustion gas streams to the atmosphere at pressures of about 0.1 to about 10 psig (0.7 to 69 kPa).

These low working pressures of many combustion gas stream pose additional problems to most conventional $CO_2$ removal processes which require significantly greater pressures to treat such streams. In order to function effectively, many of these conventional $CO_2$ removal processes require the use of compression systems to raise the combustion gas pressures to their required process working pressures. Although this can be physically accomplished, the higher the process pressure required for the separation process is, the larger the size and cost of the compression equipment that is required to bring these streams to the required pressure conditions. There is also a corresponding increase in energy required to bring the combustion gas stream to the required process pressure conditions. Therefore, it is also advantageous if a process used to separate the $CO_2$ from the $N_2$ in a combustion gas stream can be performed at relatively low pressures. It is again emphasized that, in addition to the pressure level, the temperature conditions of the temperature-activated pressure swing adsorption process can be suitably chosen optimize the effectiveness of the PSA cycle. Thus, for example, if at a given temperature, the partial pressure of $CO_2$ is insufficient to induce the low to high loading transition on the ZIF material described earlier, the temperature can be suitably reduced to ensure that the cycle operates selectively and under a high working capacity and thus ensure the operation of an effective swing adsorption process.

The results presented in FIGS. 12 and 13 for ZIF-7 and FIGS. 17 and 18 for ZIF-9,which exemplify the ZIF materials of the present invention, clearly show their adequacy for low pressure operation. As can be seen from FIG. 15, in addition to the pressure level of the stream, the temperature level is also critical to the design of a swing adsorption process for optimum separation. As the pressure level decreases, the temperature can also be optionally decreased in order to ensure a significant loading of the adsorbate on the adsorbent material. As discussed prior, this characteristic of the ZIF-containing adsorbent materials can be significant in low-pressure applications of the present invention such as separating $CO_2$ from $N_2$ in combustion gas streams where the pressures may be relatively low as noted above. However, the temperatures at which these streams are produced may be significantly high enough to shift the adsorption/desorption branches to $CO_2$ partial pressures above those required for optimum separations at low pressures. Therefore, in an embodiment of the present invention, the temperature of the combustion gas stream, or a process stream comprised of a combustion gas stream, is reduced prior to contacting the ZIF-containing adsorbent material. In this manner, the compression required to raise the combustion gas to optimum separation conditions for the present invention can be minimized, and in certain embodiments, the need for compression equipment to raise the pressure of the feedstream to the processes of the present invention may be completely eliminated.

It can been seen that in process embodiments of the current invention, that while it may be advantageous to run at higher inlet pressures, the PSA and TSA processes of the present invention can be operated at inlet stream pressures less than about 50 psig (345 kPa), or even less than about 25 psig (172 kPa) due to the significant low pressure adsorption loading characteristics for $CO_2$ of ZIF materials. In some embodiments, the PSA and TSA processes of the present invention may be operated at very low inlet stream pressures of less than about 10 psig (69 kPa), or even less than about 5 psig (34 kPa). At these very low operating pressures, the PSA and TSA processes of the present invention may be incorporated into existing combustion gas process and/or utilized with conventional combustion gas equipment without the need for additional compression. This can potentially save significant system costs, thus making embodiments of the present invention highly cost effective and able to retrofit into existing combustion gas systems without the need for additional combustion gas compression systems.

One embodiment of the present invention is to provide a process feedstream comprising a combustion gas stream to a swing adsorption process wherein the adsorbent material in the swing adsorption process is comprised of a ZIF material that has an adsorptive loading ratio for $CO_2$ over $N_2$ of at least about 5 to remove at least a portion of the $CO_2$ from the process feedstream. In a more preferred embodiment of the present invention, a process feedstream comprising a combustion gas stream is provided to a swing adsorption process wherein the adsorbent material in the swing adsorption process is comprised of a ZIF material that has adsorptive loading ratio for $CO_2$ over $N_2$ of at least about 10. In an even more preferred embodiments of the present invention, the ZIF material utilized in this process has an adsorptive loading ratio for $CO_2$ over $N_2$ of at least about 25,and in a most preferable embodiment of the present invention, the ZIF material utilized in this process has an adsorptive loading ratio for $CO_2$ over $N_2$ of at least 50.

In an embodiment of the swing adsorption process of the present invention, the process feedstream is comprised of a combustion gas stream which contacts an adsorbent material comprised of a ZIF material with an adsorptive loading ratio for $CO_2$ over $N_2$ of at least about 5. A $CO_2$-lean product stream is obtained from the effluent stream from the adsorption step of the swing adsorption process. A $CO_2$-rich product stream is obtained from the desorbed stream from the desorption step of the swing adsorption process. As discussed prior, the $CO_2$ content of a combustion gas stream can typically range from about 3 to about 25 vol % $CO_2$. In preferred embodiments of the present invention, a $CO_2$-lean product stream is obtained as the effluent stream from the separations process wherein the $CO_2$ content is less than 10 vol %, and even more preferably, a $CO_2$-lean product stream is obtained with a $CO_2$ content of less than about 5 vol %. It is desired that when separating the $CO_2$ present in the combustion gas that the processes of the present invention recover a large portion of the $CO_2$ in the $CO_2$-rich product stream thereby allowing the $CO_2$-lean product stream (now rich in $N_2$ and very low in $CO_2$) to pass through as an effluent stream and be exhausted to the atmosphere or to further treatment with a significant reduction in the $CO_2$ greenhouse gas component.

When coupled with the need to sequester the $CO_2$ obtained from the combustion gas stream, it is highly desirable that the $CO_2$-rich product stream be high in $CO_2$ content. This is to minimize both the energy required to pressurize the gas to the high pressures required for sequestration as well as minimize the storage capacity required to contain the $CO_2$. Therefore, in preferred embodiments of the present invention, the $CO_2$-rich product stream has a $CO_2$ content of at least about 50 vol %, more preferably at least about 60 vol %, and most preferably, at least about 70 vol %. As can be seen for example, by producing a 50 vol % $CO_2$-rich product stream by the separation processes of the present invention from a combustion gas with an inlet composition of about 10 vol % $CO_2$, sequestration equipment sizes and storage capacity can be reduced by a factor of about 5 times. Due to the very high volume of $CO_2$ produced in these combustion processes, this can amount to a significant cost reduction over currently available technologies. Additionally, since the required work to compress the $CO_2$-rich product gases is also reduced by a factor of about 5, significant energy savings are also achieved by the present invention over other conventionally available methods.

The terms "sequestration" or "$CO_2$ sequestration" as utilized herein are defined as the confinement of a waste stream containing at least 50 vol % of $CO_2$ in an underground structure, or repository, or in the deep ocean at pressures of at least 500 psig (3,447 kPa). In other preferred embodiments, at least a portion of the $CO_2$-rich product stream obtained from the separation of $CO_2$ from $N_2$ by the present invention is further sequestered at a pressure of at least 500 psig (3,447 kPa), and even more preferably, at least 1000 psig (6,895 kPa).

When sequestering the recovered $CO_2$ separated from the combustion gas streams, in addition to having a high $CO_2$ content it is desirable that the $N_2$ content of the $CO_2$-rich product stream is less than about 20 vol %. In more preferred embodiments of the present invention, a $CO_2$-rich product stream is obtained wherein the $N_2$ content of the $CO_2$-rich product stream is less than 10 vol %, or even more preferably less than about 5 vol %. In other preferred embodiments, the $N_2$ content by vol % of the $CO_2$-lean product stream is less than 25% of the $N_2$ content by vol % of the combustion gas stream. In other preferred embodiments, the $N_2$ content by vol % of the $CO_2$-lean product stream is less than 20%, and more preferably less than 15%, of the $N_2$ content by vol % of the combustion gas stream. In this manner, efficient removal of a large amount of $N_2$ from the combustion gas stream leads to significantly reduced capital and energy costs for treating and/or sequestering the $CO_2$-rich product stream produced by the present invention.

The $CO_2$-rich product stream produced by the present invention also has improved composition for amine treating of the $CO_2$ gases. The increased $CO_2$ content and lower $N_2$ content of the $CO_2$-rich product stream significantly improves the ability of the amine to adsorb $CO_2$ due to the higher available $CO_2$ partial pressure under comparable amine treating conditions. Additionally, the total volume of the overall combustion gas stream to be treated is significantly reduced by the separation of most of the nitrogen which can be in the order of about 65 to about 85 vol % $N_2$ in a typical combustion gas stream. Therefore, the total volume that would be required to be treated in an amine unit can easily be reduced by a factor of about 3 to about 5, resulting in significant capital, chemical and energy savings. Thus in a preferred embodiment of the present invention, at least a portion of the $CO_2$-rich product stream produced from the removal of $CO_2$ from a combustion gas stream is further processed in an amine treating unit.

In another embodiment of the present invention, a swing adsorption process utilizing a ZIF-containing adsorbent material is utilized to separate $CO_2$ from $N_2$ present in the regenerator off-gas of a fluid catalytic cracking ("FCC") unit. FCCs are well known in the industry and the regenerator off-gas can contain a significant amount of $CO_2$ and $N_2$. Similar to the combustion gas processes described prior, most of the regenerator off-gas is emitted to the atmosphere after some treatment for contaminants. However, the conventional treatments typically do not target the removal of $CO_2$ from the regenerator off-gas and therefore have little effect on the overall $CO_2$ emissions. Similar to the combustion gas streams produced in the industry, the FCC regenerators in refineries and chemical plants produce sizable amounts of off-gas streams which can contribute significantly to $CO_2$ emissions and its associated greenhouse effect. These FCC regenerator off-gas streams can also be difficult to treat due to other contaminant compounds and catalyst fines generated from the FCC process.

The FCC regenerator off-gas streams can have similar properties to combustion gas streams described prior, particularly in regard to their total pressures as well as their $CO_2$ and $N_2$ content. These FCC regenerator off-gas streams can therefore be treated by the processes of the present invention to remove at least a portion of the $CO_2$ from the $N_2$, thereby producing a $CO_2$-rich product stream and a $CO_2$-lean product stream in a similar manner and component concentrations as described above for combustion gas streams. In preferred embodiments of the present invention, at least a portion of a FCC regenerator off-gas stream is subjected to a swing adsorption process of the present invention thereby producing a $CO_2$-lean product stream wherein the $CO_2$-lean product stream, or a portion thereof, with a reduced $CO_2$ content is emitted to the atmosphere and the $CO_2$-rich product stream, or a portion thereof, is either sequestered or further processed in an amine treating unit.

Another desirable commercial process embodiment of the separation processes of the present invention is for use in the separation of synthetically produced gas streams that are obtained through a variety of reactive processes that utilize a carbonaceous source and an oxidant and/or heat. These synthetically produced gas streams find use, for example, as synthesis gas for the production of other chemical products and intermediates (e.g., methanol) as well as in the synthesis of higher molecular weight hydrocarbons (e.g., kerosene fuels, aviation grade fuels, diesel grade fuels or lube blending products obtained, for example, via Fischer-Tropsch synthesis) which themselves find use as final products or as intermediates for further functionalization or for the synthesis of other products. Similarly, these synthetically produced gas streams may also target the generation of enriched hydrogen streams for use as fuels (e.g., fuel cells) or for use in the chemical processing of hydrocarbons (e.g., hydrodesulfurization and hydrodenitrogenation). Depending on feed availability, process options and economics, a variety of carbonaceous sources can be used, ranging from gaseous (e.g., natural gas) to liquid (e.g., naphthas, heavy oils and residue, bitumens, or shale oils) to solids (e.g., coal). With respect to the oxygen source, pure oxygen, air, or steam (plus heat) are typically used. In some instances, only heat is applied to the carbonaceous source to produce a "gasification" gas mixture that contains lesser amounts of full combustion products, which may be used as fuel or chemicals. The specific composition of the synthetically produced gas is strongly dependent on the nature of the carbonaceous source, the oxidant and the use of heat (if any). The produced gas typically contains varying amounts of $H_2$, CO, $CO_2$, $H_2O$, $CH_4$ and $N_2$ as majority components and lesser amounts of sulfur and nitrogen containing species (e.g., $H_2S$ and $NH_3$) as well as other contaminants (e.g., COS). In particular, when air is used as an oxidant, the synthetically produced gas streams contain significant amounts on $N_2$, which does not incorporate into any major reaction products, with the exception of the smaller amounts of $NH_3$ formed. Depending on the intended use of the synthetically produced gas, various levels of purification and preconditioning are required. A particularly important step in the production of a synthetically produced gas is the removal of $CO_2$ from the product stream. The $CO_2$ in the synthetically produced gas is generally not beneficial as it does not incorporate into any subsequent reaction products and it does not add heating value. Additionally, the $CO_2$ present in the synthetically produced gas can exist in sufficiently high concentrations that can contribute to the corrosion of processing equipment, as well as contribute to the production of greenhouse gas emissions.

One embodiment of the present invention is to provide a process feedstream comprising a synthetically produced gas to a swing adsorption process wherein the adsorbent material in the swing adsorption process is comprised of a ZIF material that has an adsorptive loading ratio for $CO_2$ over $N_2$ of at least about 5 to remove at least a portion of the $CO_2$ from the process feedstream. In a more preferred embodiment of the present invention, a process feedstream comprising a synthetically produced gas is provided to a swing adsorption process wherein the adsorbent material in the swing adsorption process is comprised of a ZIF material that has an adsorptive loading ratio for $CO_2$ over $N_2$ of at least about 10 to remove at least a portion of the $CO_2$ from the process feedstream. In an even more preferred embodiments of the present invention, the ZIF material utilized in this process has an adsorptive loading ratio for $CO_2$ over $N_2$ of at least about 25, and most preferably an adsorptive loading ratio for $CO_2$ over $N_2$ of at least 50.

In the process embodiment of the present invention above for $CO_2$ removal from synthetically produced gas streams, most of the $N_2$ in the synthetically produced gas inlet stream to the process will pass through the adsorbent material and be recovered in the effluent stream from the process. As described prior, in these processes the operating temperature is preferably chosen to allow the low to high loading transition exhibited in the isotherm for $CO_2$ to occur under the selected process conditions, while preventing this low to high loading transition to occur for $N_2$ under the selected process conditions. Additionally, most of the $H_2$ in the synthetically produced gas inlet stream to the process will pass through the adsorbent material and be recovered in the effluent stream from the process. The $N_2$ in the obtained effluent stream can then be separated from the $H_2$ by conventional methods resulting in a higher purity $H_2$ stream. The $H_2$ stream thus obtained can be directly utilized as a final product or mixed with a carbon monoxide stream for use in further synthesis steps for the catalytic production, for example, of methanol or other liquid hydrocarbon products.

In a preferred embodiment of the present invention, the effluent stream (or "$CO_2$-lean product stream") produced in the process above for the removal of $CO_2$ from a synthetically produced gas contains less than about 5 vol % $CO_2$, and even more preferably less than about 3 vol % $CO_2$. It should also be noted, that as described above, there may be significant quantities of water and contaminants, such as, but not limited to $H_2S$ and $NH_3$, which may be physically damaging or operationally hindering to the any of the embodiments of the ZIF-containing separations processes of the present invention. Therefore, in preferred embodiments of the present invention, a portion of the contaminants are removed prior to contacting the target stream with the ZIF-containing process. There are many conventional processes that are known to those of skill in the art for the removal of such contaminants that may be utilized in conjunction with the processes of the present invention to reduce the concentration of these contaminants to acceptable levels prior to contacting the ZIF or ZIF-containing adsorbent materials disclosed herein.

It should be noted that although the processes of the present invention for separation of combustion gas streams, FCC regenerator off-gas streams, and synthetically produced gas streams has been explained above in the terms of a swing adsorption configuration, the ZIF-containing membranes described above may also be utilized under similar process inlet conditions to selectively separate $CO_2$ from $N_2$, and produce similar composition product streams as disclosed in the swing adsorption process embodiments above. In the processes utilizing ZIF-containing membranes to separate $CO_2$ from $N_2$ in a process feedstream containing both components, it is desirable that the $CO_2$ selectively permeates through the ZIF-containing membrane process producing at least one $CO_2$-rich permeate stream wherein the $CO_2$-rich permeate stream has a higher vol % of $CO_2$ than the process feedstream that contacts the ZIF-containing membrane. Additionally, at least one $CO_2$-lean retentate stream is also produced by the process wherein a $CO_2$-lean retentate stream has a lower vol % of $CO_2$ than the process feedstream. The stream compositions, separations selectivities and properties of the final products produced by the ZIF-containing membrane process embodiments of the present invention are similar to those identified in the swing adsorption process embodiments described above.

Another important process in the industry concerning greenhouse gases, such as $CO_2$, is the sequestration of at least a portion of the $CO_2$ removed from a process stream. The terms "sequestration" or "$CO_2$ sequestration" as utilized herein are defined as the confinement of a waste stream containing at least 50 vol % of $CO_2$ in an underground structure, or repository, or in the deep ocean at pressures of at least 500 psig (3,447 kPa). Depending upon the sequestration process utilized, it may be desirable that the separation process of the present invention be operated so as to produce a high concentration of $CO_2$ in the $CO_2$-rich stream. This is especially desirable when high volumes of $CO_2$ are produced in a process, for example, but not limited to, combustion gas streams and FCC regenerator off-gas streams produced by industrial processes. Here, it is important that the gas stream to be sequestered contains a large concentration of $CO_2$ in order to reduce the size of the handling and compression equipment required as well as to reduce the energy costs associated with the sequestration of the $CO_2$. Reducing the overall volume of the gas stream to be sequestered also has the benefit of minimizing the storage requirements necessary for this sequestration.

However, the need to separate and sequester a portion of the $CO_2$ that is present in a process stream can apply to any process wherein $CO_2$ is produced as an unwanted by-product. In some of these processes, it is more important that a high percentage of the $CO_2$ produced by a process be separated and sequestered so that the $CO_2$ released to the atmosphere and/or the residual $CO_2$ remaining in the process gas is minimized. In this case, the separation processes of the present invention may be designed to minimize the amount of $CO_2$ that remains in the $CO_2$-lean product stream produced. As such, the $CO_2$-rich product stream produced by any of the separation process embodiments of the present invention can be further sequestered.

In preferred embodiments of the present invention at least a portion of the $CO_2$-rich stream produced by the separation process of the current invention is sequestered. In preferred embodiments, the $CO_2$-rich stream that is produced has a $CO_2$ content of at least 75 vol % wherein at least a portion of the $CO_2$-rich stream is sequestered. In a more preferred embodiment, the $CO_2$-rich stream has a $CO_2$ content of at least 85 vol % wherein at least a portion of the $CO_2$-rich stream is sequestered. In other preferred embodiments of the present invention, the $CO_2$-lean product stream obtained has a $CO_2$ content of less than about 5 vol %, and more preferably less than about 2 vol %. The utilization of this process embodiment is particularly beneficial wherein the $CO_2$-lean stream is released to the atmosphere as an exhaust stream.

Although the present invention has been described in terms of specific embodiments, it is not so limited. Suitable alterations and modifications for operation under specific conditions will be apparent to those skilled in the art. It is therefore intended that the following claims be interpreted as covering all such alterations and modifications as fall within the true spirit and scope of the invention.

The Examples below are provided to illustrate the synthesis and the adsorption properties of a few select zeolitic imidazolate framework materials to illustrate the benefits of the present invention. These Examples only illustrate specific embodiments of the present invention and are not meant to limit the scope of the current invention.

EXAMPLES

In the following Examples 1 through 5, small amounts of Zeolitic Imidazolate Frameworks (or "ZIFs") samples were synthesized for use in testing for adsorption and separations processes that are described in detail in Examples 6 through 10. ZIFs are a unique type of microporous crystalline structures having framework topologies commonly found in zeolites and/or in other crystalline materials wherein each vertex is comprised of a single metal ion and each pair of connected adjacent vertices of the framework structure are linked by the nitrogen atoms of an imidazolate anion or its derivative. Each ZIF material with a specific type of solvent occluded is characterized by a unique X-ray diffraction pattern. However, due to the porous and flexible nature of ZIF framework structures, the X-ray diffraction pattern can be altered upon solvent-exchange or desolvation. The ZIF materials used in the gas adsorption screening studies were prepared according to published procedures with slight modifications in reaction scale and/or sample activation; see reference Park, K. S.; Ni, Z.; Côté, A. P.; Choi, J. Y.; Huang, R.; Uribe-Romo, F. J.; Chae, H. K.; O'Keeffe, M.; Yaghi, O. M. *Proc. Natl. Acad. Sci. U.S.A.* 2006, 103, 10186-10191,which is incorporated herein by reference and herein referred to as the "Park Reference".

The examples of ZIF materials provided herein are not meant to be limiting of the present invention in any manner. The general synthesis and structural characterization of some of the ZIF materials applicable to the present invention are presented in United States Patent Publication No. US2007/0202038A1 which is herein incorporated by reference.

Detailed synthesis procedures are described below in Examples 1 through 5 for selected ZIF materials.

Example 1

In this example, a ZIF-7 material was synthesized. The framework of ZIF-7 has a chemical composition of $ZnL_2$ (wherein L=benzimidazolate, i.e., the anion of benzimidazole) and a topology defined by the Zn cations that is identical to the zeolitic framework type SOD. SOD is a three-letter framework type code as defined by the International Zeolite Association ("IZA") in the "Atlas of Zeolite Framework Types" (Ch. Baerlocher, L. B. McCusker, D. H. Olson, Sixth Revised Edition, Elsevier Amsterdam, 2007).

In the synthesis of the ZIF-7 material, 9.00 g of zinc nitrate tetrahydrate ($Zn(NO_3)_2.4H_2O$, 34.4 mmol) and 3.00 g of Benzimidazole (25.4 mmol) were dissolved in 900 ml DMF (N,N-Dimethylformamide) in a 1 liter glass jar. The jar was tightly capped and the reaction mixture was heated in an isothermal oven at 373 K for 48 hours. After reaction, the mother liquor was decanted. The solid crystallized on the side wall and the bottom part of the jar was collected, washed with and stored in DMF and labeled "as-synthesized ZIF-7".

In order to activate the ZIF-7, the as-synthesized solid was heated under vacuum at 473 K for 24 hours, transferred to a 120 ml vial, immersed in acetonitrile (c.a. 100 ml) and soaked at 348 K for 48 hours. The acetonitrile-exchanged ZIF-7 was loaded in a glass tube and evacuated on a vacuum line apparatus at room-temperature for 16 hours to remove the solvent molecules residing in its pores. 2.10 g of activated ZIF-7 was obtained, corresponding to 55% yield (based on Benzimidazole).

For gas adsorption experiments, the acetonitrile-exchanged ZIF-7 was loaded directly in the sample holder of the gravimetric gas-adsorption unit and activated in-situ by using the conditions described in Example 6.

FIG. 1 shows a comparison of the experimental powder X-ray diffraction ("PXRD") patterns of the as-synthesized and the acetonitrile-exchanged ZIF-7 samples and the calculated PXRD pattern (shown as the stick pattern) based on the single crystal structure of ZIF-7 reported in the "Park Reference" as referenced herein. The PXRD patterns as shown in FIG. 1 are plotted as the diffraction intensity (in arbitrary units) against the diffraction angle two theta (in degrees).

The high purity of the as-synthesized ZIF-7 sample is evidenced by the coincidence of experimental and calculated PXRD patterns. It is worth noting the slight differences between the two experimental PXRD patterns of ZIF-7. The pattern of as-synthesized ZIF-7 is indexed to rhombohedral space group $R\bar{3}$, a=b=22.927 Å, c=15.603 Å whereas the pattern of acetonitrile-exchanged ZIF-7 is indexed to the same space group with a=b=22.522 Å and c=15.760 Å. The data suggest a slight distortion of the unit cell of ZIF-7 upon solvent-exchange.

Figure 2:
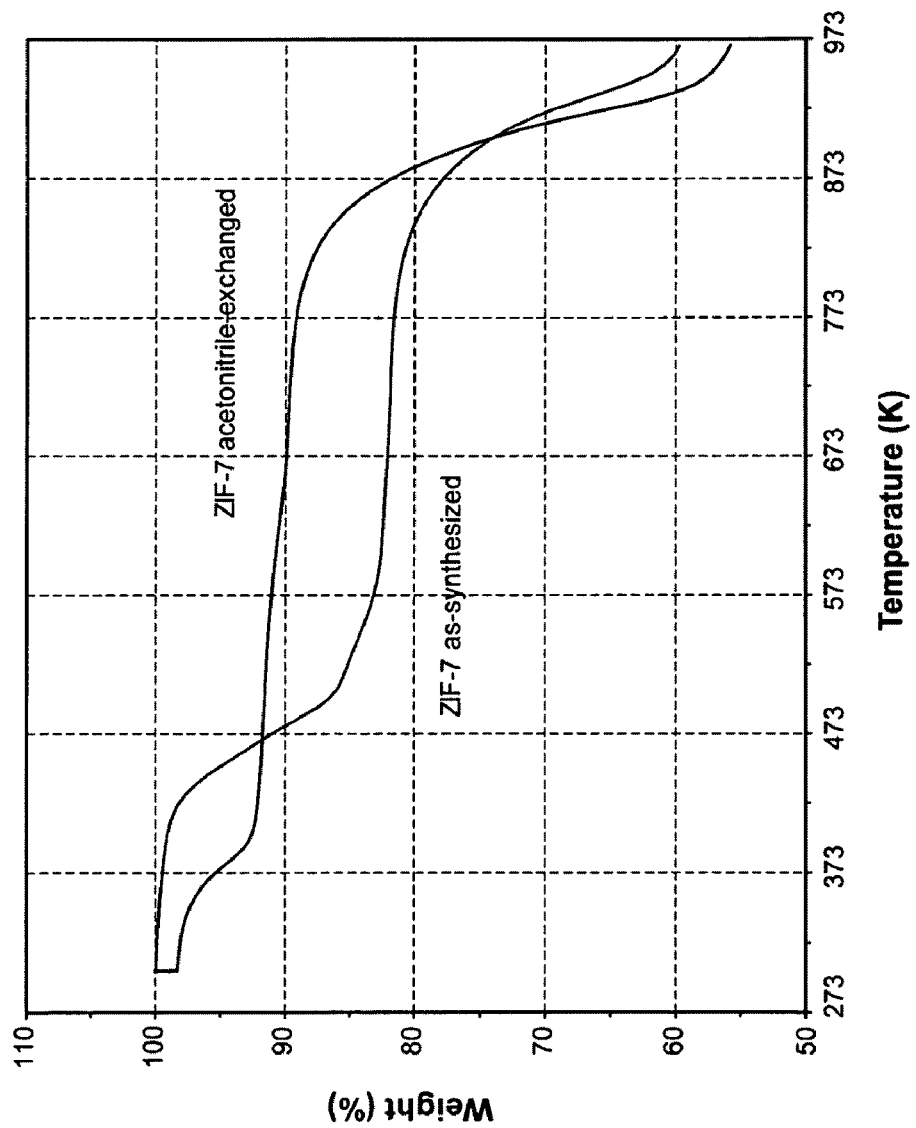
FIG. 2 shows the thermogravimetric analyses ("TGA"s) for the as-synthesized and acetonitrile-exchanged ZIF-7 samples of Example 1 herein.

FIG. 2 shows the thermogravimetric analyses ("TGA") for the as-synthesized and the acetonitrile-exchanged ZIF-7 samples in nitrogen atmosphere. The activation conditions described above were chosen based on TGA data.

Figure 11:
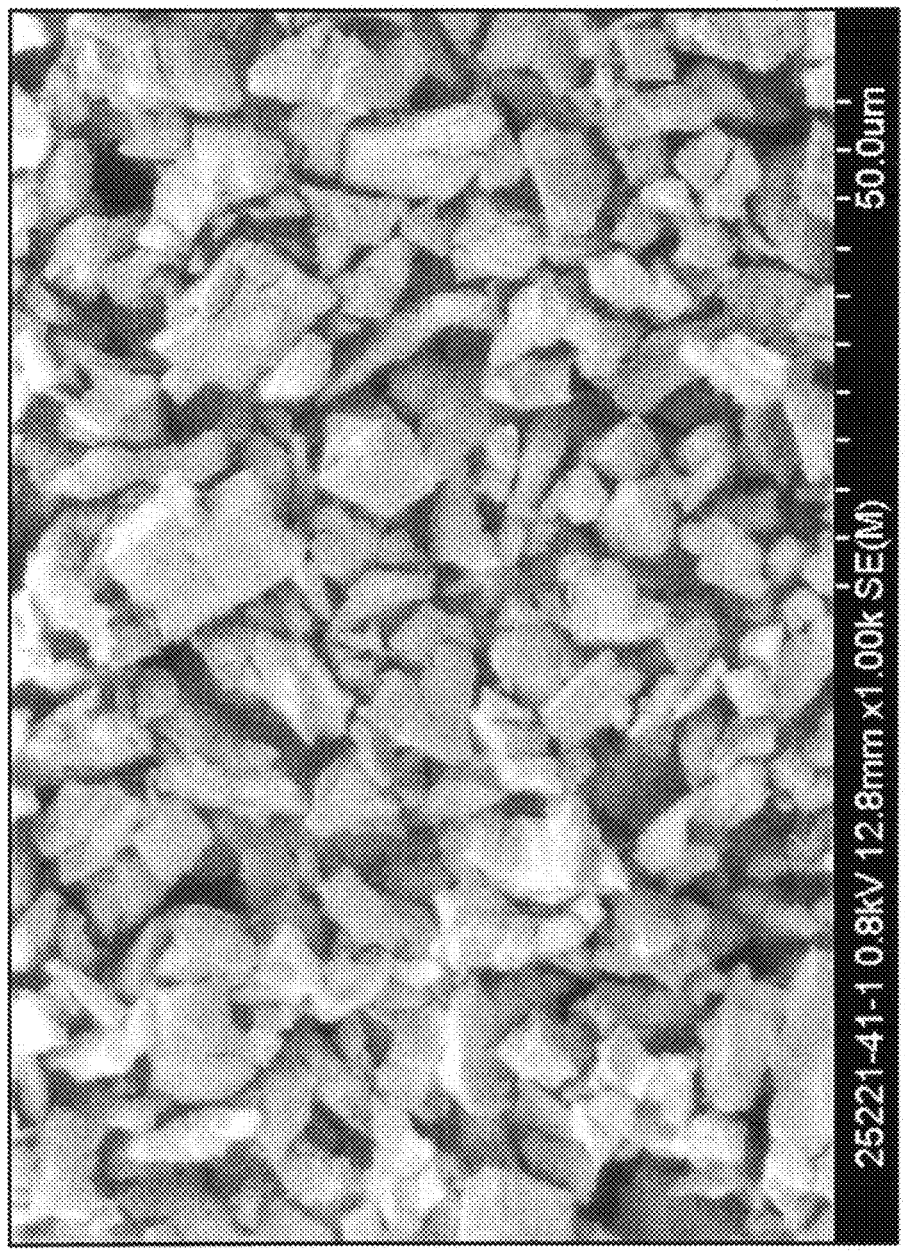
FIG. 11 is a Scanning Electron Microscopy ("SEM") image of a ZIF-7 sample of Example 6.

FIG. 11 is a Scanning Electron Microscopy ("SEM") image of a sample of ZIF-7 produced.

Example 2

In this example, a ZIF-9 material was synthesized. The framework of ZIF-9 has a chemical composition of $CoL_2$ (wherein L=benzimidazolate, i.e., the anion of benzimidazole) and a topology defined by the Co cations that is identical to the zeolitic framework type SOD. SOD is a three-letter framework type code as defined by the International Zeolite Association ("IZA") in the "Atlas of Zeolite Framework Types" (Ch. Baerlocher, L. B. McCusker, D. H. Olson, Sixth Revised Edition, Elsevier Amsterdam, 2007).

In the synthesis of the ZIF-9 material, 1.26 g of cobalt nitrate hexahydrate ($Co(NO_3)_2.6H_2O$, 4.33 mmol) and 0.360 g of Benzimidazole (3.05 mmol) were dissolved in 108 ml DMF (N,N-Dimethylformamide) in a 120 ml vial. The vial was tightly capped and the reaction mixture was heated in an isothermal oven at 373 K for 96 hours. After reaction, the mother liquor was decanted. The solid crystallized on the side wall and the bottom part of the jar was collected, washed with and stored in DMF and labeled "as-synthesized ZIF-9".

In order to activate the ZIF-9, the as-synthesized solid was heated under vacuum at 473 K for 24 hours, transferred to a 20 ml vial, immersed in acetonitrile (c.a. 15 ml) and soaked at 348 K for 48 hours. The acetonitrile-exchanged ZIF-9 was loaded in a glass tube and evacuated on a vacuum line apparatus at room-temperature for 16 hours to remove the solvent molecules residing in its pores. 0.07 g of activated ZIF-9 was obtained, corresponding to 15% yield (based on Benzimidazole).

For gas adsorption experiments, the acetonitrile-exchanged ZIF-9 was loaded directly in the sample holder of the gravimetric gas adsorption unit and activated in-situ by using the conditions described in Example 7.

Figure 3:
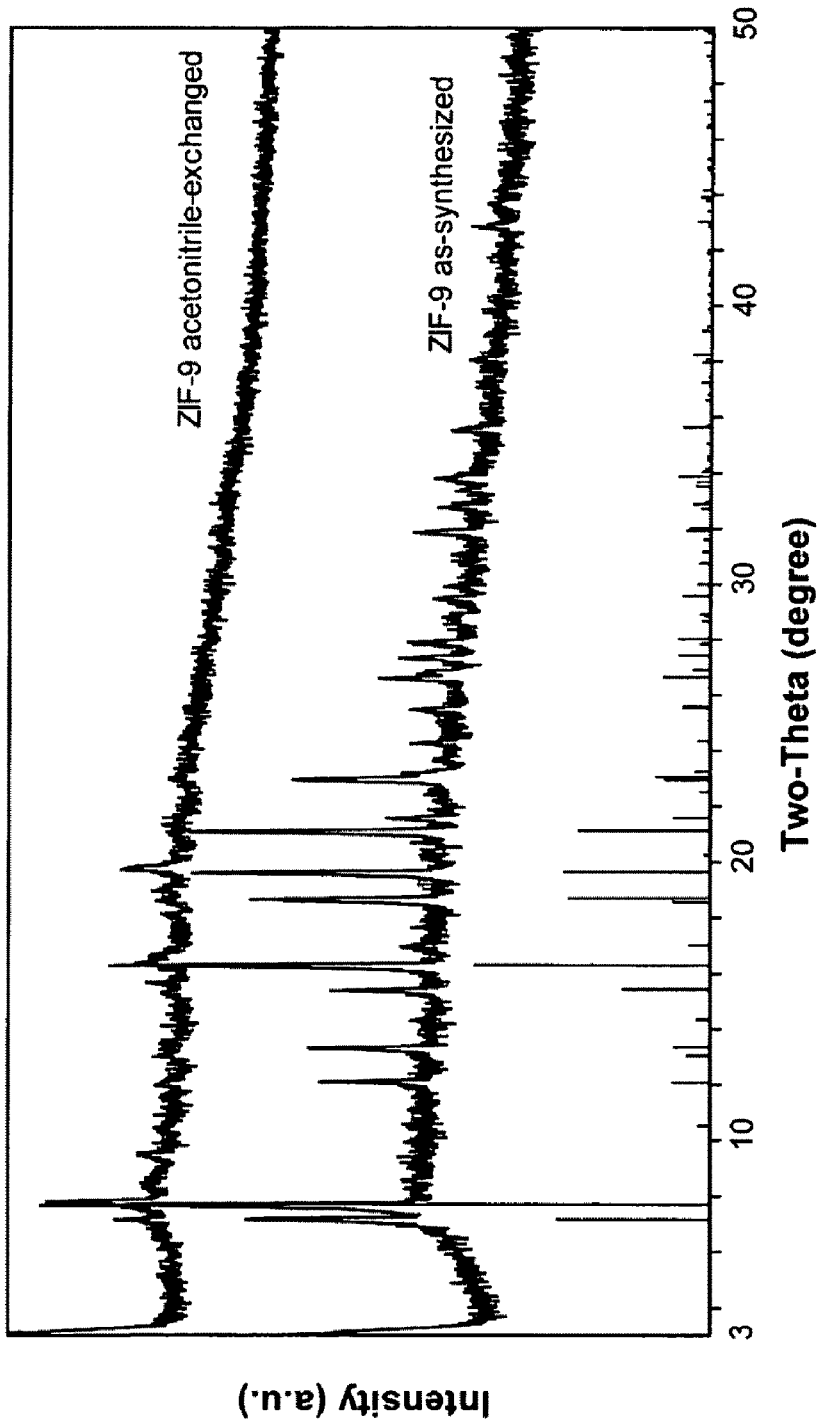
FIG. 3 is the experimental powder X-ray diffraction ("PXRD") patterns of the as-synthesized and acetonitrile-exchanged ZIF-9 samples of Example 2 herein. The calculated PXRD pattern (shown as the vertical stick patterns in the figure) for ZIF-9 based on the single crystal structure of ZIF-9 reported in the "Park Reference" as referenced herein is also shown in the figure.

FIG. 3 shows a comparison of the experimental powder X-ray diffraction ("PXRD") patterns of the as-synthesized and the acetonitrile-exchanged ZIF-9 samples and the calculated PXRD pattern (shown as the stick pattern) based on the single crystal structure of ZIF-9 reported in the "Park Reference" as referenced herein. The PXRD patterns as shown in FIG. 3 are plotted as the diffraction intensity (in arbitrary units) against the diffraction angle two theta (in degrees).

The high purity of the as-synthesized ZIF-9 sample is evidenced by the coincidence of experimental and calculated PXRD patterns. The relatively large background in the PXRD pattern of the as-synthesized ZIF-9 sample cannot be attributed to the existence of amorphous impurities because only purple cubic crystals are observed within the sample by optical microscopy. The PXRD data suggests that Co-containing ZIF-9 is intrinsically of lower crystallinity when compared to its isomorphous Zn-containing material ZIF-7 (comparing FIGS. 1 and 3).

Figure 4:
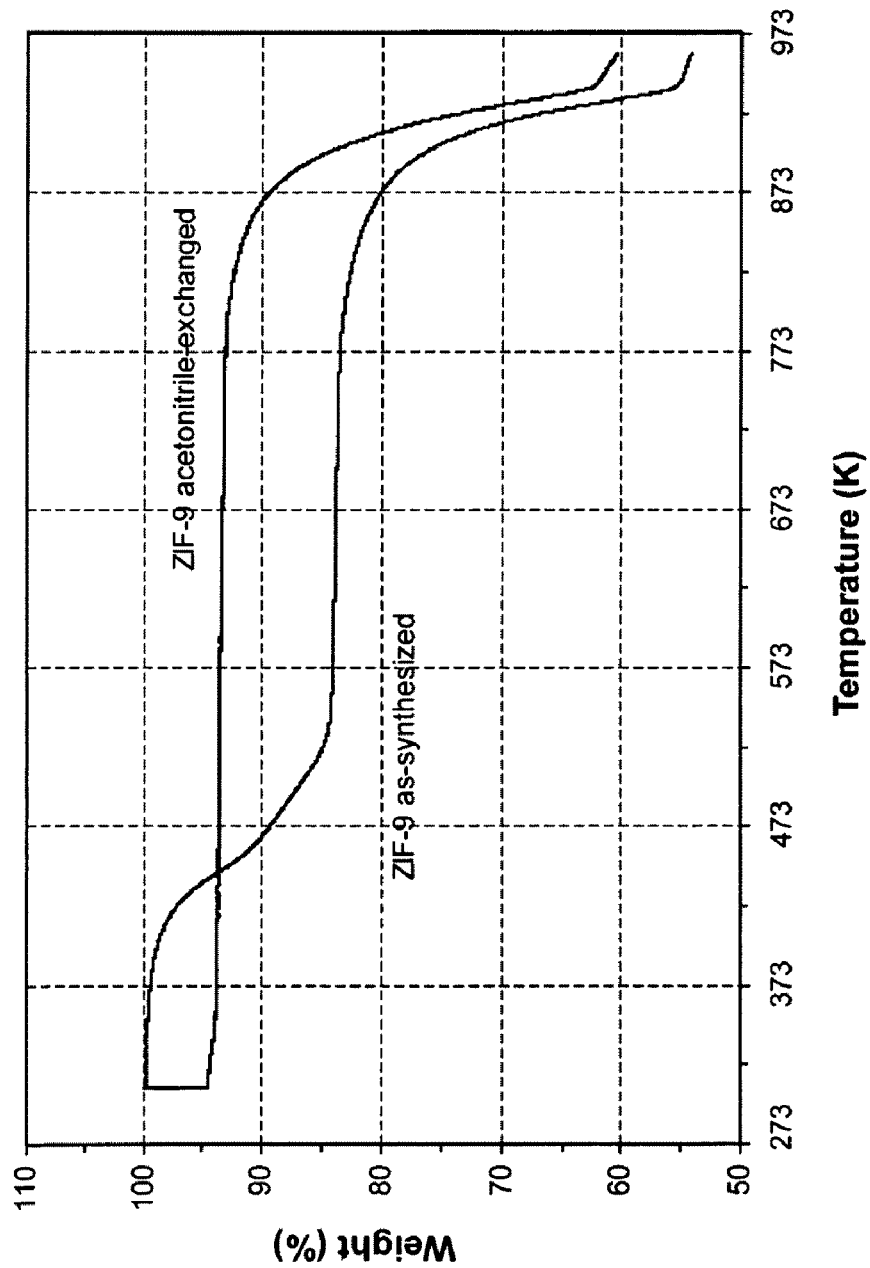
FIG. 4 shows the thermogravimetric analyses ("TGA"s) for the as-synthesized and acetonitrile-exchanged ZIF-9 samples of Example 2 herein.

FIG. 4 shows the thermogravimetric analyses ("TGA") for the as-synthesized and the acetonitrile-exchanged ZIF-9 samples in nitrogen atmosphere. The activation conditions described above were chosen based on TGA data.

Figure 16:
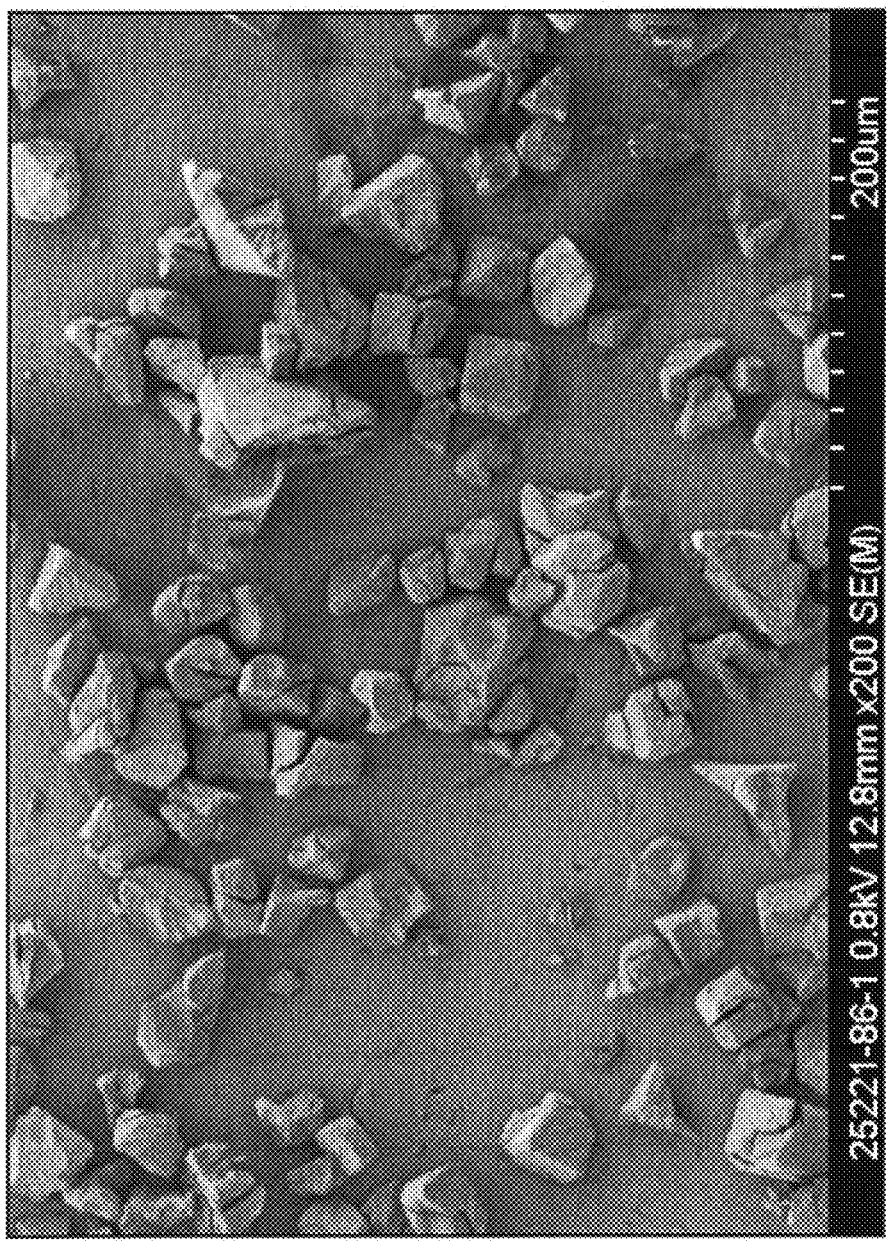
FIG. 16 is a Scanning Electron Microscopy ("SEM") image of a ZIF-9 sample of Example 7.

FIG. 16 is a Scanning Electron Microscopy ("SEM") image of a sample of ZIF-9 produced.

Example 3

In this example, a ZIF-1 material was synthesized. The framework of ZIF-1 has a chemical composition of $ZnL_2$ (wherein L=imidazolate, i.e., the anion of imidazole) and a topology defined by the Zn cations that is identical to the zeolitic framework type BCT. BCT is a three-letter framework type code as defined by the International Zeolite Association ("IZA") in the "Atlas of Zeolite Framework Types" (Ch. Baerlocher, L. B. McCusker, D. H. Olson, Sixth Revised Edition, Elsevier Amsterdam, 2007).

In the synthesis of the ZIF-1 material, 1.25 g of zinc nitrate tetrahydrate ($Zn(NO_3)_2.4H_2O$, 4.77 mmol) and 2.75 g of Imidazole (40.4 mmol) were dissolved in 100 ml DMAc (N,N-Dimethylacetamide) in a 120 ml glass vial. The vial was tightly capped and the reaction mixture was heated in an isothermal oven at 358 K for 72 hours. After reaction, the mother liquor was decanted. The solid crystallized on the side wall and the bottom part of the vial was collected and washed with DMF (N,N-Dimethylformamide) to remove any residual mother liquor. The product was then transferred to a 20 ml vial, stored in DMF and labeled "as-synthesized ZIF-1".

In order to activate the ZIF-1, the as-synthesized solid was immersed in acetonitrile (c.a. 15 ml) for a total of 72 hours. The solvent volume was replaced every 24 hours. The acetonitrile-exchanged ZIF-1 was loaded in a glass tube and evacuated on a vacuum line apparatus at room temperature for 16 hours to remove the solvent molecules residing in its pores. 0.13 g of activated ZIF-1 was obtained, corresponding to 14% yield (based on zinc nitrate tetrahydrate). Alternatively, the as-synthesized ZIF-1 was activated by exchanging with toluene followed by heating under vacuum at 443 K for 2 hours.

For gas adsorption experiments, the acetonitrile-exchanged or toluene-exchanged ZIF-1 was loaded directly in the sample holder of the gravimetric gas adsorption unit and activated in-situ by using the conditions described in Example 8.

Figure 5:
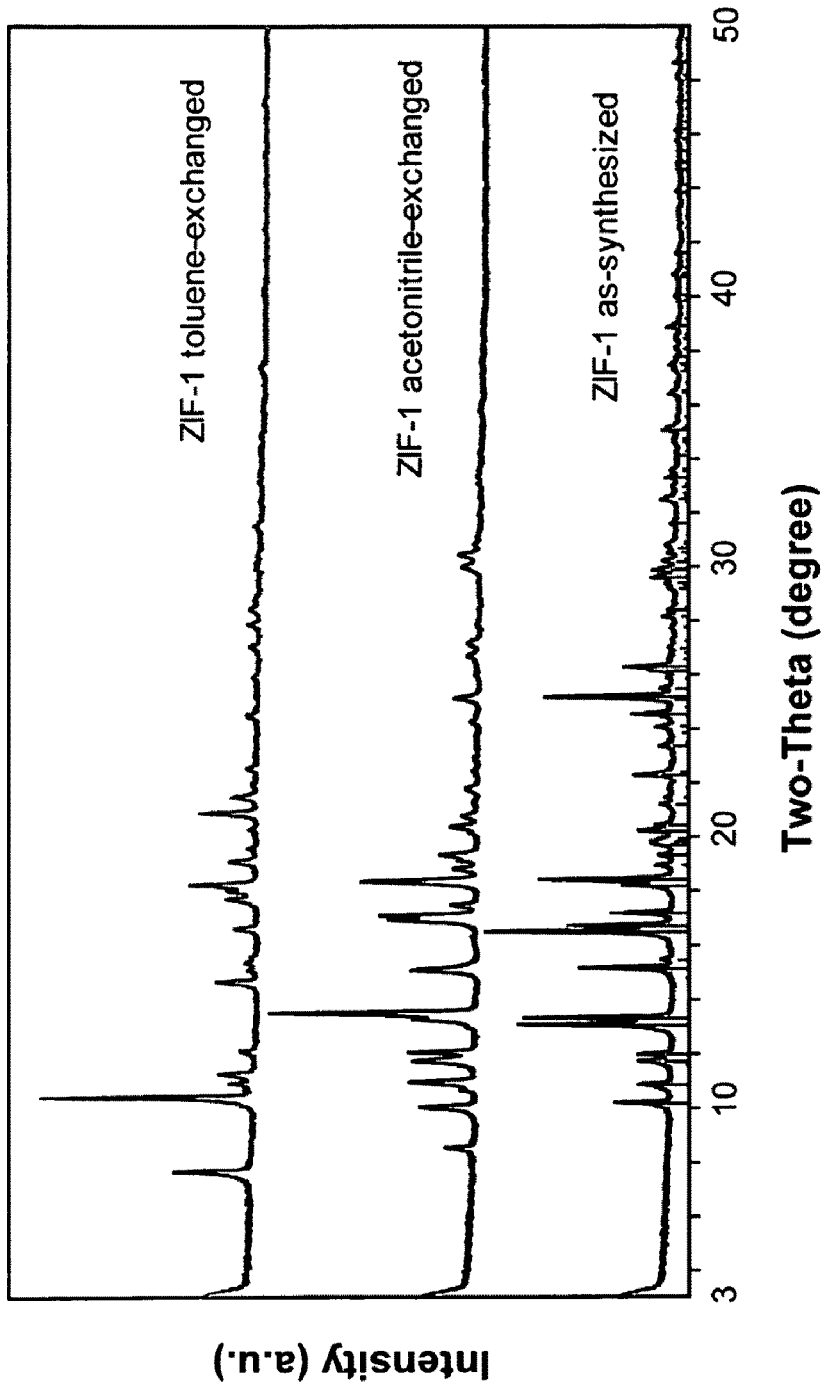
FIG. 5 is the experimental powder X-ray diffraction ("PXRD") patterns of the as-synthesized, the acetonitrile-exchanged and the toluene-exchanged ZIF-1 samples of Example 3 herein. The calculated PXRD pattern (shown as the vertical stick patterns in the figure) for ZIF-1 based on the single crystal structure of ZIF-1 reported in the "Park Reference" as referenced herein is also shown in the figure.

FIG. 5 shows a comparison of the experimental powder X-ray diffraction ("PXRD") patterns of the as-synthesized, the acetonitrile-exchanged and the toluene-exchanged ZIF-1 samples and the calculated PXRD pattern (shown as the stick pattern) based on the single crystal structure of ZIF-1 reported in the "Park Reference" as referenced herein. The PXRD patterns as shown in FIG. 5 are plotted as the diffraction intensity (in arbitrary units) against the diffraction angle two theta (in degrees).

The high purity of the as-synthesized ZIF-1 sample is evidenced by the coincidence of experimental and calculated PXRD patterns. It is worth noting the differences between the three experimental PXRD patterns of ZIF-1. The pattern of as-synthesized ZIF-1 is indexed to monoclinic space group $P2_1/c$, a=9.699 Å, b=15.185 Å, c=16.555 Å, $\beta$=116.9° whereas the pattern of acetonitrile-exchanged ZIF-1 is indexed to the same space group with a=10.098 Å, b=14.649 Å, c=17.300 Å, $\beta$=119.50° and pattern of toluene-exchanged ZIF-1 is indexed to a space group of orthorhombic symmetry Pnn2 with a=15.708 Å. b=9.455 Å, c=16.969 Å. The data suggest distortions of the unit cell of ZIF-1 upon solvent-exchange. We point out that high-symmetry analog of ZIF-1 does exist. The single crystal structure of such a component was reported in the "Park Reference" as referenced herein (ZIF-2 having the same framework topology as ZIF-1,orthorhombic, Pbca, a=9.679 Å. b=24.114 Å, c=24.450 Å).

Figure 6:
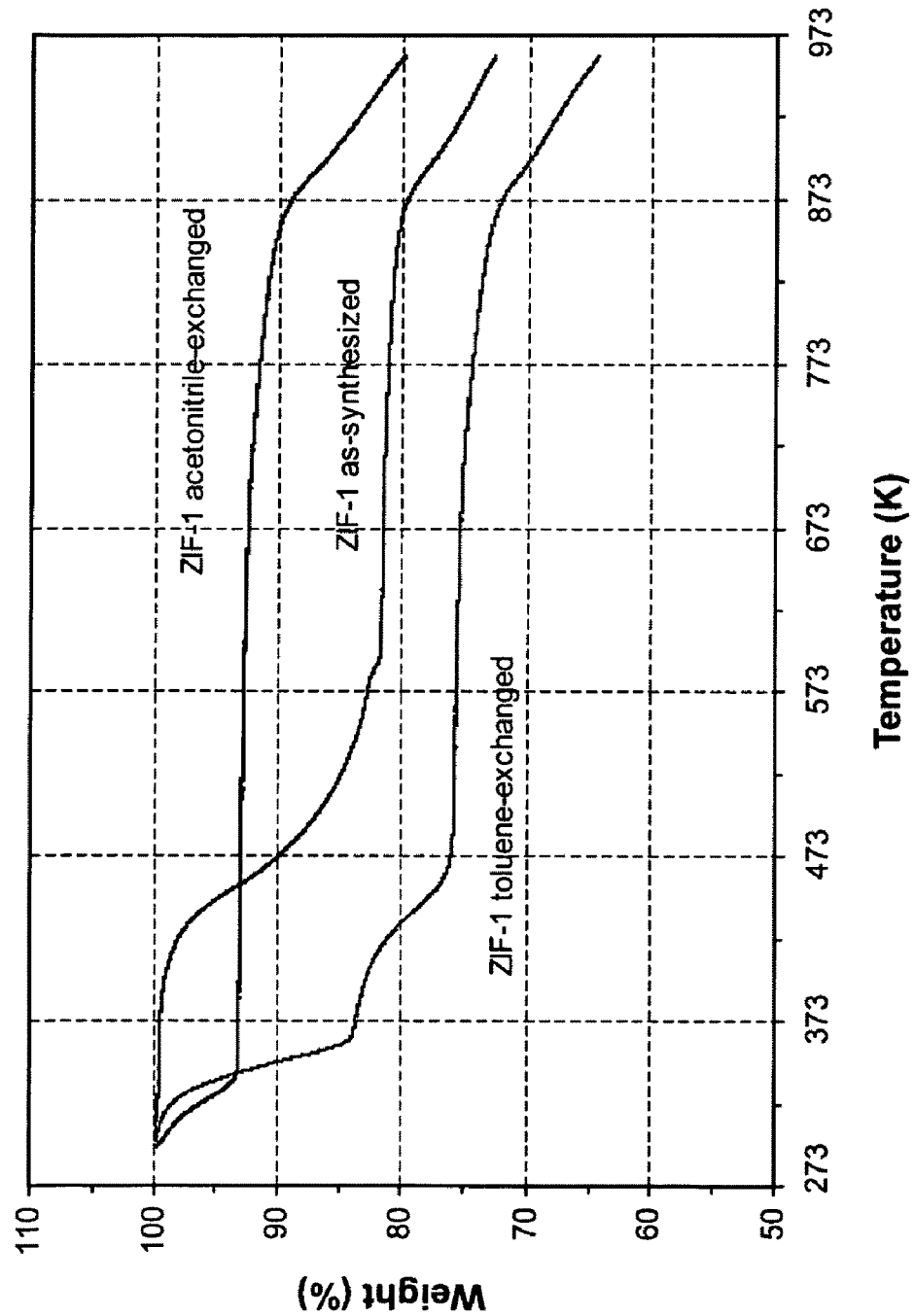
FIG. 6 shows the thermogravimetric analyses ("TGA"s) for the as-synthesized, the acetonitrile-exchanged and the toluene-exchanged ZIF-1 samples of Example 3 herein.

FIG. 6 shows the thermogravimetric analyses ("TGA") for the as-synthesized, the acetonitrile-exchanged and the toluene-exchanged ZIF-1 samples in nitrogen atmosphere. The activation conditions described above were chosen based on TGA data.

Figure 20:
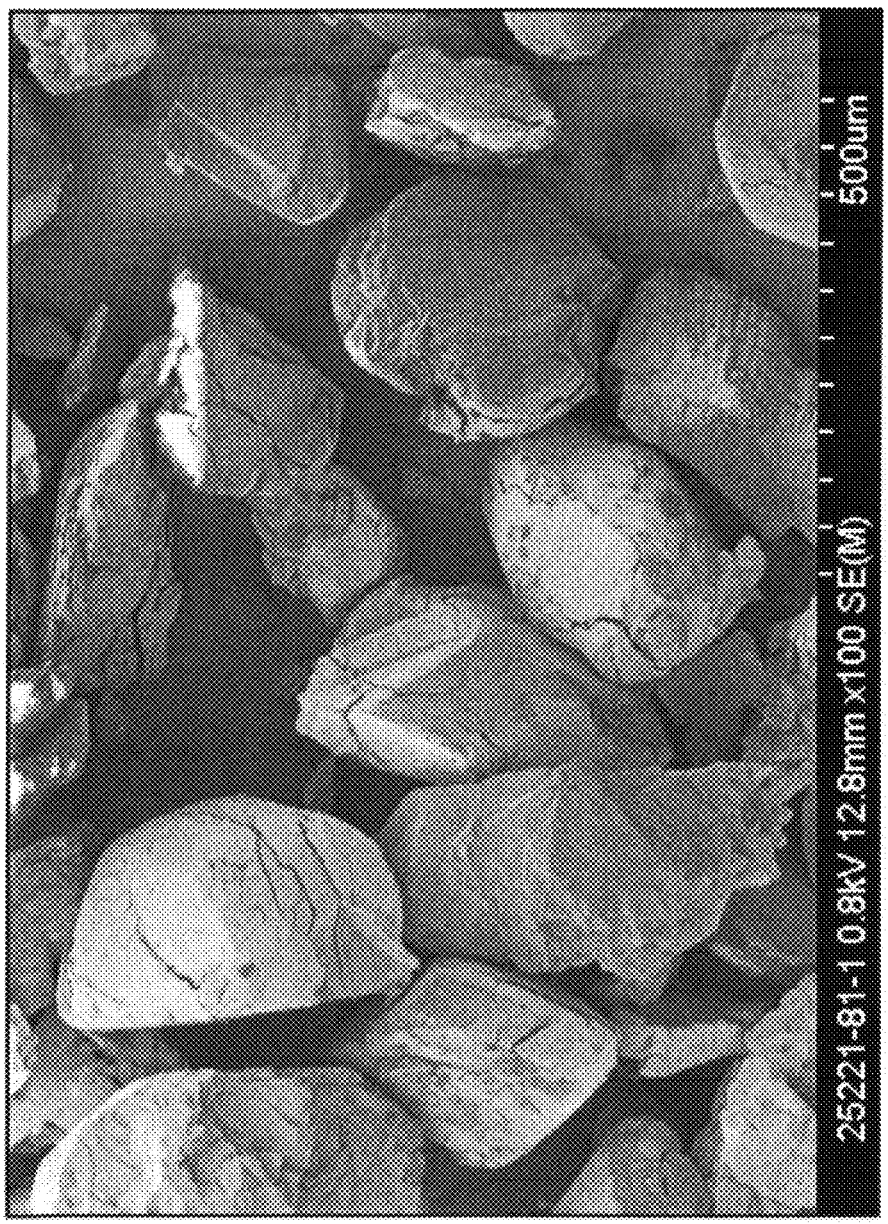
FIG. 20 is a Scanning Electron Microscopy ("SEM") image of a ZIF-1 (acetonitrile-exchanged) sample of Example 8.
Figure 21:
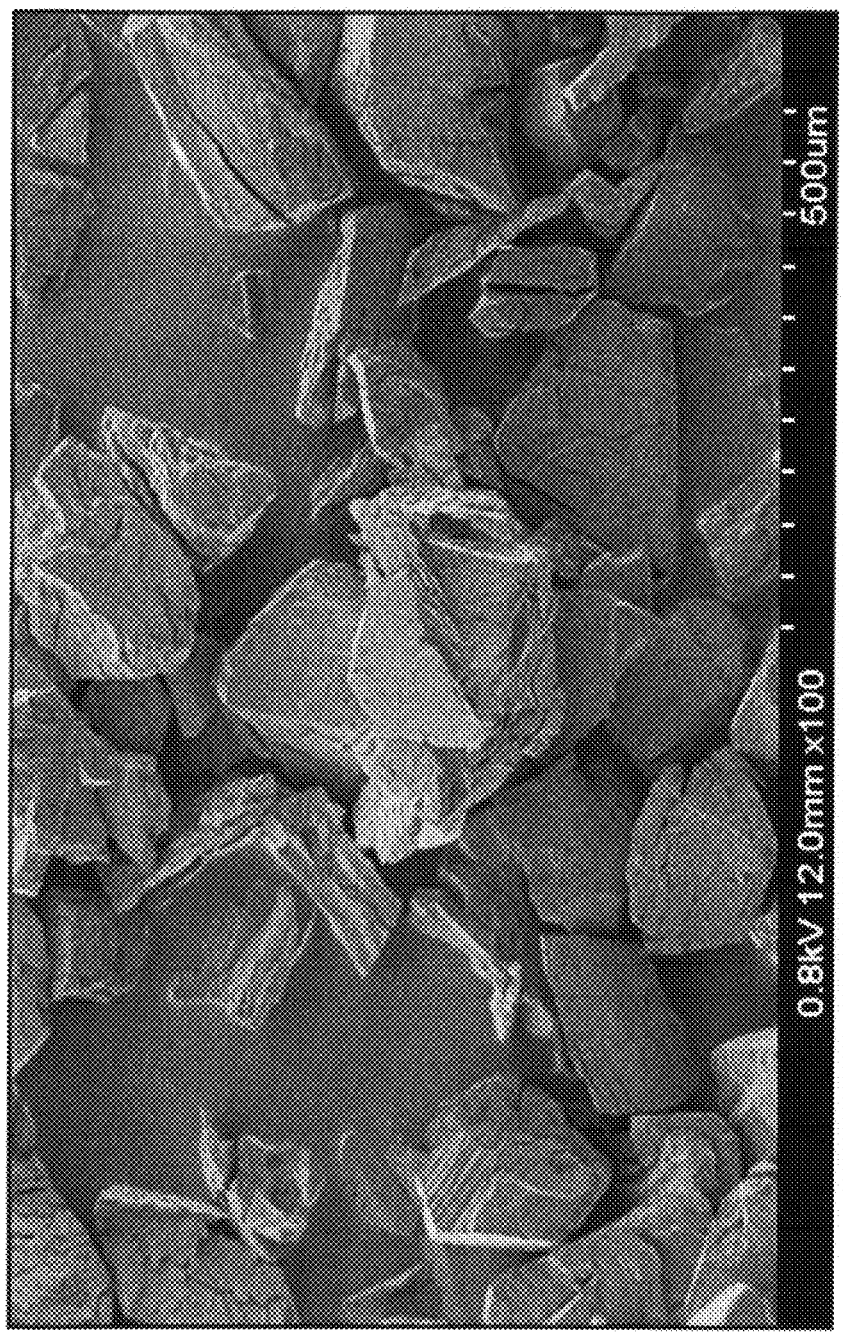
FIG. 21 is a Scanning Electron Microscopy ("SEM") image of a ZIF-1 (toluene-exchanged) sample of Example 8.

FIG. 20 is a Scanning Electron Microscopy ("SEM") image of a sample of ZIF-1 (acetonitrile-exchanged) produced. FIG. 21 is a Scanning Electron Microscopy ("SEM") image of a sample of ZIF-1 (toluene-exchanged) produced.

Example 4

In this example, a ZIF-11 material was synthesized. The framework of ZIF-11 has a chemical composition of $ZnL_2$ (wherein L=benzimidazolate, i.e., the anion of benzimidazole) and a topology defined by the Zn cations that is identical to the zeolitic framework type RHO. RHO is a three-letter framework type code as defined by the International Zeolite Association ("IZA") in the "Atlas of Zeolite Framework Types" (Ch. Baerlocher, L. B. McCusker, D. H. Olson, Sixth Revised Edition, Elsevier Amsterdam, 2007).

In the synthesis of the ZIF-11 material, 0.330 g of zinc nitrate hexahydrate ($Zn(NO_3)_2.6H_2O$, 1.11 mmol) and 0.990 g of Benzimidazole (8.38 mmol) were dissolved in 100 ml DEF (N,N-Diethylformamide) in a 120 ml glass vial. The vial was tightly capped and the reaction mixture was heated in an isothermal oven at 373 k for 96 hours. After reaction, the mother liquor was decanted. The solid crystallized on the side wall and the bottom part of the vial was collected and washed with DMF (N,N-Dimethylformamide) repeatedly to remove any residual mother liquor and an amorphous by-product. The product was then transferred to a 20 ml vial and the DMF solvent was decanted. After the addition of chloroform (c.a. 15 ml), the vial was capped and the mixture was immersed in an ultrasonic bath for 30 minutes to mechanically detach an unidentified dense-phase from the surfaces of ZIF-11 crystals. Two layers of solids appeared after the vial sat on a level surface undisturbed for 30 minutes. The solid layer floating on the surface of chloroform was carefully collected using a pipette and transferred to another 20 ml vial. The solid was washed with and stored in DMF and labeled "purified ZIF-11".

In order to activate the ZIF-11, the purified solid was immersed in methanol (c.a. 15 ml) for a total of 72 hours. The solvent volume was replaced every 24 hours. The methanol-exchanged ZIF-11 was loaded in a glass tube and evacuated on a vacuum line apparatus. After the removal of external methanol solvent at room temperature, the solid was heated under vacuum at 423 K for 16 hours to remove the solvent molecules residing in the pores of the ZIF-11. A 0.09 g sample of activated ZIF-11 was thus obtained, corresponding to 27% yield (based on zinc nitrate hexahydrate).

For gas adsorption experiments, the methanol-exchanged ZIF-11 was loaded directly in the sample holder of the gravimetric gas adsorption unit and activated in-situ by using the conditions described in Example 9.

Figure 7:
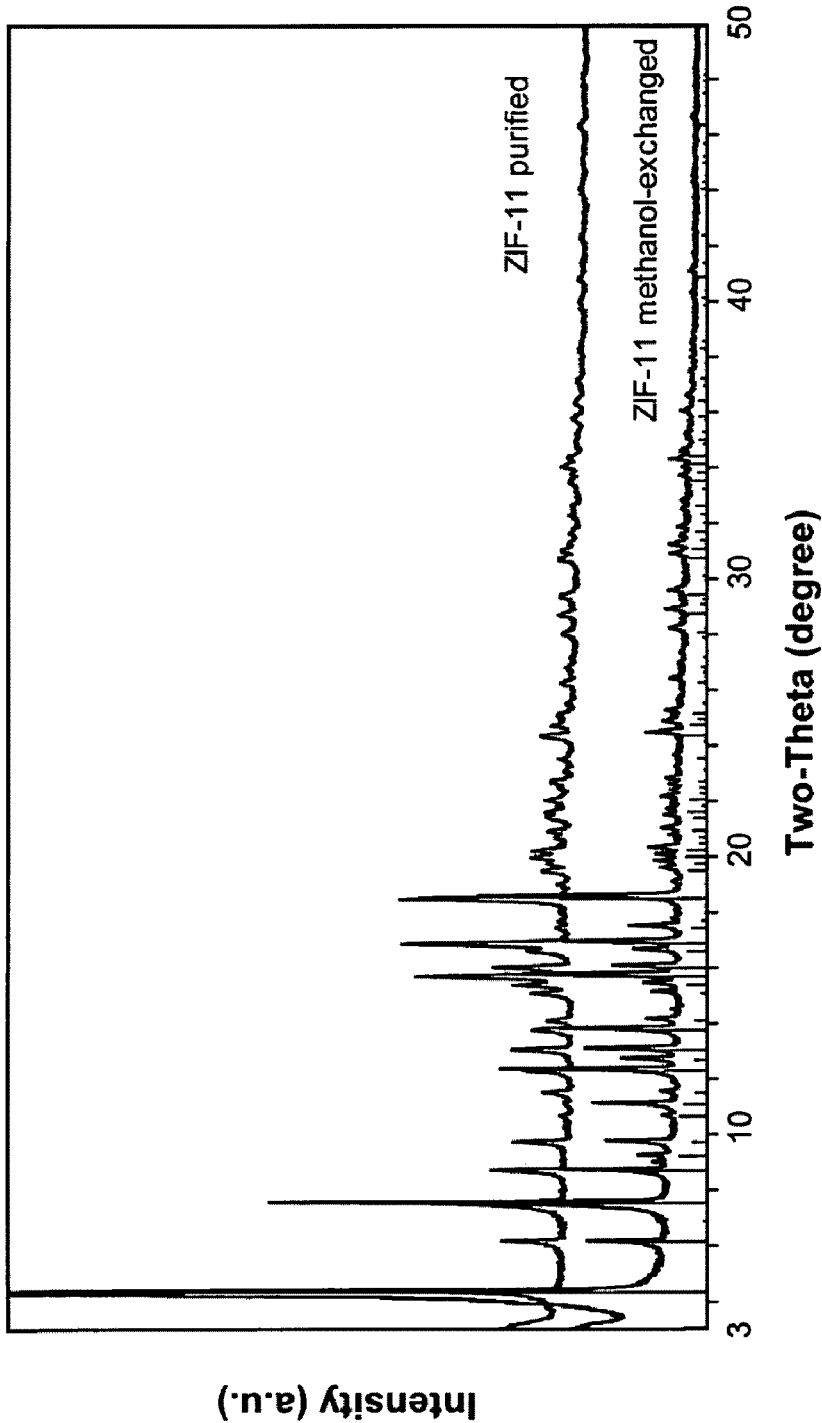
FIG. 7 is the experimental powder X-ray diffraction ("PXRD") patterns of the purified and methanol-exchanged ZIF-11 samples of Example 4 herein. The calculated PXRD pattern (shown as the vertical stick patterns in the figure) for ZIF-11 based on the single crystal structure of ZIF-11 reported in the "Park Reference" as referenced herein is also shown in the figure.

FIG. 7 shows a comparison of the experimental powder X-ray diffraction ("PXRD") patterns of the purified and the methanol-exchanged ZIF-11 samples and the calculated PXRD pattern (shown as the stick pattern) based on the single crystal structure of ZIF-11 reported in the "Park Reference" as referenced herein. The PXRD patterns as shown in FIG. 7 are plotted as the diffraction intensity (in arbitrary units) against the diffraction angle two-theta (in degrees).

The high purity of the sample is evidenced by the coincidence of experimental and calculated PXRD patterns. It is worth noting the slight differences between the two experimental PXRD patterns of ZIF-11. After methanol-exchange, the intensities of the diffraction peaks were altered and the peak positions were systematically shifted to higher two-theta angle (in degrees).

Figure 8:
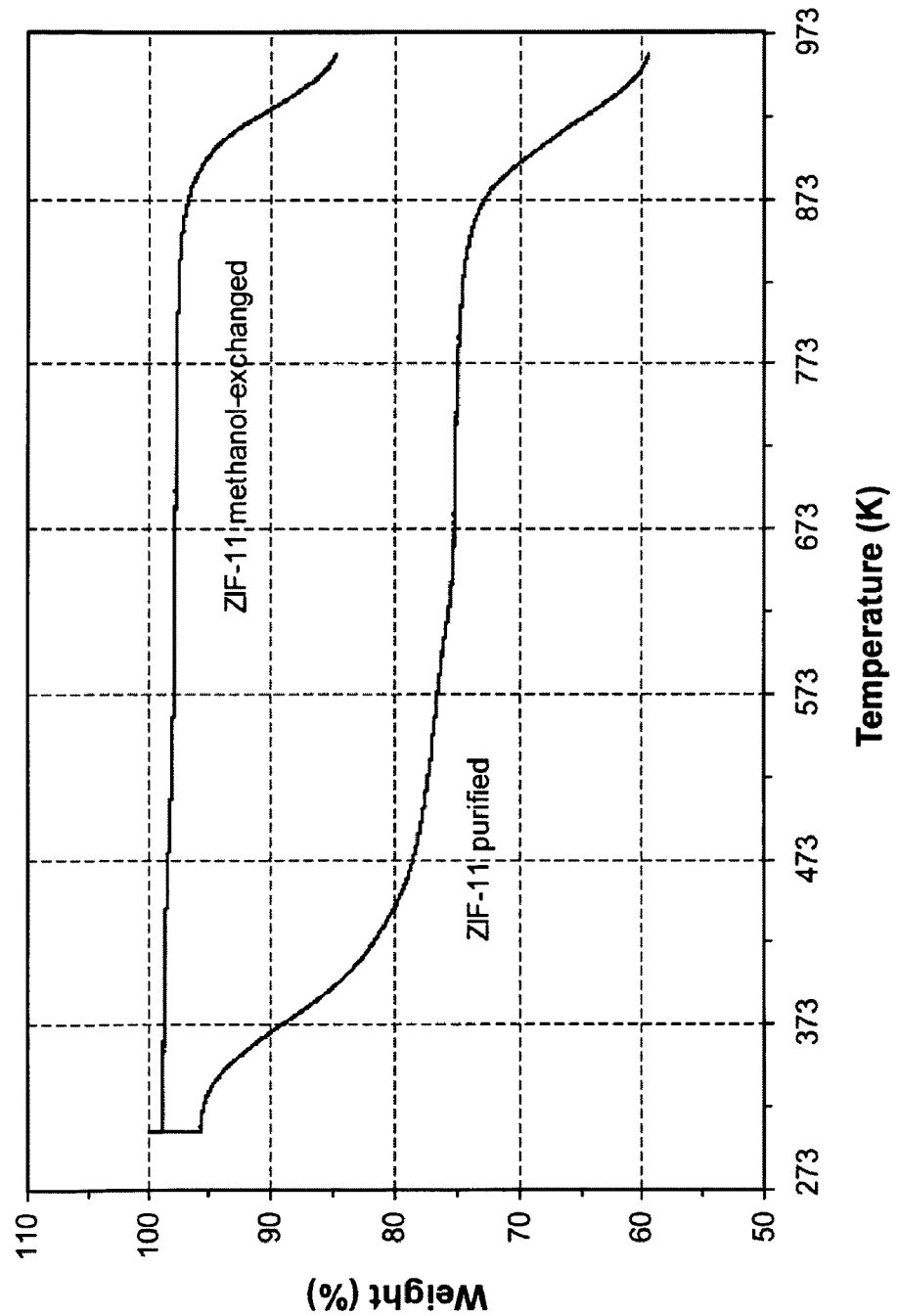
FIG. 8 shows the thermogravimetric analyses ("TGA"s) for the purified and methanol-exchanged ZIF-11 samples of Example 4 herein.

FIG. 8 shows the thermogravimetric analyses ("TGA") for the purified and the methanol-exchanged ZIF-11 samples in nitrogen atmosphere. The activation conditions described above were chosen based on TGA data.

Figure 24:
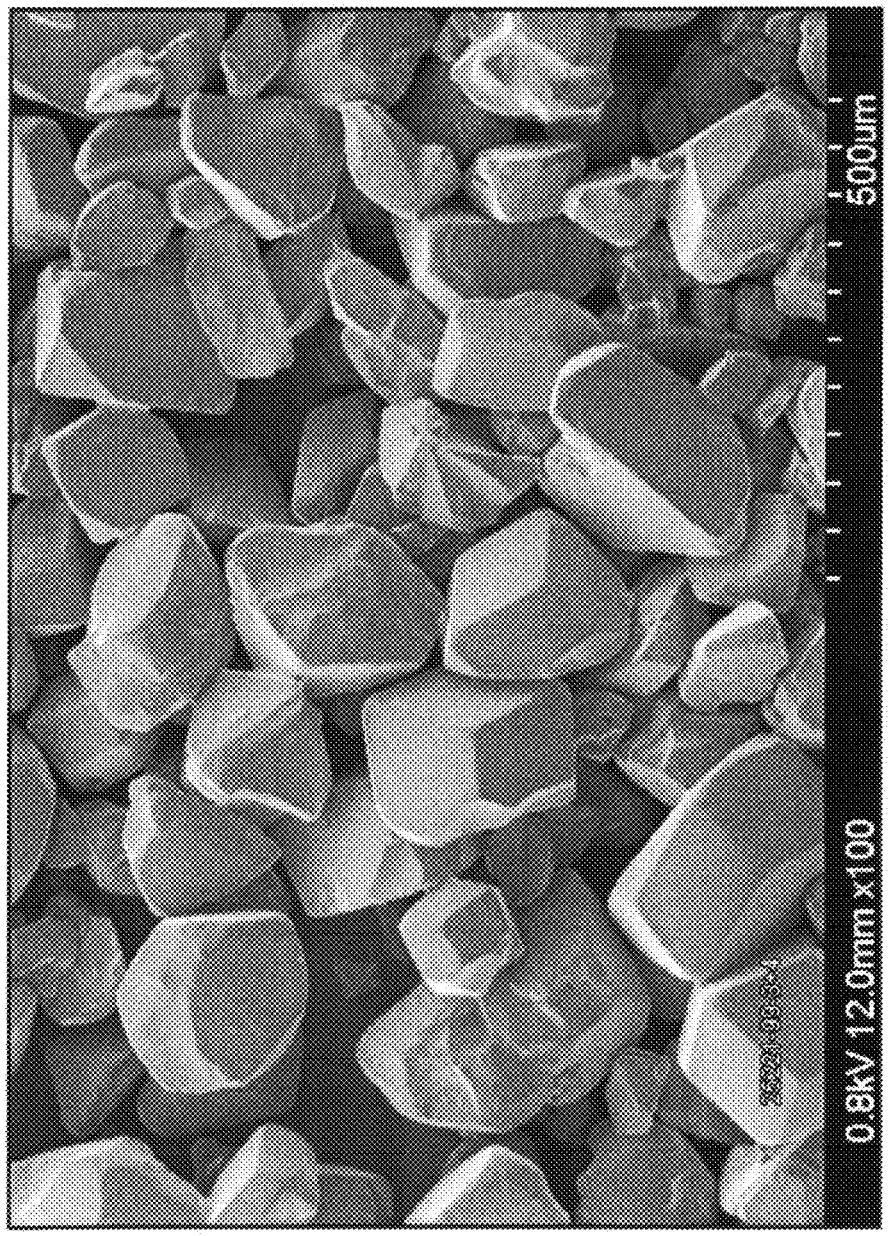
FIG. 24 is a Scanning Electron Microscopy ("SEM") image of a ZIF-11 sample of Example 9.

FIG. 24 is a Scanning Electron Microscopy ("SEM") image of a sample of ZIF-11 produced.

Example 5

In this example, a ZIF-8 material was synthesized. The framework of ZIF-8 has a chemical composition of $ZnL_2$ (wherein L=2-Methylimidazolate, i.e., the anion of 2-Methylimidazole) and a topology defined by the Zn cations that is identical to the zeolitic framework type SOD. SOD is a three-letter framework type code as defined by the International Zeolite Association ("IZA") in the "Atlas of Zeolite Framework Types" (Ch. Baerlocher, L. B. McCusker, D. H. Olson, Sixth Revised Edition, Elsevier Amsterdam, 2007

In the synthesis of the ZIF-8 material, 10.50 g of zinc nitrate tetrahydrate ($Zn(NO_3)_2.4H_2O$, 40.2 mmol) and 3.00 g of 2-Methylimidazole (36.5 mmol) were dissolved in 900 ml DMF (N,N-Dimethylformamide) in a 1 liter glass jar. The jar was tightly capped and the reaction mixture was heated in an isothermal oven at 413 K for 24 hours. After reaction, the mother liquor was decanted. The solid crystallized on the side wall and the bottom part of the jar was collected and washed with DMF repeatedly to remove any residual mother liquor and an amorphous by-product. The product was then transferred to a 120 ml vial and the DMF solvent was decanted. After the addition of chloroform (c.a. 100 ml), the vial was capped and the mixture was immersed in an ultrasonic bath for 30 minutes to mechanically detach zinc oxide particles from the surfaces of ZIF-8 crystals. Two layers of solids appeared after the vial sat on a level surface undisturbed for 30 minutes. The solid layer floating on the surface of chloroform was carefully collected using a pipette and transferred to another 120 ml vial. The solid was washed with and stored in DMF and labeled "purified ZIF-8".

In order to activate the ZIF-8, the purified solid was immersed in methanol (c.a. 100 ml) for a total of 72 hours. The solvent volume was replaced every 24 hours. This methanol-exchanged ZIF-8 was loaded in a glass tube and evacuated on a vacuum line apparatus. After the removal of external methanol solvent at room-temperature, the solid was heated under vacuum at 523 K for 16 hours to remove the solvent molecules residing in the pores of ZIF-8. 1.70 g of activated ZIF-8 was obtained, corresponding to 41% yield (based on 2-Methylimidazole).

For gas adsorption experiments, the methanol-exchanged ZIF-8 was loaded directly in the sample holder of the gravimetric gas adsorption unit and activated in-situ by using the conditions described in Example 10.

Figure 9:
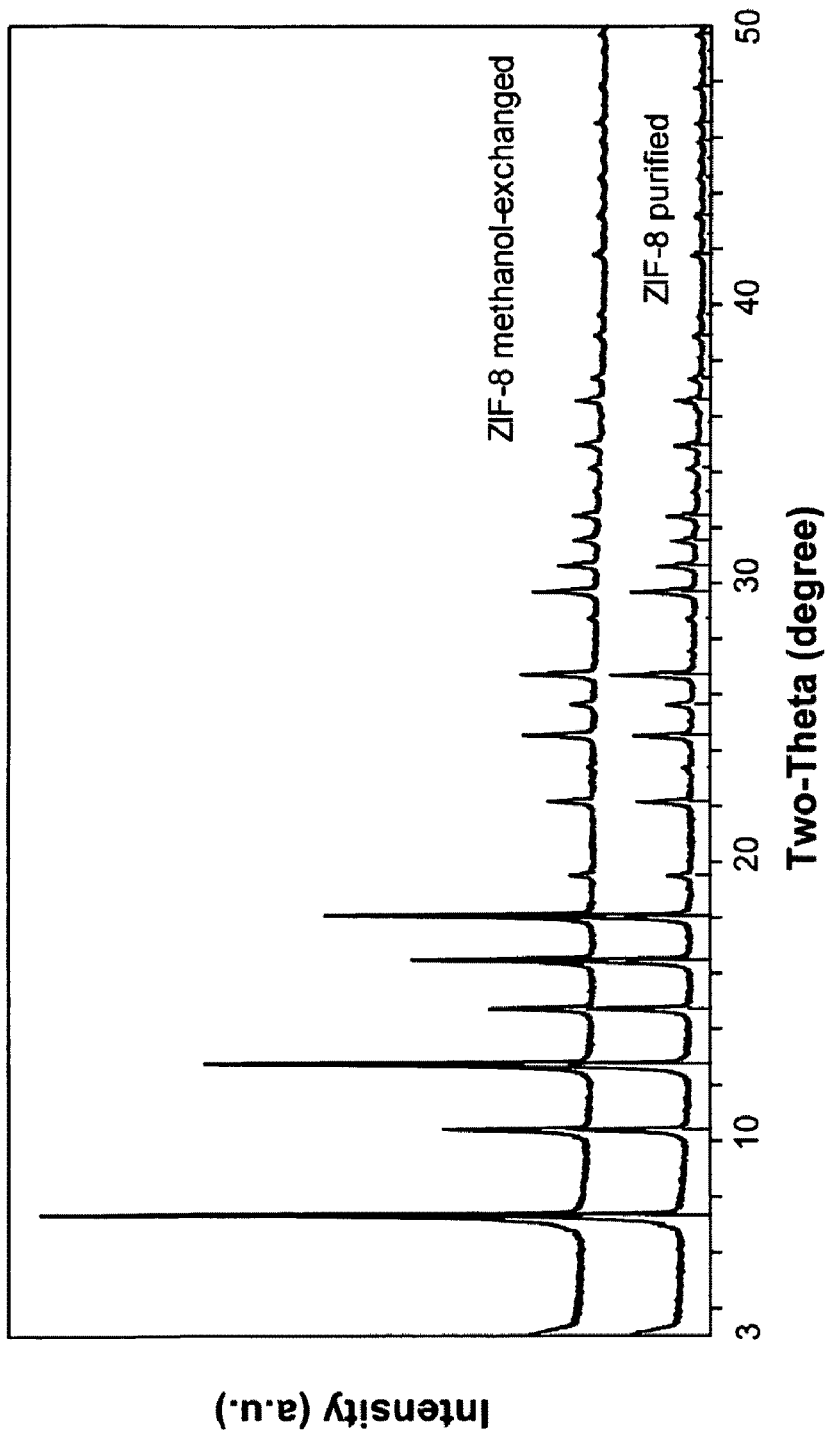
FIG. 9 is the experimental powder X-ray diffraction ("PXRD") patterns of the purified and methanol-exchanged ZIF-8 samples of Example 5 herein. The calculated PXRD pattern (shown as the vertical stick patterns in the figure) for ZIF-8 based on the single crystal structure of ZIF-8 reported in the "Park Reference" as referenced herein is also shown in the figure.

FIG. 9 shows a comparison of the experimental powder X-ray diffraction ("PXRD") patterns of the purified and the methanol-exchanged ZIF-8 samples and the calculated PXRD pattern (stick pattern) based on the single crystal structure of ZIF-8 reported in the "Park Reference" as referenced herein. The high purity of the sample is evidenced by the coincidence of experimental and calculated PXRD patterns. The PXRD patterns as shown in FIG. 9 are plotted as the diffraction intensity (in arbitrary units) against the diffraction angle two theta (in degrees).

Figure 10:
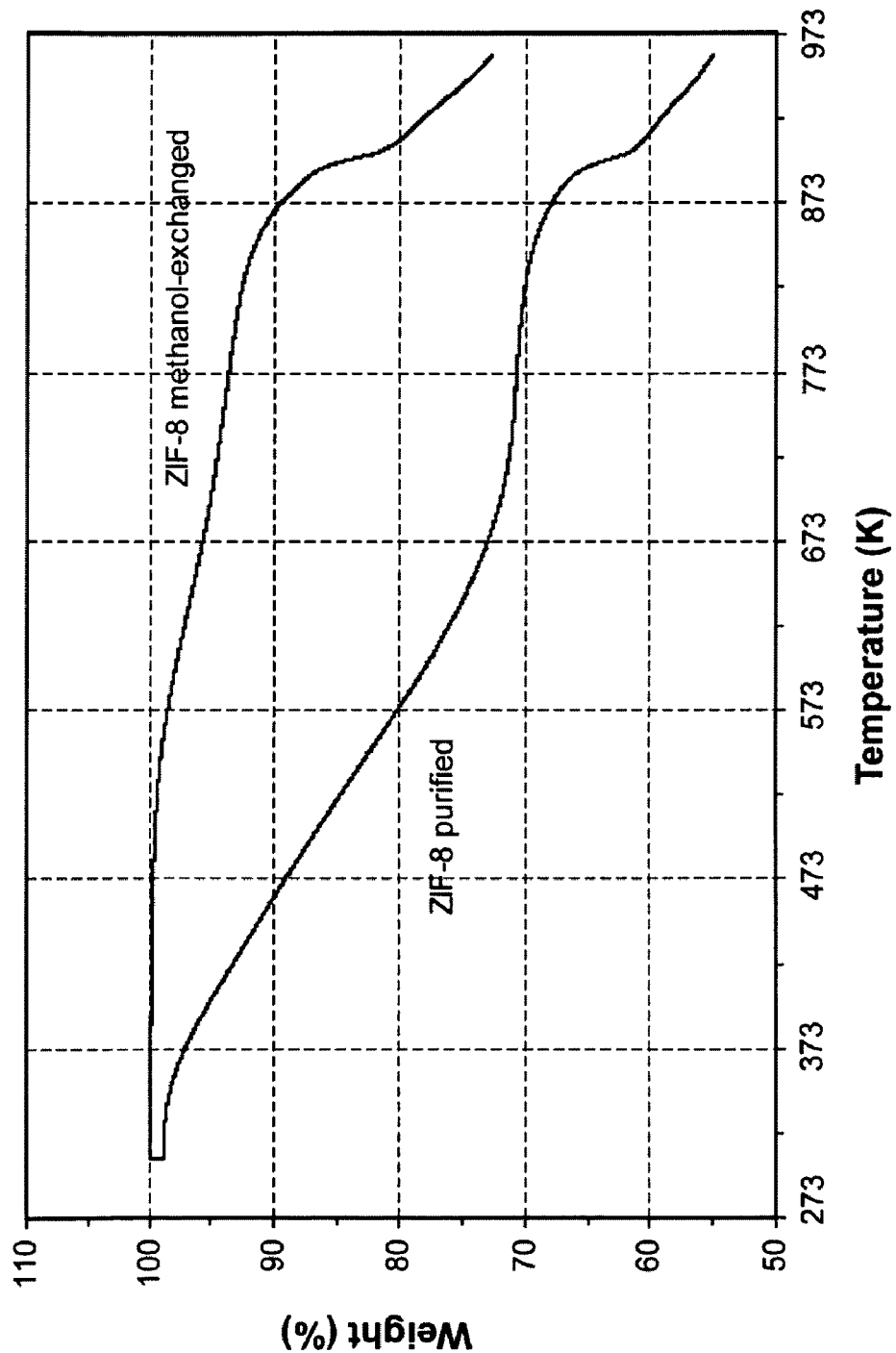
FIG. 10 shows the thermogravimetric analyses ("TGA"s) for the purified and methanol-exchanged ZIF-8 samples of Example 5 herein.

FIG. 10 shows the thermogravimetric analyses ("TGA") for the purified and the methanol-exchanged ZIF-8 samples in nitrogen atmosphere. The activation conditions described above were chosen based on TGA data.

Figure 27:
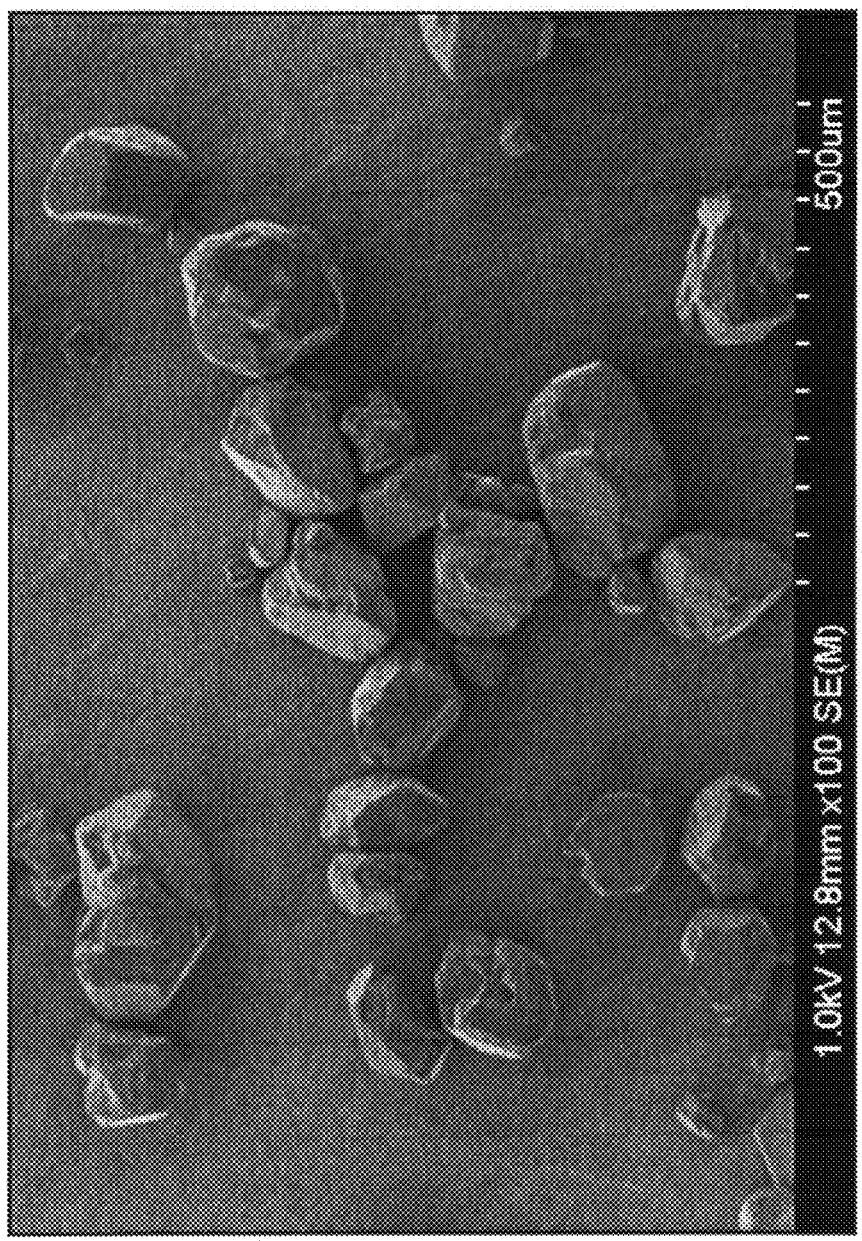
FIG. 27 is a Scanning Electron Microscopy ("SEM") image of a ZIF-8 sample of Example 10.

FIG. 27 is a Scanning Electron Microscopy ("SEM") image of a sample of ZIF-8 produced.

Examples 6-10

In Examples 6 through 10 herein, a Cahn® microbalance apparatus (TG121, 0.1 µg) was used to gravimetrically characterize the adsorption/desorption properties of gases and hydrocarbons (i.e., adsorbates) in various zeolitic imidazolate frameworks (i.e., adsorbents). Experiments were carried out on various adsorbate-adsorbent pairs to determine the adsorption isotherms for the various ZIF materials synthesized in Examples 1 through 5 above. At a constant temperature, the equilibrium adsorbate loading was measured at various adsorbate pressures up to 106.6 kPa. In order to capture any potential hysteretic behavior, for each isotherm half of the experimental points were measured in the adsorption mode (i.e., increasing the pressure from vacuum to the maximum pressure of 106.6 kPa) and the other half of the experimental points were measured in the desorption mode (i.e., decreasing the pressure from the maximum pressure of 106.6 kPa to vacuum). In all experiments, a LabVIEW® computer software was used to automatically set, control and monitor the sequence of steps followed in each experiment.

The adsorbate feed was brought into the feed manifold from lecture bottles or from house supply lines containing high purity gases and hydrocarbons. The feed manifold was in contact with the adsorbent located in the sample holder of the microbalance. The adsorbate pressure within the feed manifold was controlled between vacuum and 106.6 kPa by a MKS® Type 146 Measurement and Control System, which was connected to the computer via RS232 communications. The feed manifold was equipped with three MKS® 120A pressure transducers (0-0.0133 kPa, 0-1.33 kPa and 0-133 kPa) that provided the adsorbate pressure information to the controller. The controller actuated two electronic valves to adjust the adsorbate pressure within the feed manifold. One valve (MKS 0248A, Type 00100RK) was connected to the adsorbate feed supply and the other valve (MKS 0248A, Type 10000RV) was connected to the vacuum line. A Pfeiffer® TSU 261 turbomolecular pump was used to achieve the vacuum conditions.

Typically, prior to the adsorption isotherm measurements, about 15-90 mg of adsorbent was loaded in the microbalance at 301 K. In order to avoid the contacting of the adsorbent with ambient air, the adsorbent was fully immersed in an excess of a specified solvent (i.e., an amount well in excess of that required to fill its internal pore volume). The solvent was removed through the use of dynamic vacuum. In some cases, where the solvent was held more strongly within the interior of the adsorbate, heating was also used. Typically, the following steps (all under dynamic vacuum) were applied: (a) outgassing at 301 K for a prescribed duration, (b) heating to a prescribed temperature and kept there for a prescribed duration, (c) cooling to 301 K. Because the microbalance was there just prior to loading the sample, the dry weight was directly obtained from the microbalance upon completion of the clean-up procedure. The type of solvent, the heating temperature as well as the duration of the steps was dependent on the particular ZIF material under study. For a given ZIF sample, the same clean-up steps were repeated each time a new successive experiment was conducted. Prior to removing the sample from the microbalance, the first and/or second adsorption experiments were repeated. These repeat experiments revealed excellent reproducibility, confirming the adequacy of the experimental adsorption isotherm procedures as well as the stability of the samples throughout the adsorption experiments. X-ray measurements of the removed samples further confirmed their integrity.

Example 6

In this example, adsorption isotherm experiments were carried out on ZIF-7 samples obtained from the synthesis detailed in Example 1 above in compliance with the general testing procedures for Examples 6-10 described above.

For the testing of each absorbate in this experiment, a sample of ZIF-7 was loaded with acetonitrile as the solvent. It was out-gassed for 6 hrs at 301 K under dynamic vacuum. No further heating was applied. The dry weight was 46.68 mg. The same clean-up procedure was applied to ZIF-7 prior to all subsequent experiments with other adsorbates. A Scanning Electron Microscopy ("SEM") image of this sample is shown in FIG. 11. FIG. 12 shows the $CO_2$ adsorption isotherm on ZIF-7 at 301 K. The ordinate displays the equilibrium adsorption loading in typical units of mmole/g. The lower abscissa displays the absolute $CO_2$ pressure in kPa. The upper abscissa displays the relative $CO_2$ pressure, where the normalizing pressure $P_0$ corresponds to the $CO_2$ saturation pressure at 301 K. From thermodynamic equilibrium vapor pressure data, a value of 6583.8 kPa was estimated for $P_0$. The filled and open symbols identify the corresponding adsorption and desorption branches, respectively (the adsorption branch is shown with filled diamond legend and the desorption branch is shown with open diamond legend).

In accordance with the testing procedures, an adsorption isotherm for nitrogen, $N_2$, was also generated and is shown together in FIG. 13 with the adsorption/desorption isotherm from FIG. 12 above. In the testing regime of this example, nitrogen did not exhibit the separate adsorption and desorption branches as was exhibited for carbon dioxide and therefore, the adsorption and desorption curves for nitrogen in this regime overlap for ZIF-7. As can be seen from FIG. 13, at the upper test pressure of 106.6 kPa @ 301 K, the adsorption loading of carbon dioxide, $CO_2$, was significantly larger than the adsorption loading for nitrogen, $N_2$, on the ZIF-7 material. In fact, only 0.02 mmole/g of adsorbed nitrogen was detected at 301 K and 106.6 kPa.

FIG. 14 is a bar graph comparing the corresponding adsorption loadings of the ZIF-7 material for carbon dioxide, $CO_2$, and nitrogen, $N_2$, at test conditions of 301 K and 106.6 kPa obtained from the tests above. As can be seen from this bar graph, the adsorption loading of the ZIF-7 material for $CO_2$ at 106.6 kPa @ 301 K was approximately 2.29 mmole/g while the adsorption loading for $N_2$ was approximately 0.02 mmole/g. At these conditions, the adsorptive loading ratio for $CO_2$ over $N_2$ is approximately 114.5, illustrating the very high selectivity of the ZIF-7 material for $CO_2$ over $N_2$, making ZIF-7 a suitable material for use in the present invention.

Additional isotherms for ZIF-7 were performed at different temperatures to investigate the adsorption/desorption characteristics of ZIF-7 at higher temperatures. The adsorption isotherms of ZIF-7 for $CO_2$ performed at 301 K, 308 K, and 323 K are shown in FIG. 15. As can be seen in FIG. 15, consistent with adsorption-based principles, as the temperature is increased from 301 K to 308 K, the transition from low to high $CO_2$ loading is displaced to higher pressures. This figure shows that comparable adsorption loadings of $CO_2$ on ZIF-7 occur at a correspondingly increased partial pressure. FIG. 15 also shows that at 323 K, the transition from low to high $CO_2$ loading does not take place under the conditions that were tested up to the maximum test pressure of 106.6 kPa. Such behavior is equivalent to that of $N_2$ as exhibited in FIG. 13, that due to weaker $N_2$ interactions with the adsorbent, $N_2$ is unable to undergo the transition to a high loading state. It is this interplay of variables involving the adsorbate, adsorbent, pressure and temperature that can be used to an advantage in designing effective swing adsorption processes in accordance with the present invention for effectively separating $CO_2$ from $N_2$ in gas mixtures containing both components.

Example 7

In this example, adsorption isotherm experiments were carried out on ZIF-9 samples obtained from the synthesis detailed in Example 2 above in compliance with the general testing procedures for Examples 6-10 described above.

For the testing of each absorbate in this experiment, a sample of ZIF-9 was loaded with acetonitrile as the solvent. It was out-gassed for 6 hrs at 301 K under dynamic vacuum. No further heating was applied. The dry weight was 56.35 mg. The same clean-up procedure was applied to ZIF-9 prior to all subsequent experiments with other adsorbates. A Scanning Electron Microscopy ("SEM") image of this sample is shown in FIG. 16. FIG. 17 shows the $CO_2$ adsorption isotherm on ZIF-9 at 301 K. The ordinate displays the equilibrium adsorption loading in typical units of mmole/g. The lower abscissa displays the absolute $CO_2$ pressure in kPa. The upper abscissa displays the relative $CO_2$ pressure, where the normalizing pressure $P_0$ corresponds to the $CO_2$ saturation pressure at 301 K. From thermodynamic equilibrium vapor pressure data, a value of 6583.8 kPa was estimated for $P_0$. The filled and open symbols identify the corresponding adsorption and desorption branches, respectively (the adsorption branch is shown with filled diamond legend and the desorption branch is shown with open diamond legend).

In accordance with the testing procedures, an adsorption isotherm for nitrogen, $N_2$, was also generated and is shown together in FIG. 18 with the adsorption/desorption isotherm from FIG. 17 above. In the testing regime of this example, nitrogen did not exhibit the separate adsorption and desorption branches, and in fact, nitrogen did not load measurably on the ZIF-9 during the test. As can be seen from FIG. 18, at the upper test pressure of 106.6 kPa @ 301 K, the adsorption loading of carbon dioxide, $CO_2$, was significantly larger than the adsorption loading for nitrogen, $N_2$, on the ZIF-9 material.

FIG. 19 is a bar graph comparing the corresponding adsorption loadings of the ZIF-9 material for carbon dioxide, $CO_2$, and nitrogen, $N_2$, at test conditions of 301 K and 106.6 kPa obtained from the tests above. As can be seen from this bar graph, the adsorption loading of the ZIF-9 material for $CO_2$ at 106.6 kPa @ 301 K was approximately 2.33 mmole/g while the adsorption loading for $N_2$ was not measurable. At these conditions, the adsorptive loading ratio for $CO_2$ over $N_2$ is immeasurable (approaching infinity), illustrating the extremely high selectivity of the ZIF-9 material for $CO_2$ over $N_2$, making ZIF-9 a suitable material for use in the present invention.

Example 8

In this example, adsorption isotherm experiments were carried out on ZIF-1 samples obtained from the synthesis detailed in Example 3 above in compliance with the general testing procedures for Examples 6-10 described above.

For the testing of the acetonitrile-exchanged ZIF-1 sample, a portion of the ZIF-1 sample produced and activated as in Example 3 was loaded with acetonitrile as the solvent. It was out-gassed for 6 hrs at 301 K under dynamic vacuum. No further heating was applied. The dry weight was 69.64 mg. The same clean-up procedure was applied to the acetonitrile-exchanged ZIF-1 prior to all subsequent experiments with other adsorbates. A Scanning Electron Microscopy ("SEM") image of the acetonitrile-exchanged ZIF-1 sample is shown in FIG. 20.

For the testing of the toluene-exchanged ZIF-1 sample, a portion of the ZIF-1 sample produced and activated as in Example 3 was loaded with toluene as the solvent. It was out-gassed for 6 hrs at 301 K under dynamic vacuum, heated to 443 K for 2 hrs and then cooled to 301 K. The dry weight was 46.21 mg. The same clean-up procedure was applied to the toluene-exchanged ZIF-1 prior to all subsequent experiments with other adsorbates. A Scanning Electron Microscopy ("SEM") image of toluene-exchanged ZIF-1 sample is shown in FIG. 21.

Figure 22:
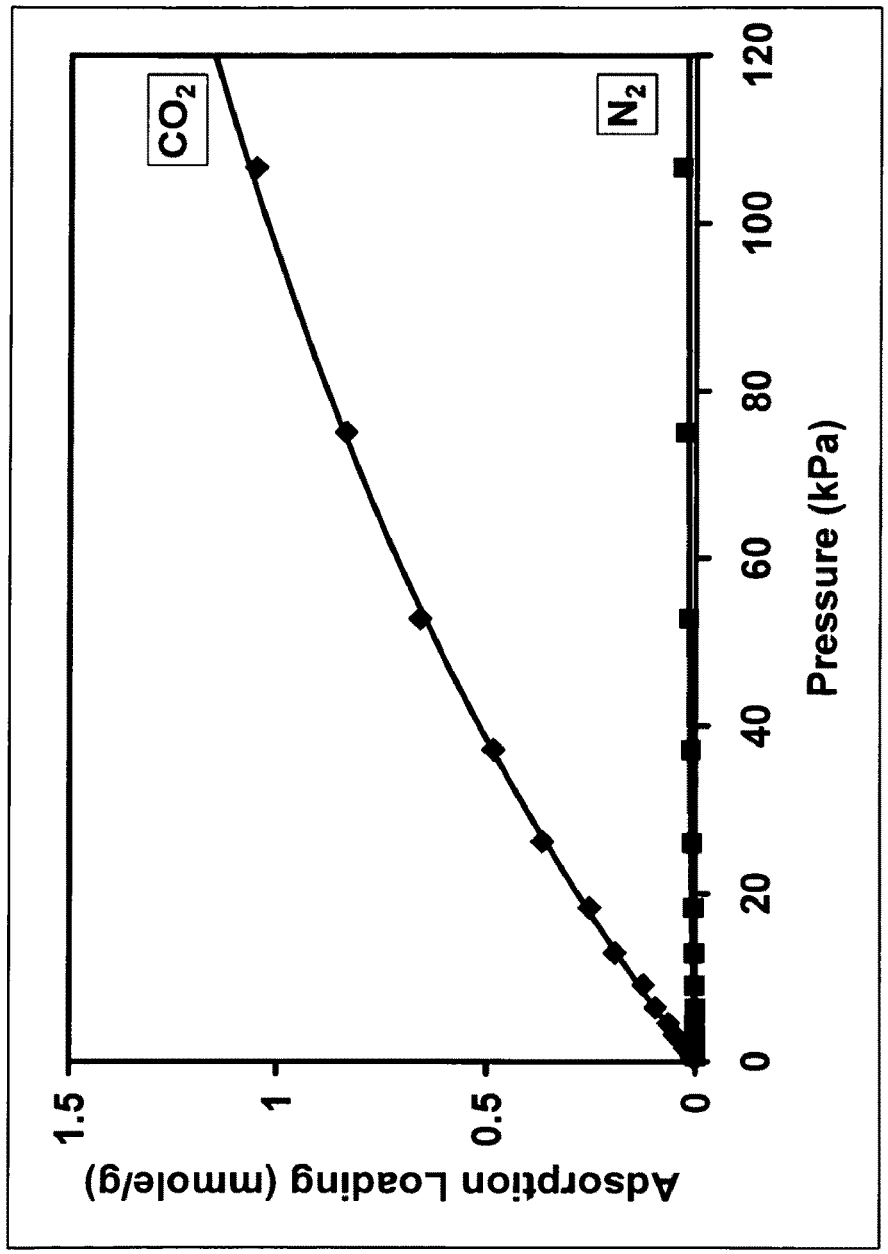
FIG. 22 shows the $CO_2$ adsorption isotherm and the $N_2$ adsorption isotherm at 301 K for a ZIF-1 (acetonitrile-exchanged) sample of Example 8.

FIG. 22 shows the adsorption isotherms of the acetonitrile-exchanged ZIF-1 for carbon dioxide, $CO_2$, and nitrogen, $N_2$, at 301 K. The ordinate displays the equilibrium adsorption loading in typical units of mmole/g. The abscissa displays the absolute pressure of the adsorbate in kPa. As can be seen from FIG. 22, at the upper test pressure of 106.6 kPa @ 301 K, the adsorption loading of carbon dioxide, $CO_2$, was higher than the adsorption loading for nitrogen, $N_2$, on the acetonitrile-exchanged ZIF-1 material.

Figure 23:
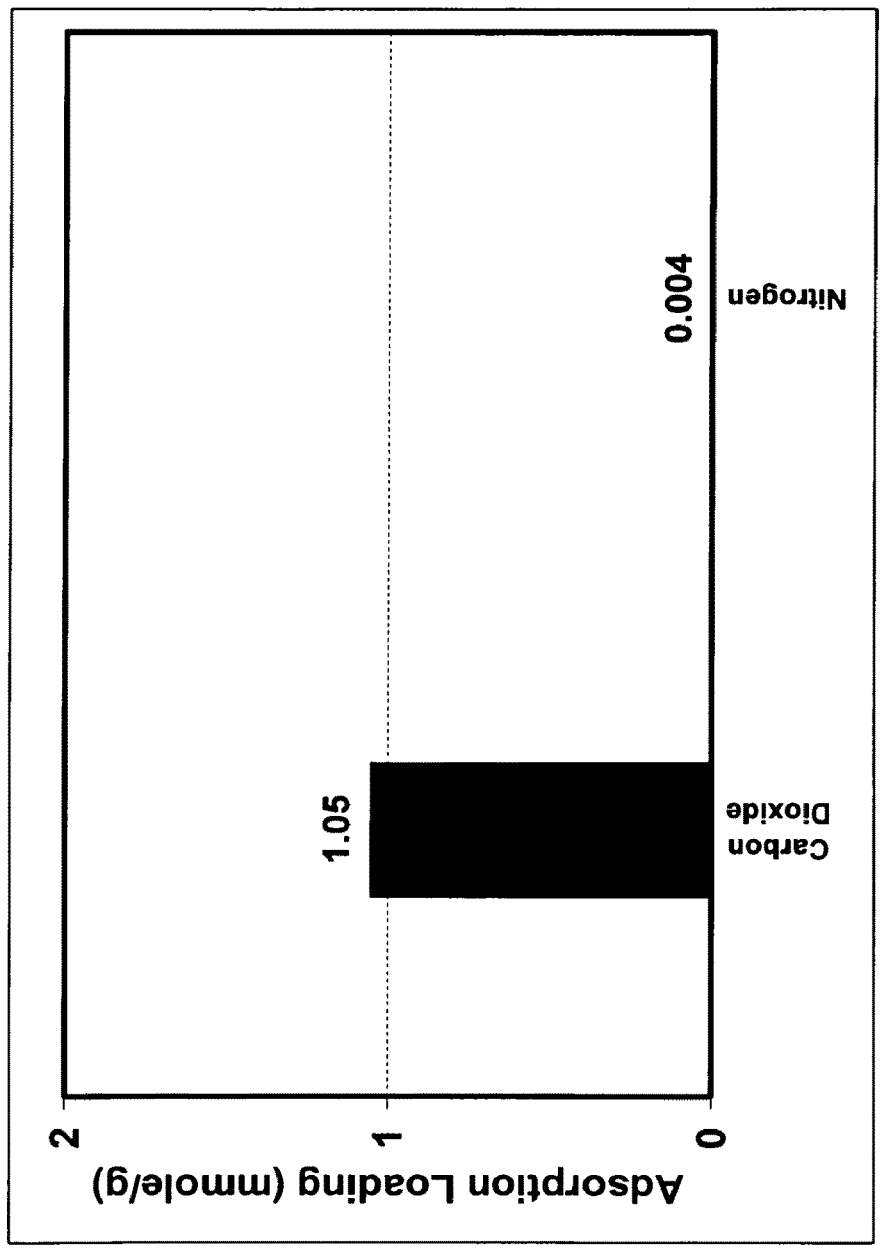
FIG. 23 is a bar graph comparing the adsorption loadings of a ZIF-1 (acetonitrile-exchanged) sample of Example 8 for $CO_2$ and $N_2$ at 301 K and 106.6 kPa.

FIG. 23 is a bar graph comparing the corresponding adsorption loadings of the acetonitrile-exchanged ZIF-1 material for carbon dioxide, $CO_2$, and nitrogen, $N_2$, at test conditions of 301 K and 106.6 kPa obtained from the tests above. As can be seen from this bar graph, the adsorption loading of the acetonitrile-exchanged ZIF-1 material for $CO_2$ at 106.6 kPa @ 301 K was approximately 1.05 mmole/g while the adsorption loading for $N_2$ was approximately 0.004 mmole/g. At these conditions, the adsorptive loading ratio for $CO_2$ over $N_2$ is approximately 262.5, illustrating the very high selectivity of the ZIF-1 material for $CO_2$ over $N_2$, making ZIF-1 a suitable material for use in the present invention.

It should be noted that, although not shown, the toluene-exchanged ZIF-1 material exhibits similar adsorption loading characteristics as the acetonitrile-exchanged ZIF-1 material.

Example 9

In this example, adsorption isotherm experiments were carried out on ZIF-11 samples obtained from the synthesis detailed in Example 4 above in compliance with the general testing procedures for Examples 6-10 described above.

Figure 25:
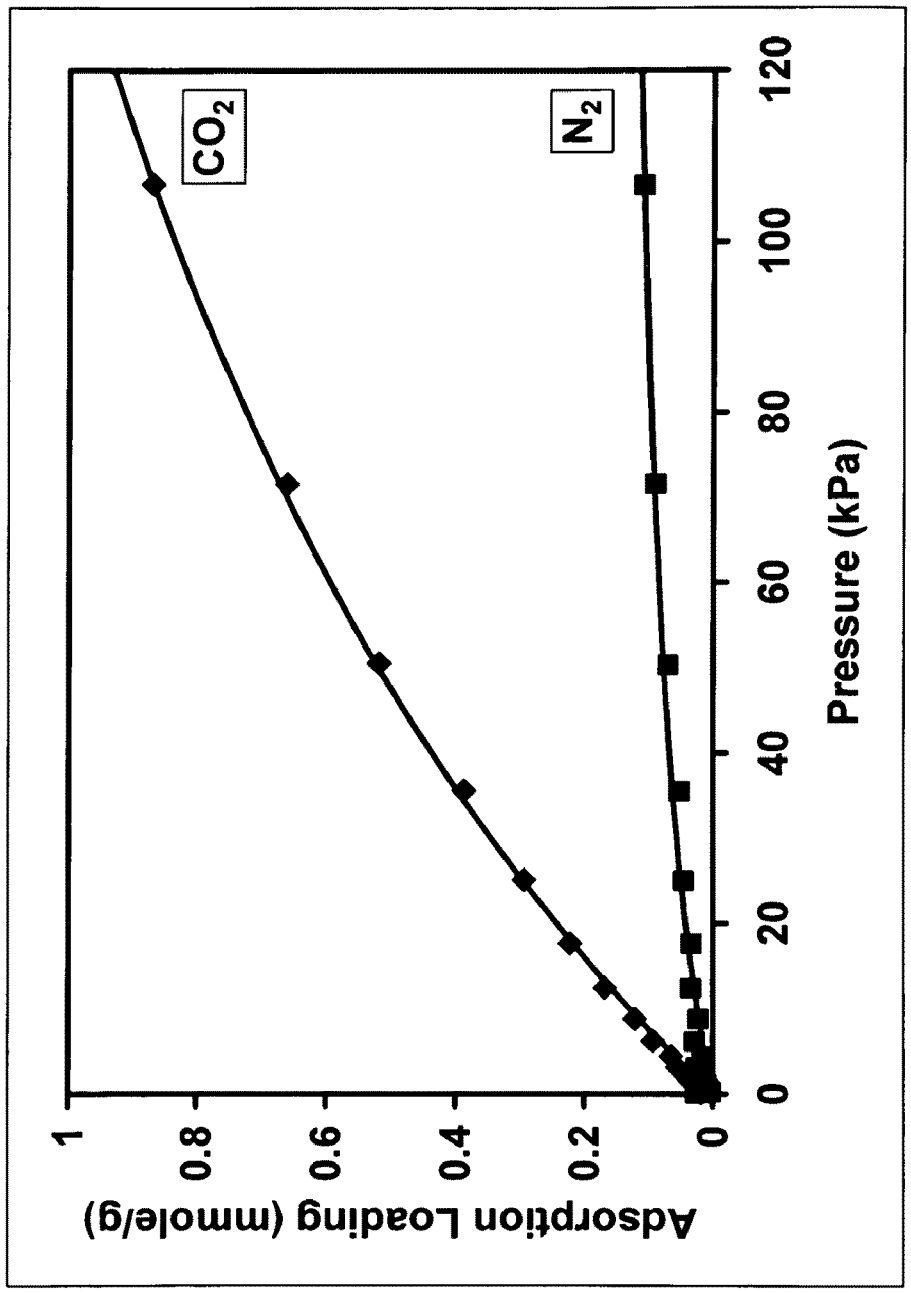
FIG. 25 shows the $CO_2$ adsorption isotherm and the $N_2$ adsorption isotherm at 301 K for a ZIF-11 sample of Example 9.

For the testing of each absorbate in this experiment, a sample of ZIF-11 was loaded with methanol as the solvent. It was out-gassed for 2 hrs at 301 K under dynamic vacuum, heated to 423 K for 3 hrs, and then cooled to 301 K. The dry weight was 82.07 mg. The same clean-up procedure was applied to ZIF-11 prior to all subsequent experiments with other adsorbates. A Scanning Electron Microscopy ("SEM") image of this sample is shown in FIG. 24. FIG. 25 shows the adsorption isotherms of ZIF-11 for carbon dioxide, $CO_2$, and nitrogen, $N_2$, at 301 K. The ordinate displays the equilibrium adsorption loading in typical units of mmole/g. The abscissa displays the absolute pressure of the adsorbate in kPa. As can be seen from FIG. 25, at the upper test pressure of 106.6 kPa @ 301 K, the adsorption loading of carbon dioxide, $CO_2$, was significantly higher than the adsorption loading for nitrogen, $N_2$, on the ZIF-11 material.

Figure 26:
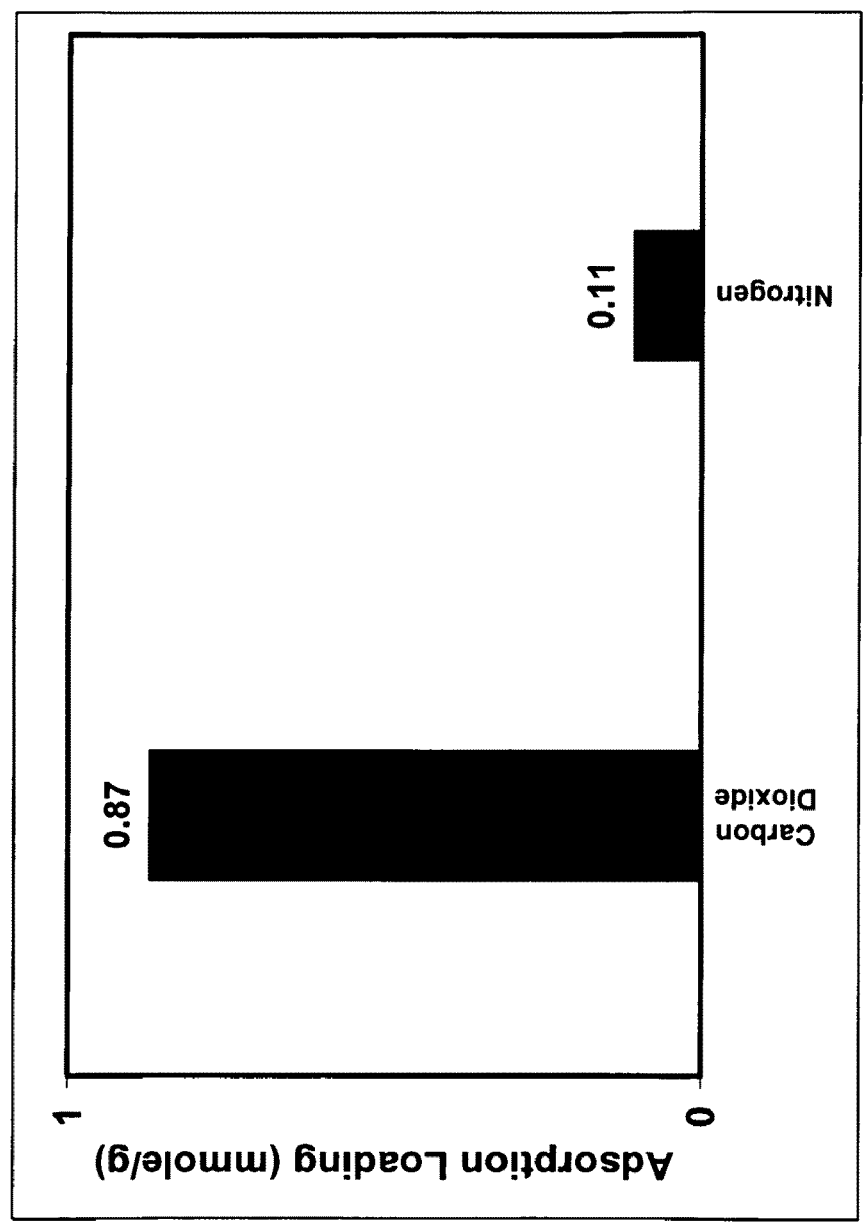
FIG. 26 is a bar graph comparing the adsorption loadings of a ZIF-11 sample of Example 9 for $CO_2$ and $N_2$ at 301 K and 106.6 kPa.

FIG. 26 is a bar graph comparing the corresponding adsorption loadings of the ZIF-11 material for carbon dioxide, $CO_2$, and nitrogen, $N_2$, at test conditions of 301 K and 106.6 kPa obtained from the tests above. As can be seen from this bar graph, the adsorption loading of the ZIF-11 material for $CO_2$ at 106.6 kPa @ 301 K was approximately 0.87 mmole/g while the adsorption loading for $N_2$ was approximately 0.11 mmole/g. At these conditions, the adsorptive loading ratio for $CO_2$ over $N_2$ is approximately 7.9, illustrating the high selectivity of the ZIF-11 material for $CO_2$ over $N_2$, making ZIF-11 a suitable material for use in the present invention.

Example 10

In this example, adsorption isotherm experiments were carried out on ZIF-8 samples obtained from the synthesis detailed in Example 5 above in compliance with the general testing procedures for Examples 6-10 described above.

Figure 28:
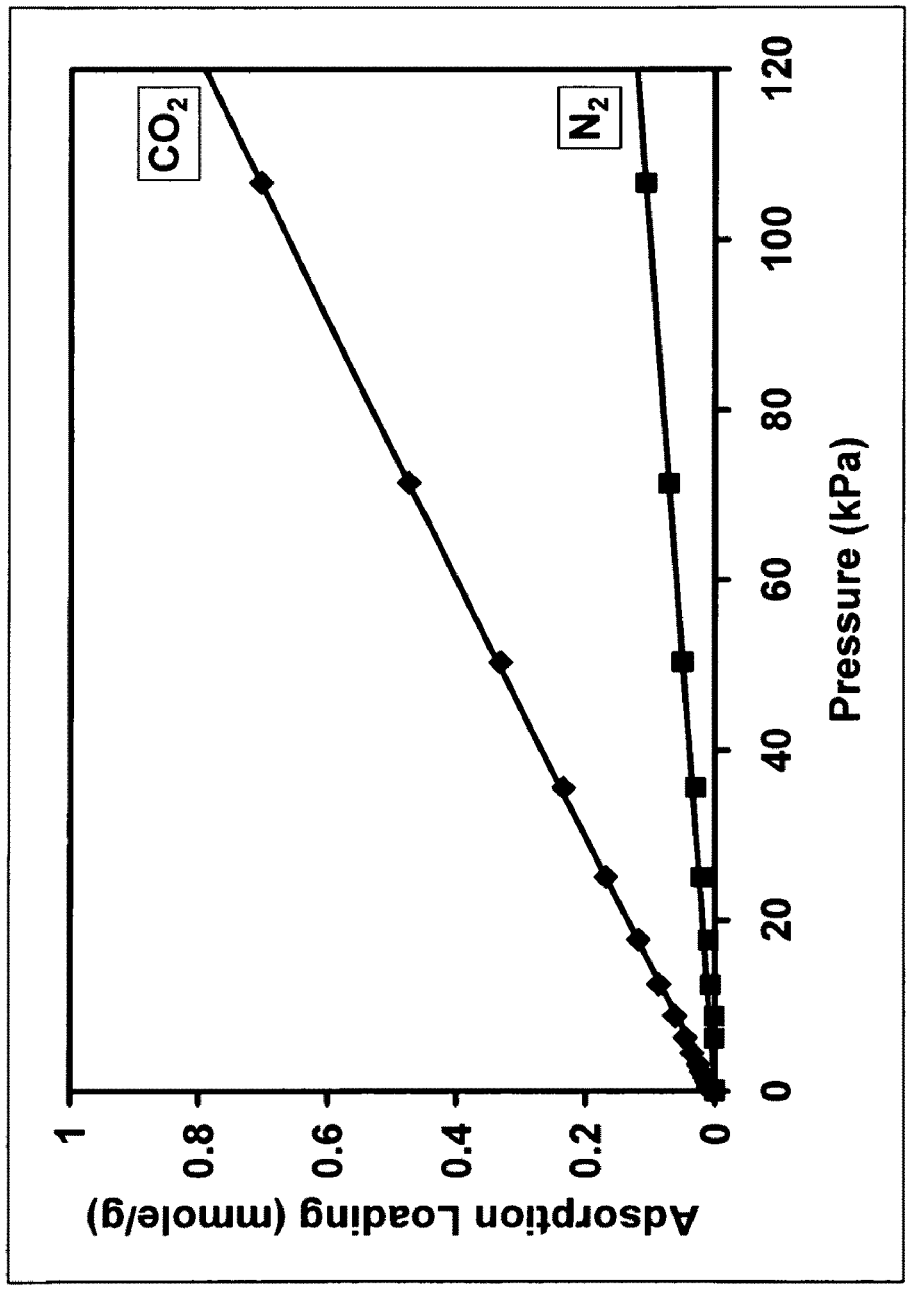
FIG. 28 shows the $CO_2$ adsorption isotherm and the $N_2$ adsorption isotherm at 301 K for a ZIF-8 sample of Example 10.

For the testing of each absorbate in this experiment, a sample of ZIF-8 was loaded with methanol as the solvent. It was out-gassed for 2 hrs at 301 K under dynamic vacuum, heated to 523 K for 3 hrs, and then cooled to 301 K. The dry weight was 16.37 mg. The same clean-up procedure was applied to ZIF-8 prior to all subsequent experiments with other adsorbates. A Scanning Electron Microscopy ("SEM") image of this sample is shown in FIG. 27. FIG. 28 shows the adsorption isotherms of ZIF-8 for carbon dioxide, $CO_2$, and nitrogen, $N_2$, at 301 K. The ordinate displays the equilibrium adsorption loading in typical units of mmole/g. The abscissa displays the absolute pressure of the adsorbate in kPa. As can be seen from FIG. 28, at the upper test pressure of 106.6 kPa @ 301 K, the adsorption loading of carbon dioxide, $CO_2$, was significantly higher than the adsorption loading for nitrogen, $N_2$, on the ZIF-8 material.

Figure 29:
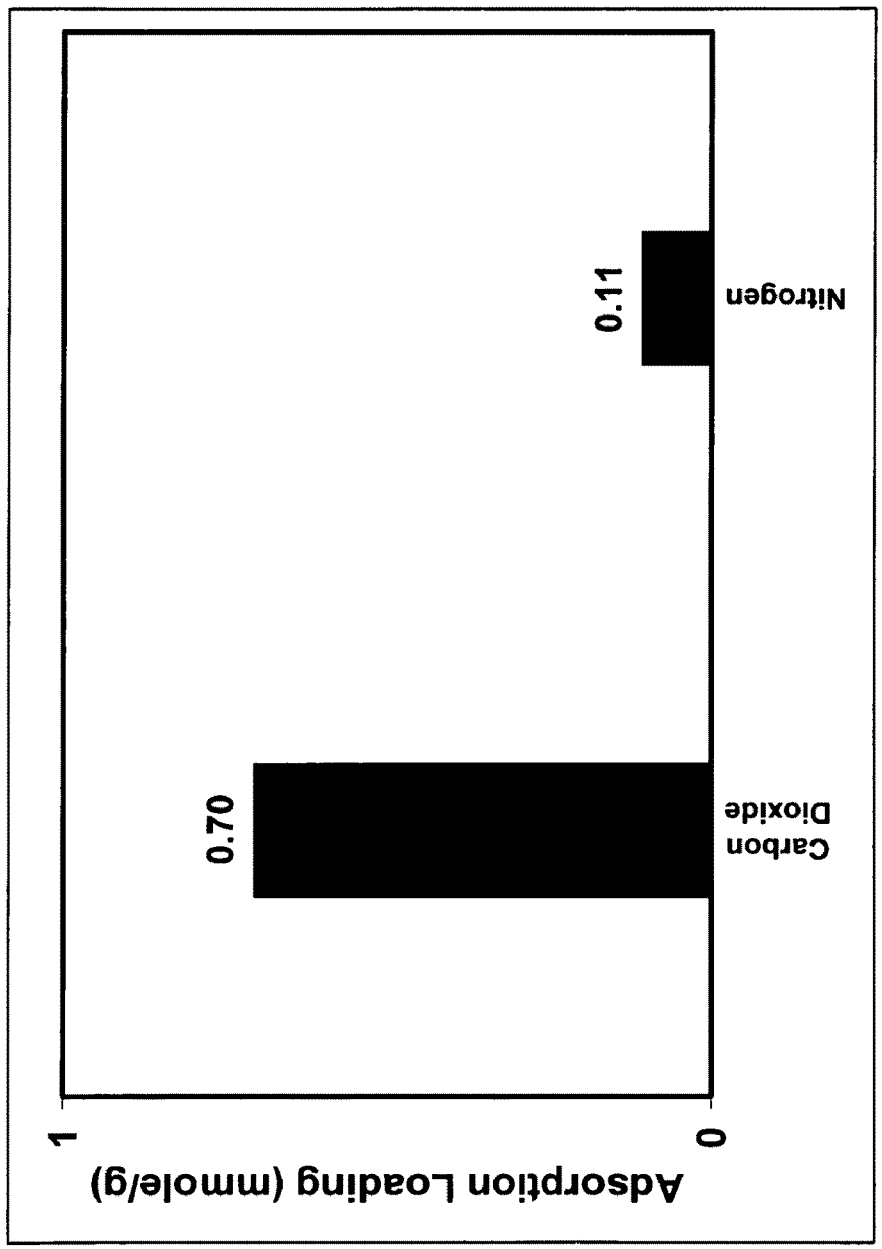
FIG. 29 is a bar graph comparing the adsorption loadings of a ZIF-8 sample of Example 10 for $CO_2$ and $N_2$ at 301 K and 106.6 kPa.

FIG. 29 is a bar graph comparing the corresponding adsorption loadings of the ZIF-8 material for carbon dioxide, $CO_2$, and nitrogen, $N_2$, at test conditions of 301 K and 106.6 kPa obtained from the tests above. As can be seen from this bar graph, the adsorption loading of the ZIF-8 material for $CO_2$ at 106.6 kPa @ 301 K was approximately 0.70 mmole/g while the adsorption loading for $N_2$ was approximately 0.11 mmole/g. At these conditions, the adsorptive loading ratio for $CO_2$ over $N_2$ is approximately 6.4, illustrating the high selectivity of the ZIF-8 material for $CO_2$ over $N_2$, making ZIF-8 a suitable material for use in the present invention.

What is claimed is:

1. A process for separating $CO_2$ from a process feedstream, comprising:
   a) contacting an adsorbent bed comprised of a zeolitic imidazolate framework material with a process feedstream comprising $CO_2$ and $N_2$ at a first pressure and first temperature;
   b) adsorbing at least a portion of the $CO_2$ in the adsorbent bed, thereby producing a $CO_2$-lean product stream, wherein the $CO_2$-rich product stream has a higher concentration of $CO_2$ by vol % than the process feedstream; and
   c) producing a $CO_2$-rich product stream at a second pressure and second temperature, wherein the $CO_2$-rich product stream has a higher concentration of $CO_2$ by vol % than the process feedstream;
   wherein the zeolitic imidazolate framework material has a framework structure wherein each vertex of the framework structure is comprised of a single metal ion and each pair of connected adjacent vertices of the framework structure are linked by the nitrogen atoms of an imidazolate anion or its derivative, and wherein the zeolitic imidazolate framework material has an adsorptive loading ratio for $CO_2$ over $N_2$ of at least 5; wherein adsorptive loading ratio for $Co_2$ over $N_2$ is measured at 301 K and 106.6 kPa.

2. The process of claim 1 wherein the $CO_2$ partial pressure in step a) is greater than the $CO_2$ partial pressure in step d).

3. The process of claim 1, wherein the zeolitic imidazolate framework material has an adsorptive loading ratio for $CO_2$ over $N_2$ of at least 25.

4. The process of claim 2, wherein the first pressure is greater than the second pressure.

5. The process of claim 4, wherein the second temperature is greater than the first temperature.

6. The process of claim 2, wherein the steps of the process are part of a rapid cycle swing adsorption process and the cycle time of the rapid cycle swing adsorption process is less than about 1 minute.

7. The process of claim 2, wherein the process is a swing adsorption process and the difference between the maximum and minimum $CO_2$ partial pressures achieved in the adsorbent bed during a cycle is less than 300 kPa.

8. The process of claim 2, wherein the $CO_2$ partial pressure of the process feedstream in step a) is less than about 200 kPa.

9. The process of claim 2, wherein the process feedstream is comprised of a combustion gas stream.

10. The process of claim 9, wherein the $CO_2$-rich product stream has a $N_2$ content of less than about 20 vol %.

11. The process of claim 9, wherein the $CO_2$ partial pressure of the process feedstream in step a) is less than about 200 kPa.

12. The process of claim 9, wherein the temperature of the combustion gas stream is reduced prior to contacting the adsorbent bed in step a).

13. The process of claim 10, wherein the combustion gas stream has a $N_2$ content of from about 65 to about 85 vol %.

14. The process of claim 13, wherein the combustion gas stream has a $CO_2$ content of from about 3 to about 25 vol % and the $CO_2$-rich product stream has an $CO_2$ content of at least about 50 vol %.

15. The process of claim 10, wherein at least a portion of the $CO_2$-rich product stream is further treated in an amine unit.

16. The process of claim 9, wherein the process feedstream contacts the adsorbent bed at a pressure from about 0.1 to about 10 psig.

17. The process of claim 9, wherein the zeohtic imidazolate framework material has an adsorptive loading ratio for $CO_2$ over $N_2$ of at least 25.

18. The process of claim 2, wherein the process feedstream is comprised of a FCC regenerator off-gas stream.

19. The process of claim 18, wherein the zeolitic imidazolate framework material has an adsorptive loading ratio for $CO_2$ over $N_2$ of at least 25.

20. The process of claim 2, wherein the process feedstream is comprised of a synthetically produced gas stream and the $CO_2$-rich product stream has a $N_2$ content of less than 10 vol %.

21. The process of claim 20, wherein the zeolitic imidazolate framework material has an adsorptive loading ratio for $CO_2$ over $N_2$ of at least 25.

22. A process for separating $CO_2$ from a process feedstream, comprising:
   a) contacting an adsorbent bed comprised of a zeolitic imidazolate framework material with a process feedstream comprising $CO_2$ and $N_2$ at a first pressure and first temperature;
   b) adsorbing at least a portion of the $CO_2$ in the adsorbent bed, thereby producing a $CO_2$-lean product stream, wherein the $CO_2$lean product stream has a lower concentration of $CO_2$ by vol % than the process feedstream; and
   c) producing a $CO_2$ rich product stream at a second pressure and second temperature, wherein the $CO_2$-rich product stream has a higher concentration of $CO_2$ by vol % than the process feedstream;
   wherein the zeolitic imidazolate framework material has a framework structure wherein each vertex of the framework structure is comprised of a single metal ion and each pair of connected adjacent vertices of the framework structure are linked by the nitrogen atoms of an imidazolate anion or its derivative, and
   wherein the zeolitic imidazolate framework material has an adsorptive loading ratio for $CO_2$ over $N_2$ of at least 5; and
   wherein the $CO_2$ partial pressure in step a) is greater than the $CO_2$ partial pressure in step d); the process feedstream. is comprised of a combustion as stream; the $CO_2$-rich product stream has a $N_2$ content of less than about 20 vol % and at least a portion of the $CO_2$-rich product stream is sequestered at a pressure of at least 500 psig.

* * * * *

UNITED STATES PATENT AND TRADEMARK OFFICE
CERTIFICATE OF CORRECTION

PATENT NO.         : 8,142,745 B2
APPLICATION NO.    : 12/321751
DATED              : March 27, 2012
INVENTOR(S)        : Sebastian C. Reyes et al.

Page 1 of 1

It is certified that error appears in the above-identified patent and that said Letters Patent is hereby corrected as shown below:

In the Claims

- Column 33, line 15, claim 1: replace "CO2-rich" with "$CO_2$-lean"
- Column 33, line 15, claim 1: replace "higher" with "lower"
- Column 33, line 33, claim 2: replace "step d)" with "step c)"

Signed and Sealed this
Ninth Day of December, 2014

Michelle K. Lee
*Deputy Director of the United States Patent and Trademark Office*